United States Patent
McKee et al.

(10) Patent No.: US 8,022,341 B2
(45) Date of Patent: *Sep. 20, 2011

(54) HIGH-SPEED COOKING OVEN WITH OPTIMIZED COOKING EFFICIENCY

(75) Inventors: Philip R. McKee, Frisco, TX (US); Earl R. Winkelmann, Garland, TX (US); Scott Stuart Smith, Richardson, TX (US); Lee Thomas VanLanen, McKinney, TX (US)

(73) Assignee: Appliance Scientific, Inc., Dallas, TX (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/266,251

(22) Filed: Nov. 6, 2008

(65) Prior Publication Data
US 2009/0095739 A1    Apr. 16, 2009

Related U.S. Application Data

(63) Continuation-in-part of application No. 12/120,497, filed on May 14, 2008, which is a continuation-in-part of application No. 11/803,787, filed on May 15, 2007, now Pat. No. 7,435,931.

(51) Int. Cl.
*H05B 6/64* (2006.01)
(52) U.S. Cl. ........................... 219/680; 219/678
(58) Field of Classification Search .................. 219/680, 219/678, 679, 681, 682, 683
See application file for complete search history.

(56) References Cited

U.S. PATENT DOCUMENTS

| | | |
|---|---|---|
| 2,617,966 A | 11/1952 | Kilgore |
| 3,397,817 A | 8/1968 | Smith |
| 3,767,883 A | 10/1973 | Staats |
| 3,884,213 A | 5/1975 | Smith |
| 4,332,992 A | 6/1982 | Larsen |
| 4,335,290 A | 6/1982 | Teich |
| 4,523,391 A | 6/1985 | Smith et al. |
| 4,876,426 A | 10/1989 | Smith |

(Continued)

FOREIGN PATENT DOCUMENTS
WO   PCTUS0855518ISR   5/2008
(Continued)

OTHER PUBLICATIONS

International Search Report issued Jun. 18, 2010 in the related PCT/US2010/031299.

*Primary Examiner* — Daniel L Robinson
(74) *Attorney, Agent, or Firm* — Ohlandt, Greeley, Ruggiero & Perle, L.L.P.

(57) ABSTRACT

An improved oven is aimed at optimizing heat transfer and delivering an optimal cooking efficiency in comparison to conventional high-speed cooking ovens. The oven includes tubes that generate plume arrays of a heated gas and introduce them into a cooking chamber of the oven. The tubes may be removably located at the bottom of the cooking chamber of the oven. The tubes are dimensioned for hot air impingement to tighten impingement plume arrays, subject to the space constraints of the oven's cooking chamber. With the optimized cooking efficiency provided by the present invention, high-speed cooking technology may now be extended to ovens operating on a power supply based on a voltage less than 220 volts, preferably between 110 and 125 volts, with more productive results, so that the high-speed cooking technology may find wider applicability and a broader customer base.

35 Claims, 29 Drawing Sheets

U.S. PATENT DOCUMENTS

| | | |
|---|---|---|
| 5,128,158 A | 7/1992 | Chartrain et al. |
| 5,166,487 A | 11/1992 | Hurley et al. |
| 5,254,823 A | 10/1993 | McKee et al. |
| 5,272,299 A | 12/1993 | Ovadia |
| 5,401,940 A | 3/1995 | Smith et al. |
| 5,416,304 A | 5/1995 | De La Cruz |
| 5,434,390 A | 7/1995 | McKee et al. |
| 5,483,044 A | 1/1996 | Thorneywork et al. |
| 5,556,566 A | 9/1996 | Cappello et al. |
| 5,558,793 A | 9/1996 | McKee et al. |
| 5,676,870 A | 10/1997 | Wasserman et al. |
| 5,683,240 A | 11/1997 | Smith |
| 5,816,234 A | 10/1998 | Vasan |
| 5,818,014 A | 10/1998 | Smith et al. |
| 5,897,807 A | 4/1999 | Edgar et al. |
| 5,927,265 A | 7/1999 | McKee et al. |
| 5,928,541 A | 7/1999 | Tsukamoto et al. |
| 5,958,274 A | 9/1999 | Dobie et al. |
| 5,990,466 A | 11/1999 | McKee et al. |
| 6,008,483 A | 12/1999 | McKee et al. |
| 6,060,701 A | 5/2000 | McKee et al. |
| 6,140,626 A | 10/2000 | McKee et al. |
| 6,262,406 B1 | 7/2001 | McKee et al. |
| 6,281,484 B2 | 8/2001 | Thomas |
| 6,307,190 B1 | 10/2001 | Thomas |
| 6,392,211 B2 | 5/2002 | Kim et al. |
| 6,403,937 B1 | 6/2002 | Day et al. |
| 6,486,453 B1 | 11/2002 | Bales et al. |
| 6,568,215 B2 | 5/2003 | Schofield et al. |
| 6,716,467 B2 | 4/2004 | Cole |
| 6,768,087 B2 | 7/2004 | Kikuchi |
| 6,805,112 B2 | 10/2004 | Cole et al. |
| 6,874,495 B2 | 4/2005 | McFadden |
| 6,927,371 B1 | 8/2005 | Hargett et al. |
| 7,055,518 B2 | 6/2006 | McFadden et al. |
| 7,087,872 B1 | 8/2006 | Dobie et al. |
| 7,435,931 B1 * | 10/2008 | McKee et al. ............ 219/683 |
| 2005/0205566 A1 | 9/2005 | Kassayan |
| 2005/0217503 A1 | 10/2005 | McFadden |
| 2005/0236388 A1 | 10/2005 | Goranson |
| 2006/0191918 A1 | 8/2006 | Ashford et al. |
| 2007/0137633 A1 | 6/2007 | McFadden |
| 2008/0283519 A1 | 11/2008 | McKee et al. ............ 219/680 |

FOREIGN PATENT DOCUMENTS

| | | |
|---|---|---|
| WO | PCTUS0806246ISR | 11/2008 |

* cited by examiner

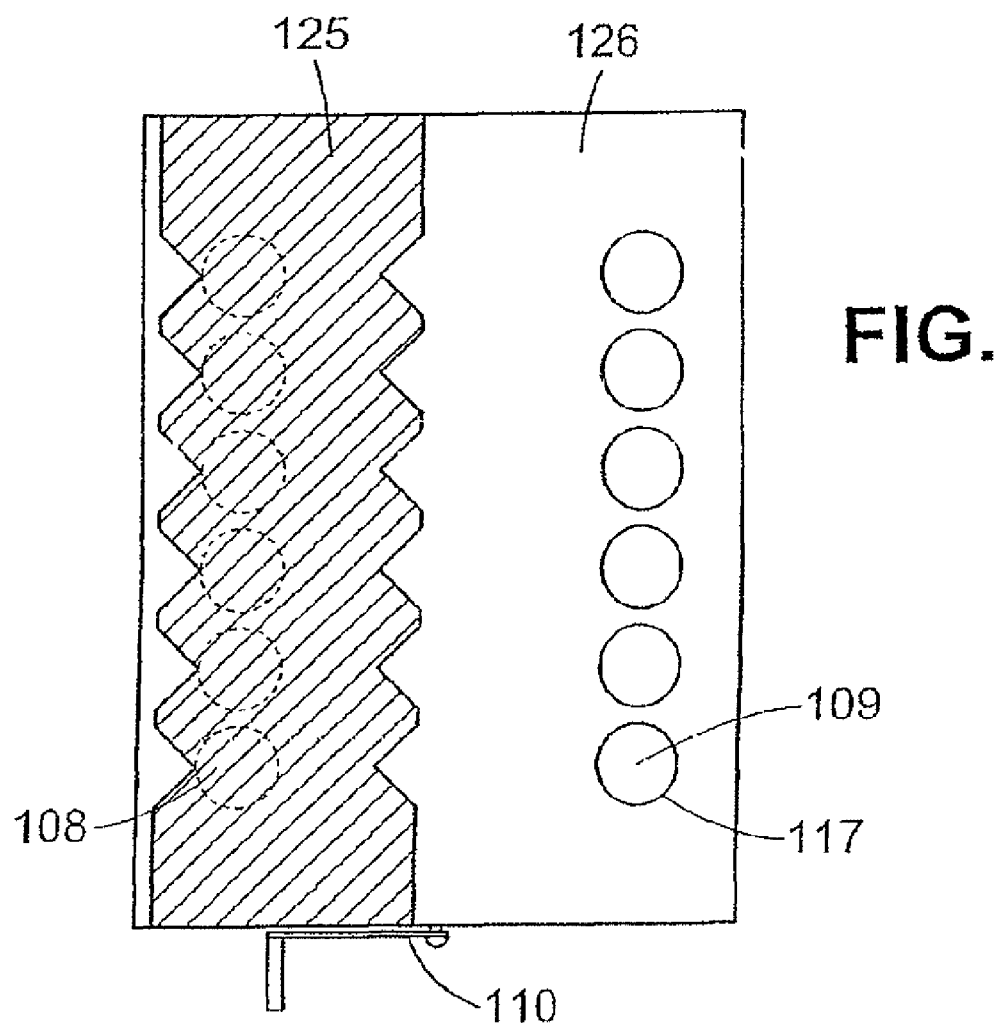

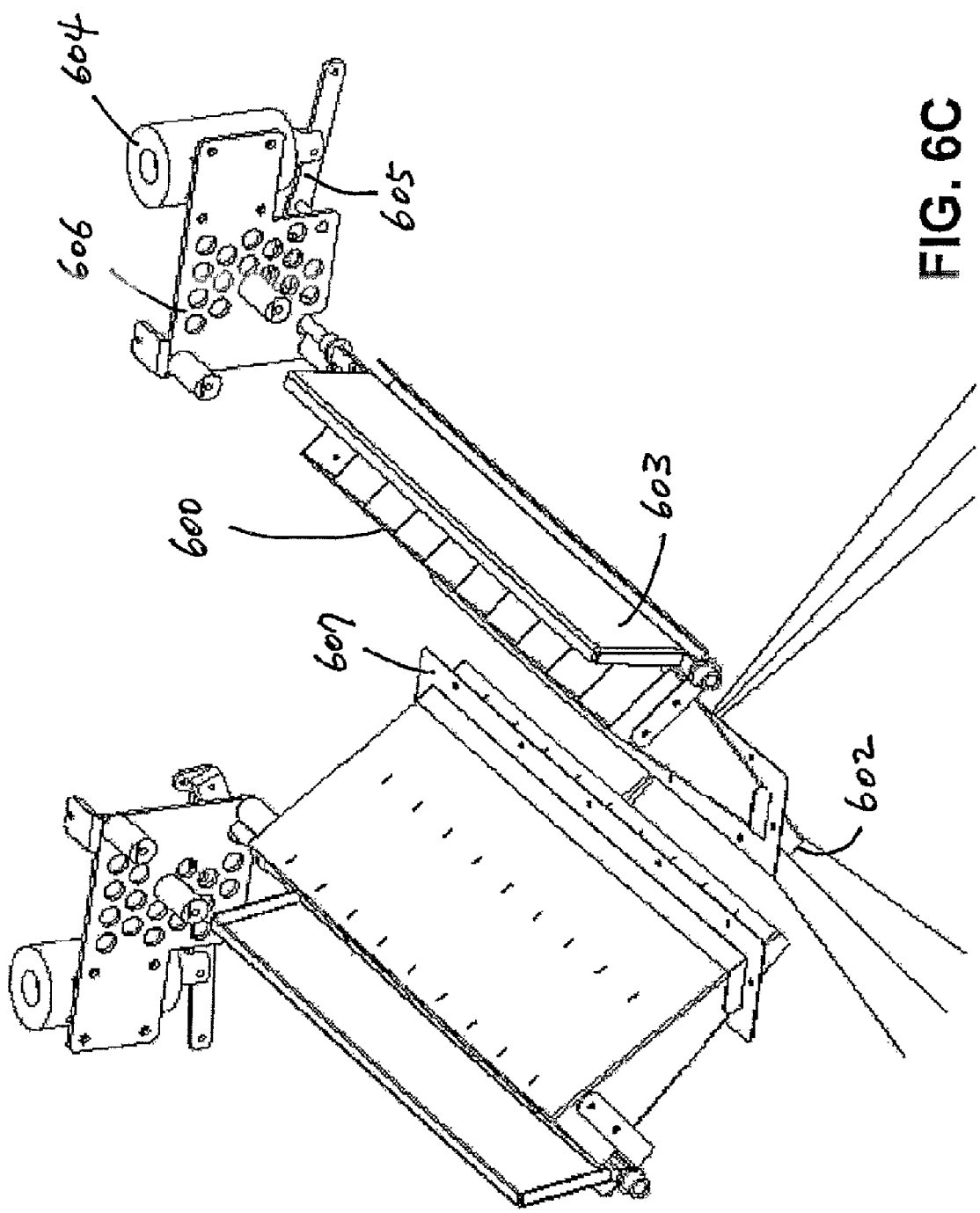

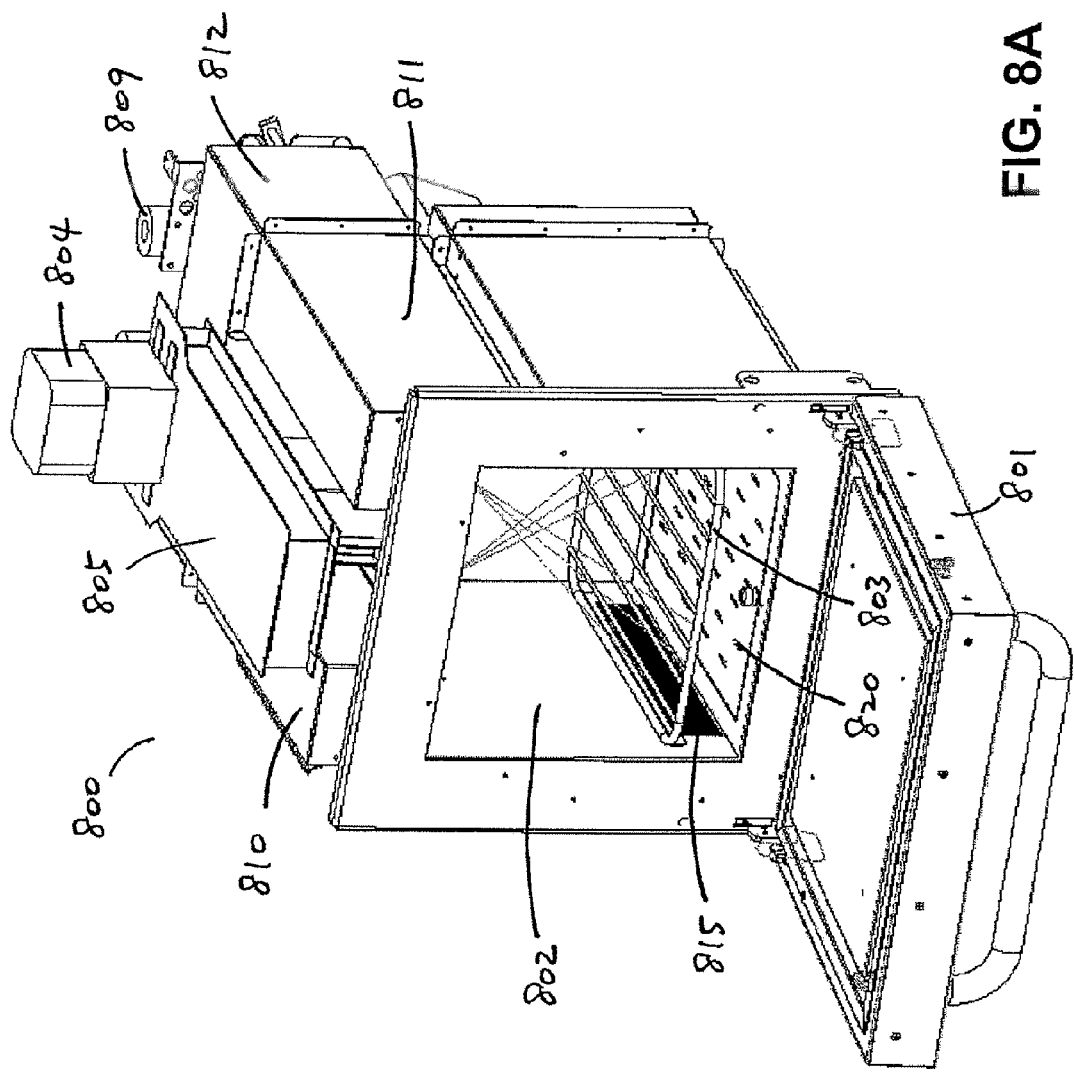

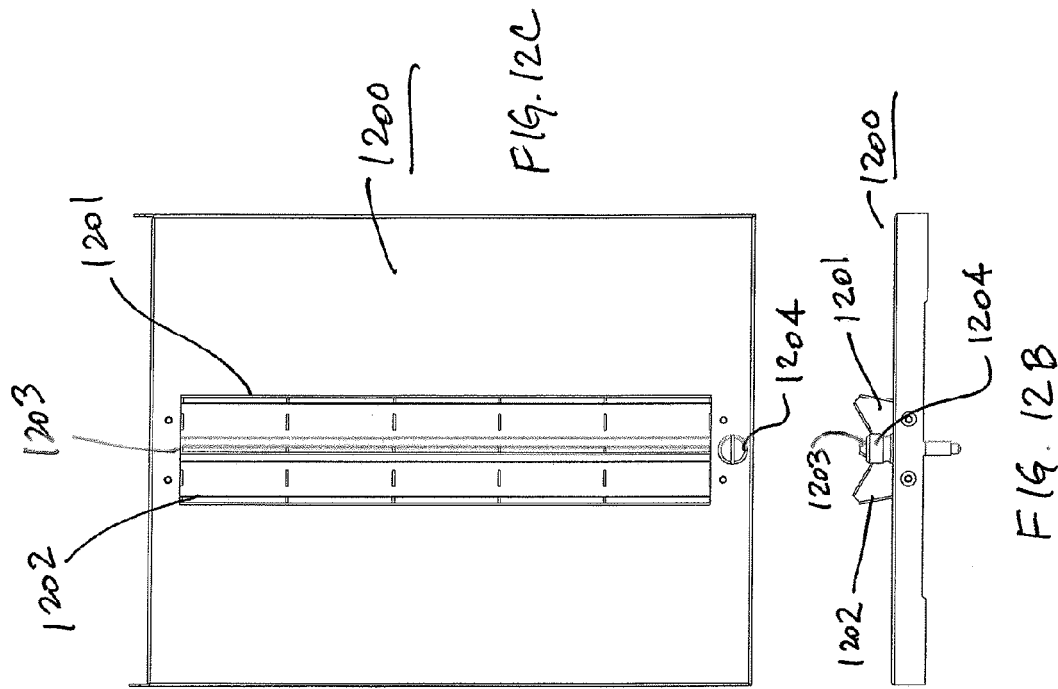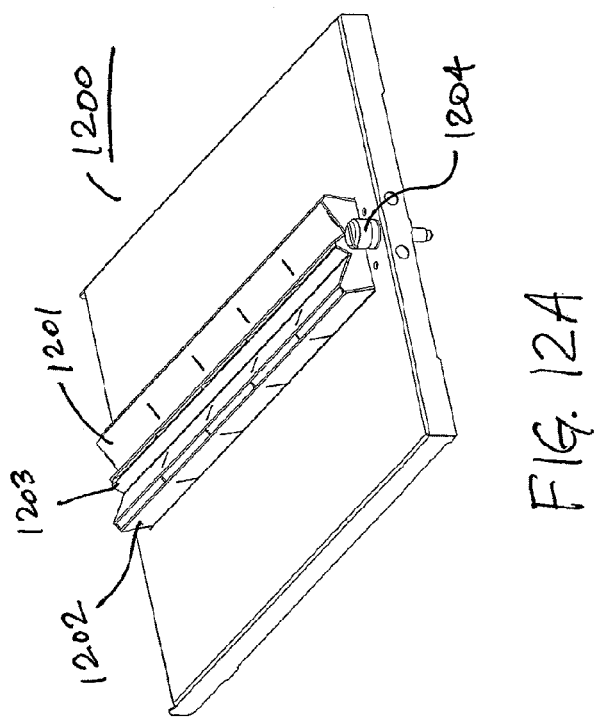

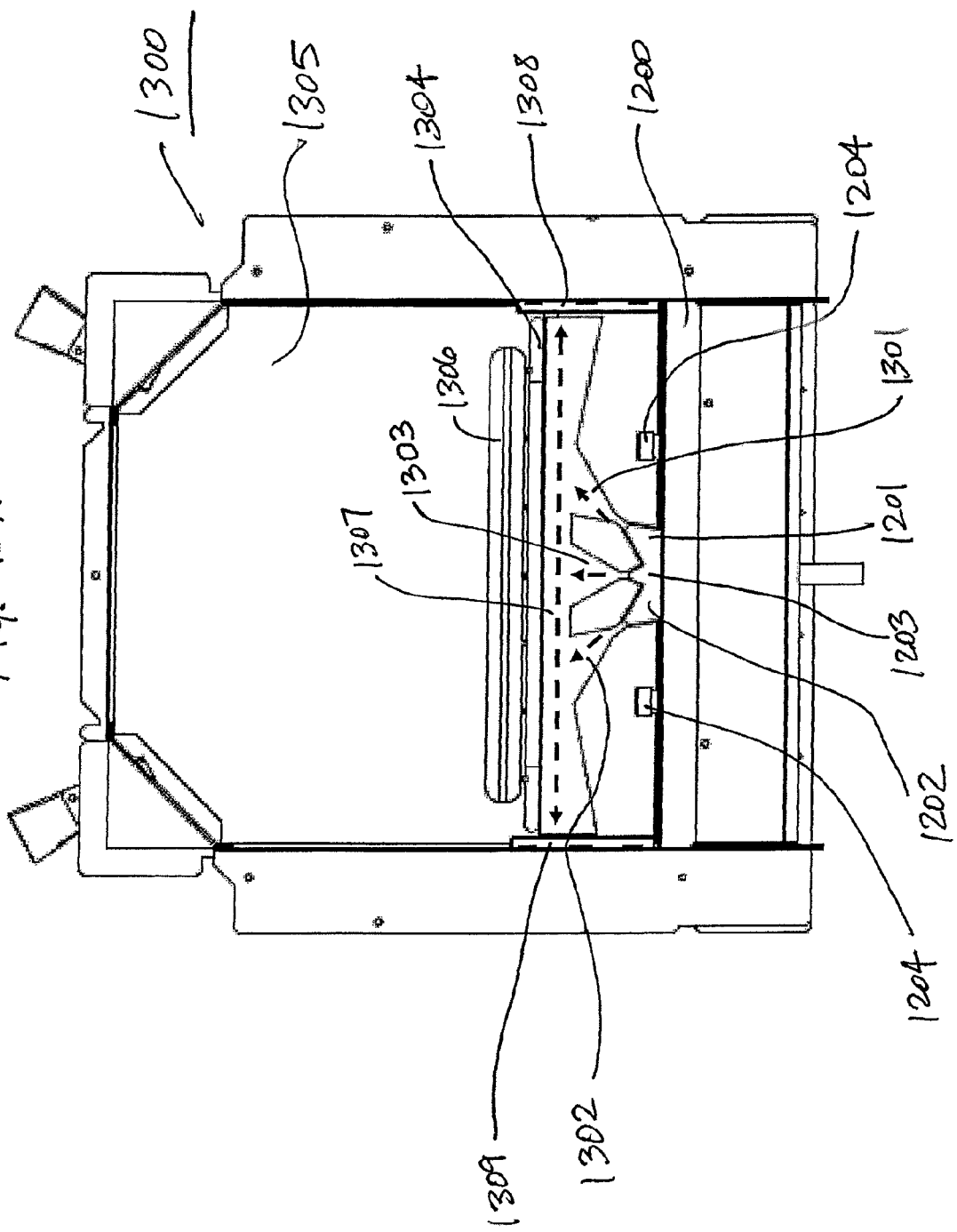

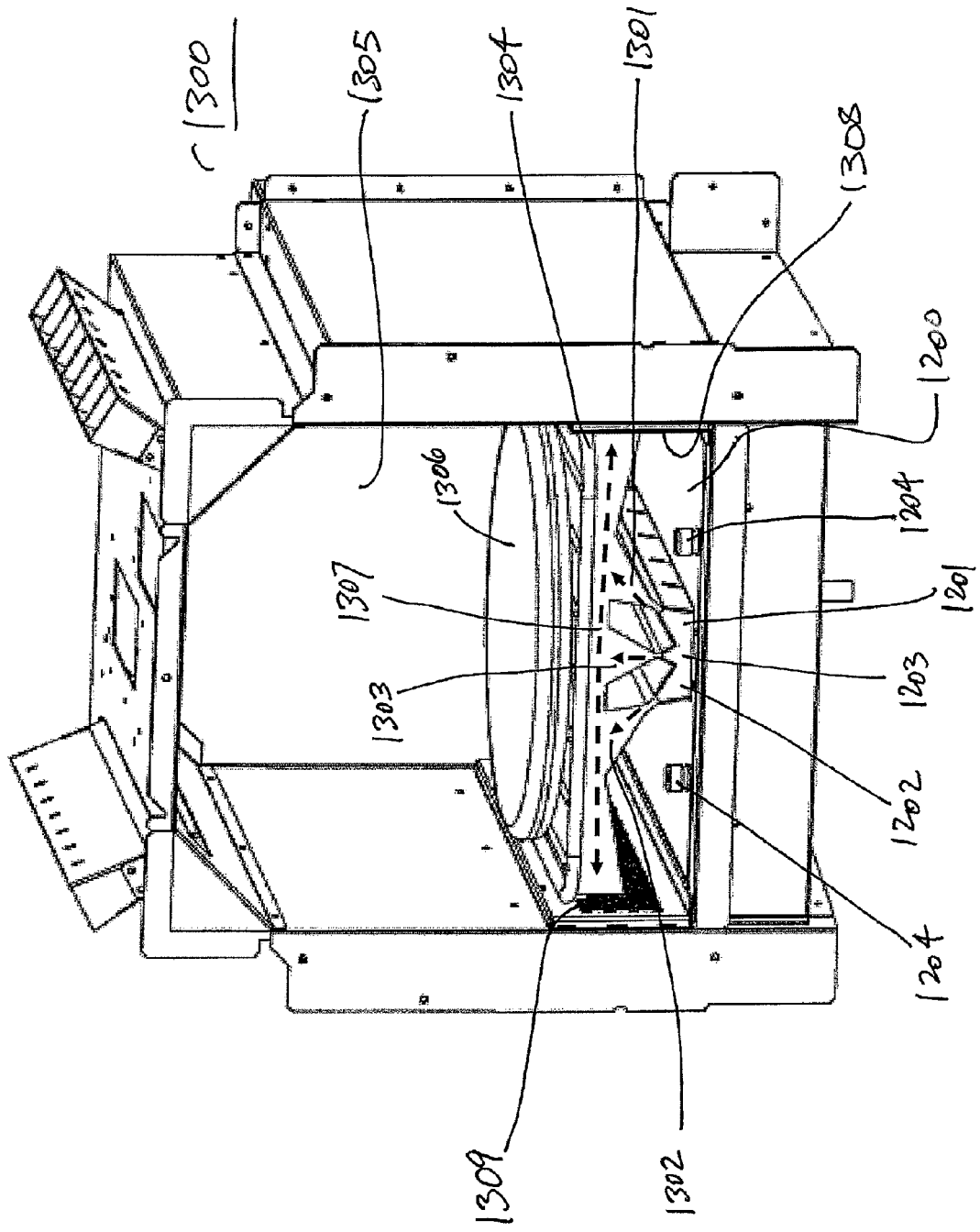

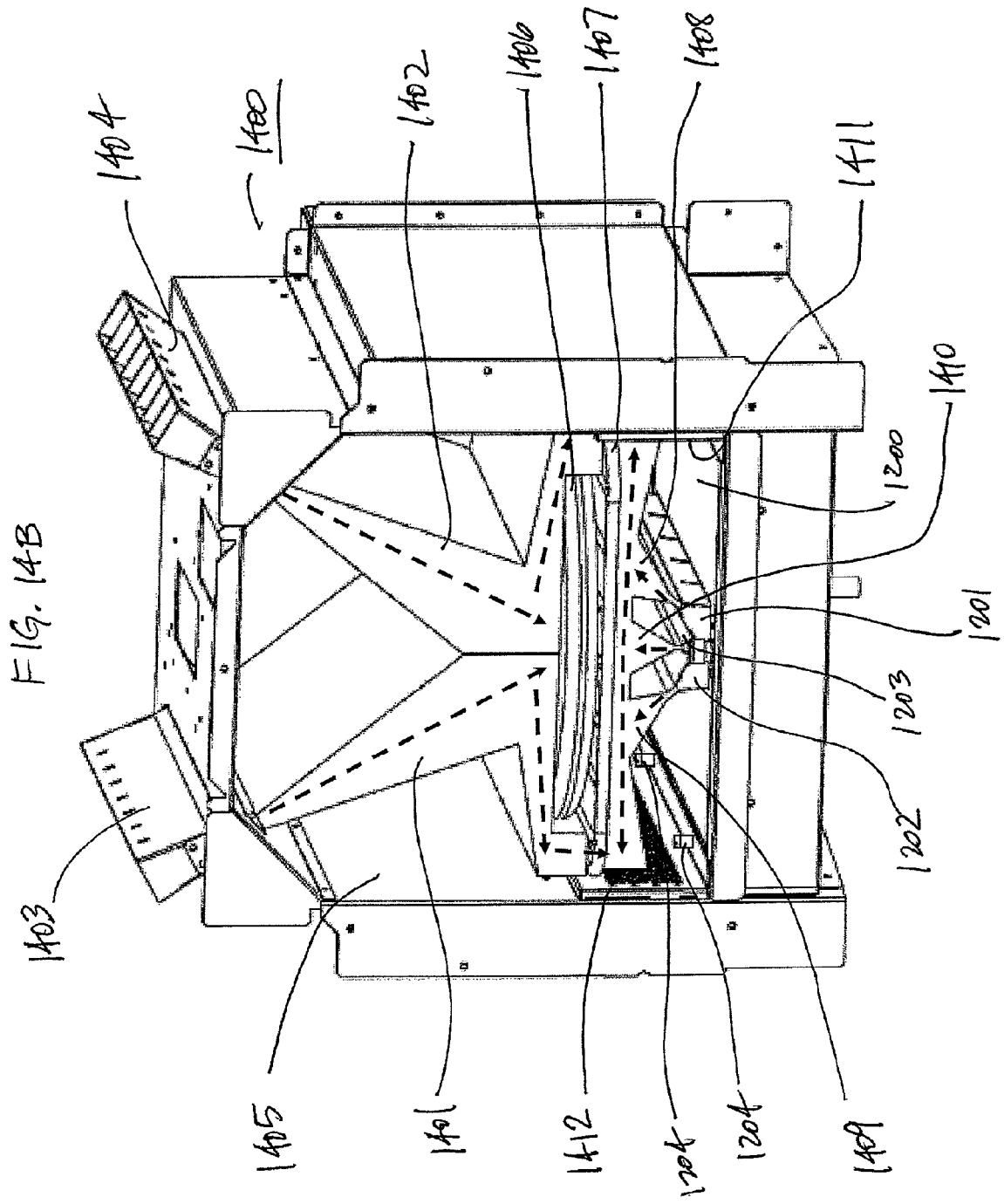

HIGH-SPEED COOKING OVEN WITH OPTIMIZED COOKING EFFICIENCY

CROSS-REFERENCE TO RELATED APPLICATIONS

This patent application is a continuation-in-part of U.S. patent application Ser. No. 12/120,497, filed on May 14, 2008, which is a continuation-in-part of U.S. patent application Ser. No. 11/803,787, filed on May 15, 2007, now U.S. Pat. No. 7,435,931. The contents of both of these related patent applications are incorporated herein by reference in their entirety.

FIELD OF INVENTION

The present invention generally relates to an oven for cooking a food product. More particularly, the present invention relates to a high-speed cooking oven with optimal cooking efficiency.

BACKGROUND OF THE INVENTION

Hot air impingement and microwave radiation are two different means for heating and cooking a food product based on different physical principles. Hot air impingement is based on the transfer of heat from a hot air having a higher temperature to an object having a lower temperature, changing the internal energy of the air and the object in accordance with the first law of thermodynamics. On the other hand, microwave radiation consists of electromagnetic waves having a typical wavelength of 12.24 cm or 4.82 inches and a frequency of 2,450 MHz, which are capable of causing dielectric heating of water, fat and sugar molecules in a food product.

Initially, ovens based on hot air impingement and microwave ovens were separately developed and commercialized. However, it was later demonstrated that a combination of hot air impingement and microwave radiation used in an oven can facilitate high-speed, high-quality cooking. See, for example, U.S. Pat. No. 5,254,823 to McKee et al., U.S. Pat. No. 5,434,390 to McKee et al., U.S. Pat. No. 5,558,793 to McKee et al., and U.S. Pat. No. 6,060,701 to McKee et al. This led to the development and commercialization of quick-cooking hybrid ovens based on both hot air impingement and microwave radiation and has established a new standard in the high-speed cooking technology.

While the technology of combining hot air impingement and microwave heating to achieve high-speed cooking in an oven has by now been well established, the current technology does not address a host of new challenges created by such combination, including the problem of inefficient energy use and consequent suboptimal cooking efficiency in the existing high-speed cooking ovens. The fundamental principle of cooking ovens is conversion of an available power (e.g., electric power) into heat energy to be directed to and absorbed by a food product in the oven to raise its internal temperature. Accordingly, the optimal cooking efficiency of an oven requires that the amount of heat energy converted from a given power be maximized; the amount of the heat energy directed to a food product in the oven be maximized; and the amount of the heat energy absorbed and retained by the food product be maximized. However, the current technology of the high-speed cooking ovens using both hot air impingement and microwave radiation is not directed to achieving such optimal cooking efficiency.

As a food product resides in a hot air environment of an oven, temperature gradients, or several boundary layers, form around the cooler food product. The oven cooks the food product by transferring the heat energy to the food product through these temperature gradients. Forced air convection by, for example, a fan can improve the heat transfer by "wiping away" the temperature gradients around the food product and bringing the higher temperature air closer to the food product. Hot air impingement can further improve the heat transfer by "piercing" the temperature gradients with jets of hot air and bringing the air at higher temperature closer to the surface of the food product. However, significant portions of the electric power and the heat energy from the hot air impingement are lost in the process to the oven walls, various openings, plenum and air blower that form the hot air circulation and delivery system of the oven. In addition, the presence of a microwave launcher in the cooking chamber may further reduce the efficiency of heat transfer by the hot air impingement.

Another well-known problem with the technique of hot air impingement is "spotting" in the areas directly impacted by the hot air jets, causing uneven heating or scorching of the surface of the food product. While this problem may be resolved by, for example, reduction in the hot air velocity and-or increase in the diameter of the columns of impinging hot air, such solutions may further reduce the efficiency of the hot air impingement.

In addition, the diameter-cross-sectional area of a column of hot air impingement generally increases as the distance from the hot air jet orifice increases, thereby reducing the efficiency of hot air impingement. While this problem may be solved by increasing the hot air velocity, as discussed above, such solution may further aggravate the spotting problem.

As for the microwave portion of the conventional high-speed cooking oven, a portion of the electric power is lost to heat within the transformer and magnetron during the process of generating microwaves. In addition, some portion of microwave energy is lost when reflected from the cavity walls back to the magnetron and dissipated through the cooling fan. This can occur when there is an uneven matching between the microwave delivery system and the microwave load.

Furthermore, it is also well known that microwave provides uneven heat energy distribution across the volume of a cooking cavity. While the horizontal unevenness may be eliminated by rotating the food product around a vertical axis in the oven, as many conventional microwave ovens do, such solution does little to reduce the vertical unevenness in the heat energy distribution.

There is yet another source of inefficiency in the conventional high-speed cooking oven. Until the temperature at any portion of a food product in the oven reaches 212° F. at which the water molecules in the food product start being converted into steam during the cooking process, the amount of the energy absorbed by the food product roughly equals the amount of the energy directed at the food product. However, after the point when the water starts to be converted into steam, a portion of the energy directed at the food product is not absorbed by the food product, but is lost as the energy of activating the water into steam, which subsequently escapes from the food product carrying away a portion of thermal energy from the food product. This phenomenon is further complicated by the fact that the heat energy absorbed at the surface of the food product is not immediately dispersed downward below the surface due to the finite heat transfer coefficient (or thermal conductivity) of the food product and it takes some time to bring the inner mass of the food product into thermal equilibrium with the surface. Accordingly, the efficiency in heat transfer to the food product in the oven decreases after the temperature of the food surface reaches 212° F., when the resulting steam at a higher temperature than the inner temperature of the food product carries away heat energy from the food product.

In summary, the problem with the current high-speed cooking technology based on a combination of hot air impingement and microwave radiation is that the combination has never been done in a way to optimize the cooking efficiency of the oven. With the suboptimal cooking efficiency in the presence of various sources of inefficiencies in the conversion of electrical power to heat, the currently available high-speed cooking ovens (either commercial models or residential models) operate on a power supply based on 220 volts or greater. As a result, this relatively high electric power required to operate the high-speed cooking oven limits the universe of possible applications and customer bases, especially in residential households where a 120 volt-based power supply is more common.

Thus, it is an object of the present invention to eliminate or reduce some of the inefficiencies in heat transfer present in the conventional high-speed cooking ovens.

It is yet another object of the present invention to optimize the cooking efficiency of a high-speed cooking oven.

It is yet another object of the present invention to optimize the combination of hot air impingement and microwave to seek the greater cooking efficiency than was possible in the conventional high-speed cooking oven.

It is yet another object of the present invention to optimize the cooking efficiency of the hot air impingement.

It is yet another object of the present invention to optimize the cooking efficiency of the microwave heating.

It is yet another object of the present invention to resolve the spotting problem without compromising the cooking efficiency of the hot air impingement.

It is yet another object of the present invention to provide a more even distribution of microwave heating compared to the conventional high-speed cooking oven.

It is yet another object of the present invention to match the cavity of a high-speed cooking oven to the microwave load.

It is yet another object of the present invention to optimize the efficiency of heat transfer to a food product in the oven by overcoming the inefficiency created by the heat loss due to the water steam escaping from the food product at 212° F. and the time lag in the heat energy distribution in the inner mass of the food product due to its finite heat transfer coefficient.

It is yet another object of the present invention to provide a high-speed cooking oven that can operate on a power supply based on voltage less than 220 volts.

It is yet another object of the present invention to provide a high-speed cooking oven that can operate on a power supply based on a voltage between 110 and 125 volts.

It is yet another object of the present invention to provide a high-speed cooking oven capable of operating on a power supply based on the voltage of 120 volts and the current of 30 Amperes.

It is yet another object of the present invention to reduce the operating costs of high-speed cooking ovens.

Other objects and advantages of the present invention will become apparent from the following description.

SUMMARY OF THE INVENTION

It has now been found that the above-mentioned and related objects of the present invention are obtained in the form of several separate, but related, aspects including an oven for cooking a food product at least partially by hot air impingement and-or at least partially by microwave.

More particularly, an oven for cooking a food product according to an exemplary embodiment of the present invention comprises a cooking chamber comprising a top and a support for receiving the food product for cooking, a conduit for providing a gas into the cooking chamber, a thermal energy source for heating the gas disposed in the conduit, a first nozzle for causing a first impingement of the gas from the conduit into the cooking chamber, a second nozzle for causing a second impingement of the gas from the conduit into the cooking chamber, and an air modulator for controlling respective flow rates of the gas for the first and the second impingements, wherein the first nozzle is configured and positioned to direct the first impingement of the gas generally toward a first side of the support, the second nozzle is configured and positioned to direct the second impingement of the gas generally toward a second side of the support, the first and the second sides being generally opposite sides of the support, the first and the second nozzles are further configured and positioned to respectively direct the first and the second impingements of the gas to meet each other at a distance from the support in the cooking chamber, and the air modulator is adapted to cause a time-dependent spatial variation in the sum of the first and the second impingements of the gas applied to the food product in the cooking chamber.

In at least one embodiment, the first side comprises a right edge of the support and the second side comprises a left edge of the support.

In at least one embodiment, the first and the second nozzles are further configured and positioned to respectively direct the first and the second impingements of the gas to meet each other above the midpoint between the first and the second sides of the support in the cooking chamber.

In at least one embodiment, the first and the second nozzles are further configured and positioned to respectively direct the first and the second impingements of the gas to meet each other above the food product on the support in the cooking chamber.

In at least one embodiment, the first and the second nozzles are dimensioned to optimize the flow rates of the gas.

In at least one embodiment, the diameter of each of the first and the second nozzles is dimensioned to optimize the flow rate of the corresponding nozzle.

In at least one embodiment, the length of each of the first and the second nozzles is dimensioned to optimize the flow rate of the corresponding nozzle and the dimension of the cooking chamber simultaneously.

In at least one embodiment, the length of each of the first and the second nozzles is substantially 3 inches.

In at least one embodiment, the ratio of the inlet orifice area to the exit orifice area for each of the first and the second nozzles is set to optimize the air impingement from the corresponding nozzle.

In at least one embodiment, the ratio of the inlet orifice area to the exit orifice area for each of the first and the second nozzles is substantially 4 to 1.

In at least one embodiment, the respective directions of the first and the second impingements of the gas are at a substantially 90-degree angle with respect to each other.

In at least one embodiment, the first and the second nozzles are further configured to respectively direct the first and the second impingements of the gas at a substantially 45-degree angle with respect to the support.

In at least one embodiment, the first nozzle is positioned at a first half of the top and the second nozzle is positioned at a second half of the top.

In at least one embodiment, the air modulator is configured to provide a first periodic modulation in time of the flow rate of the gas for the first impingement and a second periodic modulation in time of the flow rate of the gas for the second impingement, the first and the second periodic modulations having substantially the same amplitude and period but differing in phase by 180 degrees.

In at least one embodiment, the sum of the first and the second periodic modulations is substantially constant in time.

In at least one embodiment, the first periodic modulation comprises a first sinusoidal function in time for the flow rate of the first impingement and the second periodic modulation comprises a second sinusoidal function in time for the flow rate of the second impingement, the first and the second sinusoidal functions having substantially the same amplitude and period but differing in phase by 180 degrees.

In at least one embodiment, the oven further comprises a support controller for modulating in time the distance of the support from the first and the second nozzles.

In at least one embodiment, the oven further comprises a third nozzle for causing a third impingement of the gas from the conduit into the cooking chamber, the third nozzle being configured and positioned to direct the third impingement of the gas below the support.

In at least one embodiment, the conduit comprises a first return air exit and a second return air exit below the support in the cooking chamber, the first and the second return air exits being positioned on the opposite sides of the cooking chamber respectively proximate to the first and the second sides of the support.

In at least one embodiment, the oven further comprises a return air exit controller for controlling the closing and the opening of each of the first and the second return air exits.

In at least one embodiment, the return air exit controller and the air modulator are adapted to operate in synchronization.

In at least one embodiment, the return air exit controller is adapted to close the first return air exit and open the second return air exit when the first air impingement is greater than the second air impingement, and to open the first return air exit and close the second return air exit when the second air impingement is greater than the first air impingement.

In at least one embodiment, the oven is adapted to be powered by a voltage less than 220 volts.

In at least one embodiment, the voltage is between 110 and 125 volts.

In at least one embodiment, the oven further comprises one or more magnetrons, a first microwave resonator for directing a first microwave energy generated by the one or more magnetrons into the cooking chamber, a second microwave resonator for directing a second microwave energy generated by the one or more magnetrons into the cooking chamber, and a microwave modulator for controlling each of the first and the second microwave energies, wherein the first microwave resonator is configured and positioned to direct the first microwave energy to propagate generally toward the first side of the support, the second microwave resonator is configured and positioned to direct the second microwave energy to propagate generally toward the second side of the support, the first and the second microwave resonators are further configured and positioned to respectively direct the first and the second microwave energies to cross at a distance from the support in the cooking chamber, and the microwave modulator is adapted to cause a time-dependent spatial variation in the sum of the first and the second microwave energies applied to the food product in the cooking chamber.

In at least one embodiment, the first side comprises a right edge of the support and the second side comprises a left edge of the support.

In at least one embodiment, the first and the second microwave resonators are further configured and positioned to respectively direct the first and the second microwave energies to cross above the midpoint between the first and the second sides of the support in the cooking chamber.

In at least one embodiment, the first and the second microwave resonators are further configured and positioned to respectively direct the first and the second microwave energies to cross above the food product on the support in the cooking chamber.

In at least one embodiment, the first and the second microwave resonators are further configured and positioned to respectively direct the first and the second microwave energies to cross at the center of the food product on the support in the cooking chamber.

In at least one embodiment, the cooking chamber is dimensioned to match a microwave load of the oven.

In at least one embodiment, the cooking chamber is dimensioned in integer multiples of the wavelength of the first and the second microwave energies.

In at least one embodiment, at least one of the length, width and height of the cooking chamber is sized in integer multiples of the wavelength of the first and the second microwave energies.

In at least one embodiment, the respective directions of the first and the second microwave energies are at a substantially 90-degree angle with respect to each other.

In at least one embodiment, the first and the second microwave resonators are directed at a substantially 45-degree angle with respect to the support.

In at least one embodiment, the first microwave resonator is positioned at substantially near a first side of the top and the second microwave resonator is positioned at substantially near a second side of the top, the first and the second sides being opposite sides of the top.

In at least one embodiment, the first side of the top comprises a left edge of the top and the second side of the top comprises a right edge of the top.

In at least one embodiment, the microwave modulator comprises a voltage regulator for modulating a voltage for the one or more magnetrons.

In at least one embodiment, the microwave modulator comprises a switch for turning on and off an electrical power to the one or more magnetrons.

In at least one embodiment, the microwave modulator is configured to provide a first periodic modulation in time of the first microwave energy and a second periodic modulation in time of the second microwave energy, the first and the second periodic modulations having substantially the same amplitude and period but differing in phase by 180 degrees.

In at least one embodiment, the sum of the first and the second periodic microwave modulations is substantially constant in time.

In at least one embodiment, the first periodic modulation comprises a first sinusoidal function in time for the first microwave energy and the second periodic modulation comprises a second sinusoidal function in time for the second microwave energy, the first and the second sinusoidal functions having substantially the same amplitude and period but differing in phase by 180 degrees.

In at least one embodiment, the oven further comprises a support controller for modulating in time the distance of the support from the first and the second microwave resonators.

In at least one embodiment, the first and the second nozzles are dimensioned to prevent microwave resonances within the nozzles.

In at least one embodiment, the diameter of each of the first and the second nozzles is dimensioned to optimize the flow rate of the corresponding nozzle and to prevent entry of the first or the second microwave energies simultaneously.

In at least one embodiment, the diameter of each of the first and the second nozzles is substantially 0.75 inches.

In at least one embodiment, the microwave modulator is adapted to operate in phase with the air modulator.

In at least one embodiment, the microwave modulator is adapted to operate out of phase with the air modulator.

In at least one embodiment, each of the first and the second microwave resonators comprises an upper resonator coupled to the one or more magnetrons and a lower resonator with an opening to the cooking chamber.

In at least one embodiment, at least one width of the lower resonator is substantially equal to the wavelength of a standing microwave in the upper resonator.

The present invention is also directed to an oven for cooking, comprising a cooking chamber comprising a top and a support for receiving a food product for cooking, one or more magnetrons, a first microwave resonator for directing a first microwave energy generated by the one or more magnetrons into the cooking chamber, a second microwave resonator for directing a second microwave energy generated by the one or more magnetrons into the cooking chamber, and a microwave modulator for controlling the energy of each of the first and the second microwave energies, wherein the first microwave resonator is configured and positioned to direct the first microwave energy to propagate generally toward a first side of the support, the second microwave resonator is configured and positioned to direct the second microwave energy to propagate generally toward a second side of the support, the first and the second sides being generally opposite sides of the support, the first and the second microwave resonators are further configured and positioned to respectively direct the first and the second microwave energies to cross at a distance from the support in the cooking chamber, and the microwave modulator is adapted to cause a time-dependent spatial variation in the sum of the first and the second microwave energies applied to the food product in the cooking chamber.

In at least one embodiment, the first side comprises a right edge of the support and the second side comprises a left edge of the support.

In at least one embodiment, the first and the second microwave resonators are further configured and positioned to respectively direct the first and the second microwave energies to cross above the midpoint between the first and the second sides of the support in the cooking chamber.

In at least one embodiment, the first and the second microwave resonators are further configured and positioned to respectively direct the first and the second microwave energies to cross above the food product on the support in the cooking chamber.

In at least one embodiment, the first and the second microwave resonators are further configured and positioned to respectively direct the first and the second microwave energies to cross substantially at the center of the food product on the support in the cooking chamber.

In at least one embodiment, the cooking chamber is dimensioned to match a microwave load of the oven.

In at least one embodiment, the cooking chamber is dimensioned in integer multiples of the wavelength of the first and the second microwave energies.

In at least one embodiment, at least one of the length, width and height of the cooking chamber is sized in integer multiples of the wavelength of the first and the second microwave energies.

In at least one embodiment, the respective directions of the first and the second microwave energies are at a substantially 90-degree angle with respect to each other.

In at least one embodiment, the first and the second microwave resonators are directed at a substantially 45-degree angle with respect to the support.

In at least one embodiment, the first microwave resonator is positioned at substantially near a first side of the top and the second microwave resonator is positioned at substantially near a second side of the top, the first and the second sides being opposite sides of the top.

In at least one embodiment, the first side of the top comprises a left edge of the top and the second side of the top comprises a right edge of the top.

In at least one embodiment, the microwave modulator comprises a voltage regulator for modulating a voltage for the one or more magnetrons.

In at least one embodiment, the microwave modulator comprises a switch for turning on and off an electrical power to the one or more magnetrons.

In at least one embodiment, the microwave modulator is configured to provide a first periodic modulation in time of the first microwave energy and a second periodic modulation in time of the second microwave energy, the first and the second periodic modulations having substantially the same amplitude and period but differing in phase by 180 degrees.

In at least one embodiment, the sum of the first and the second periodic modulations is substantially constant in time.

In at least one embodiment, the first periodic modulation comprises a first sinusoidal function in time for the first microwave energy and the second periodic modulation comprises a second sinusoidal function in time for the second microwave energy, the first and the second sinusoidal functions having substantially the same amplitude and period but differing in phase by 180 degrees.

In at least one embodiment, the oven further comprises a support controller for modulating in time the distance of the support from the first and the second microwave resonators.

In at least one embodiment, the oven is adapted to be powered by a voltage less than 220 volts.

In at least one embodiment, the voltage is between 110 and 125 volts.

In at least one embodiment, each of the first and the second microwave resonators comprises an upper resonator coupled to the one or more magnetrons and a lower resonator with an opening directed to the cooking chamber.

In at least one embodiment, at least one width of the lower resonator is substantially equal to the wavelength of a standing microwave in the upper resonator.

The present invention is also directed to an oven for cooking a food product, comprising a cooking chamber comprising a top, a bottom, and a support for receiving the food product for cooking, one or more magnetrons, one or more microwave resonators for directing a microwave energy generated by the one or more magnetrons into the cooking chamber, a conduit and one or more air blowers for providing a gas into the cooking chamber, a thermal energy source for heating the gas disposed in the conduit, a first tube for generating a first plume array of the heated gas from the conduit and introducing it into the cooking chamber, and a second tube for generating a second plume array of the heated gas from the conduit and introducing it into the cooking chamber, wherein the first and the second tubes are configured to respectively direct the first and the second plume arrays towards substantially opposite portions of the support at a non-zero angle less than 90 degrees with respect to the surface of the support, with the directions of the first and the second plume arrays crossing each other above the food product on the support in the cooking chamber.

In at least one embodiment, the oven further comprises an elevator for adjusting the height of the support.

In at least one embodiment, the height of the support is dynamically adjustable to optimize the cooking efficiency and power consumption for cooking the food product.

In at least one embodiment, the oven further comprises a return air opening for allowing the gas from the first and the second plume arrays to return from the cooking chamber to the conduit.

In at least one embodiment, the return air opening comprises a first return air opening positioned substantially at or along the intersection of the direction of the first plume array and the cooking chamber wall, and a second return air opening positioned substantially at or along the intersection of the direction of the second plume array and the cooking chamber wall.

In at least one embodiment, the conduit comprises one or more bottom air inlets, positioned substantially at the bottom of the cooking chamber, for diverting a portion of the heated gas to the bottom of the cooking chamber and directing it to the underside of the support.

In at least one embodiment, the oven further comprises an air modulator for controlling a flow rate of the heated gas through the one or more bottom air inlets.

In at least one embodiment, the air modulator comprises a damper valve for the one or more bottom air inlets.

In at least one embodiment, the air modulator comprises a bottom air diverter.

In at least one embodiment, the air modulator comprises a deflector in the conduit for hot air or in an air inlet housing encasing the inlets to the tubes.

In at least one embodiment, the one or more microwave resonators comprise one or more waveguides.

In at least one embodiment, each of the one or more microwave resonators comprises an upper resonator coupled to the one or more magnetrons and a lower resonator with an opening to the cooking chamber.

In at least one embodiment, the lower resonator comprises two feedhorns, each having a top aperture to the upper resonator and a bottom aperture to the cooking chamber.

In at least one embodiment, the two feedhorns are placed substantially in parallel, but diagonally off-set with respect to each other.

In at least one embodiment, each of the two feedhorns is in the shape of a truncated rectangular pyramid with the bottom rectangular aperture corresponding to the base of the pyramid, and the top rectangular aperture is smaller than the bottom rectangular aperture.

In at least one embodiment, the dimensions of the microwave resonator are designed to optimize the microwave-to-heat energy conversion.

In at least one embodiment, each of the first and the second tubes comprises a tube inlet coupled to the conduit and a tube outlet to the cooking chamber.

In at least one embodiment, each of the first and the second tubes is in the shape of an inverted truncated triangular prism with the tube inlet corresponding to the base of the prism.

In at least one embodiment, the area of the tube inlet is larger than the area of the tube outlet at a ratio substantially sufficient for forming a tight plume of the heated gas.

In at least one embodiment, the dimensions of the first and the second tubes are designed to optimize the formation of a plume of the heated gas having a long and narrow rectangular cross section.

In at least one embodiment, the oven further comprises a first flap and a second flap for respectively covering the first and the second tubes.

In at least one embodiment, the oven further comprises one or more motors for driving the first and the second flaps to open and close.

In at least one embodiment, the one or more motors are configured to open only one of the first and the second flaps, while keeping the other closed.

In at least one embodiment, the oven further comprises one or more lever arms driven by one or more solenoids to open and close the first and the second flaps.

In at least one embodiment, the oven further comprises a first flap and a second flap for respectively covering the tube inlets of the first and the second tubes.

In at least one embodiment, each of the first and the second flaps has substantially louvered edges to minimize air leakage when closed.

In at least one embodiment, each of the first and the second tubes comprises one or more spacers to keep the microwave energy from entering the tube.

In at least one embodiment, the one or more air blowers comprise a first air blower for directing the heated gas in the conduit to the first and the second tubes, and a second air blower for directing the heated gas in the conduit to the one or more bottom air inlets, wherein the first and the second air blowers are independently controllable.

In at least one embodiment, the one or more air blowers comprise a single speed air blower.

In at least one embodiment, the one or more microwave resonators comprise a first microwave resonator for directing a first microwave energy generated by the one or more magnetrons into the cooking chamber, and a second microwave resonator for directing a second microwave energy generated by the one or more magnetrons into the cooking chamber, wherein the first and the second microwave resonators are configured to respectively direct the first and the second microwave energies to propagate generally towards substantially opposite portions of the support at a non-zero angle less than 90 degrees with respect to the surface of the support, with the propagation directions of the first and the second microwave energies crossing each other at a distance from the support in the cooking chamber.

In at least one embodiment, the one or more magnetrons comprise a first magnetron for generating the first microwave energy, and a second magnetron for generating the second microwave energy.

In at least one embodiment, the propagation directions of the first and the second microwave energies are at a substantially 45-degree angle with respect to the surface of the support.

In at least one embodiment, the cooking chamber is dimensioned to match a microwave load of the oven.

In at least one embodiment, the cooking chamber is dimensioned in integer multiples of the wavelength of the microwave energy.

In at least one embodiment, at least one of the length, width and height of the cooking chamber is sized in integer multiples of the wavelength of the microwave energy.

In at least one embodiment, the first microwave resonator is positioned substantially near a first side of the top of the cooking chamber and the second microwave resonator is positioned substantially near a second side of the top of the cooking chamber, the first and the second sides being opposite sides of the top.

In at least one embodiment, the first side of the top comprises a left edge of the top and the second side of the top comprises a right edge of the top.

In at least one embodiment, the oven further comprises a microwave modulator for controlling each of the first and the second microwave energies.

In at least one embodiment, the microwave modulator is adapted to cause a time-dependent spatial variation in the sum of the first and the second microwave energies applied to the food product in the cooking chamber.

In at least one embodiment, the microwave modulator comprises a voltage regulator for modulating a voltage for the one or more magnetrons.

In at least one embodiment, the microwave modulator comprises a switch for turning on and off an electrical power to the one or more magnetrons.

In at least one embodiment, the oven further comprises an air modulator for controlling respective flow rates of the heated gas through the first and the second tubes.

In at least one embodiment, the air modulator is adapted to cause a time-dependent spatial variation in the sum of the first and the second plume arrays applied to the food product in the cooking chamber.

In at least one embodiment, the directions of the first and the second plume arrays are at a substantially 45-degree angle with respect to the surface of the support.

In at least one embodiment, the first tube is positioned substantially through a first half of the top of the cooking chamber, and the second tube is positioned substantially through a second half of the top.

In at least one embodiment, the conduit comprises a common top air inlet plenum enclosing the tube inlets for both of the first and the second tubes.

In at least one embodiment, the conduit comprises two separate top air inlet plenums respectively enclosing the tube inlets for the first tube and the tube inlets for the second tube.

In at least one embodiment, the first tube is adapted to focus the first plume array substantially at one side of the support, when the second tube is closed, the second tube is adapted to focus the second plume array substantially at the opposite side of the support, when the first tube is closed, and the first and the second tubes are adapted to focus the sum of the first and the second plume arrays substantially at the center of the support, when both are open.

In at least one embodiment, the oven further comprises a first return air opening positioned substantially at or along the intersection of the direction of the first plume array and the cooking chamber wall, and a second return air opening positioned substantially at or along the intersection of the direction of the second plume array and the cooking chamber wall.

In at least one embodiment, the first and the second tubes are configured to optimize the utilization of the first and the second plume arrays for cooking the food product whose surface area is substantially smaller than the surface area of the support.

In at least one embodiment, the oven is adapted to be powered by a voltage less than 220 volts.

An oven for cooking a food product according to another exemplary embodiment of the present invention comprises a cooking chamber comprising a top, a bottom, and a support for receiving the food product for cooking; a conduit and one or more air blowers for providing a gas into the cooking chamber; a thermal energy source for heating the gas disposed in the conduit; a first tube for generating a first plume array of the heated gas from the conduit and introducing it into the cooking chamber; and a second tube for generating a second plume array of the heated gas from the conduit and introducing it into the cooking chamber, wherein the first and the second tubes are located beneath the support and are configured to respectively direct the first and the second plume arrays towards substantially opposite portions of the support at a non-zero angle less than 90 degrees with respect to the surface of the support.

In at least one embodiment, the first and second tubes are removably located at the bottom of the cooking chamber.

In at least one embodiment, the oven further comprises a third tube, located between the first and second tubes, for generating a third plume array of the heated gas from the conduit and introducing it into the cooking chamber.

In at least one embodiment, the third tube directs the third plume array towards the support at an angle of approximately 90 degrees with respect to the surface of the support.

In at least one embodiment, the third tube is removably located at the bottom of the cooking chamber.

In at least one embodiment, the height of the third tube is smaller than the height of the first tube and the height of the second tube.

In at least one embodiment, the first and second tubes are each contiguous with the third tube.

In at least one embodiment, the oven further comprises a return air opening for allowing the gas from the first and the second plume arrays to return from the cooking chamber to the conduit.

In at least one embodiment, the return air opening comprises a first return air opening positioned substantially at or along the intersection of the bottom of the cooking chamber and a first side wall of the cooking chamber and a second return air opening positioned substantially at or along the intersection of the bottom of the cooking chamber and a second side wall of the cooking chamber located opposite the first side wall.

In at least one embodiment, the heated gas from at least one of the first plume array and the second plume array is drawn laterally across a bottom surface of the food product toward at least one of the first return air opening and the second return air opening.

In at least one embodiment, the oven further comprises a third tube for generating a third plume array of the heated gas from the conduit and introducing it into the cooking chamber, wherein the heated gas from the third plume array is drawn laterally across a bottom surface of the food product toward at least one of the first return air opening and the second return air opening.

In at least one embodiment, the oven further comprises an air modulator for controlling a flow rate of the heated gas through the first and second tubes.

In at least one embodiment, the oven further comprises an air modulator for controlling a flow rate of the heated gas through the third tube.

In at least one embodiment, each of the first and the second tubes comprises a tube inlet coupled to the conduit and a tube outlet to the cooking chamber.

In at least one embodiment, each of the first and the second tubes is in the shape of an inverted truncated triangular prism with the tube inlet corresponding to the base of the prism.

In at least one embodiment, the area of the tube inlet in each of the first and second tubes is larger than the area of the tube outlet at a ratio substantially sufficient for forming a tight plume of the heated gas.

In at least one embodiment, the dimensions of the first and the second tubes are designed to optimize the formation of a plume of the heated gas having a long and narrow rectangular cross section.

In at least one embodiment, the third tube comprises a tube inlet coupled to the conduit and a tube outlet to the cooking chamber.

In at least one embodiment, the third tube is in the shape of an inverted truncated triangular prism with the tube inlet corresponding to the base of the prism.

In at least one embodiment, the area of the tube inlet of the third tube is larger than the area of the tube outlet at a ratio substantially sufficient for forming a tight plume of the heated gas.

In at least one embodiment, the dimensions of the third tube are designed to optimize the formation of a plume of the heated gas having a long and narrow rectangular cross section.

In at least one embodiment, the one or more air blowers comprise an air blower that directs the heated gas in the conduit to the first and second tubes.

In at least one embodiment, the one or more air blowers comprise a single speed air blower.

In at least one embodiment, the directions of the first and the second plume arrays are at a substantially 45-degree angle with respect to the surface of the support.

In at least one embodiment, the direction of the third plume array is at a substantially 90-degree angle with respect to the surface of the support.

In at least one embodiment, the first tube is positioned substantially through a first half of the bottom of the cooking chamber and the second tube is positioned substantially through a second half of the bottom.

In at least one embodiment, the oven further comprises one or more magnetrons and one or more microwave resonators for directing a microwave energy generated by the one or more magnetrons into the cooking chamber.

In at least one embodiment, the oven is adapted to be powered by a voltage less than 220 volts.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIGS. 5A, 5B and 5C respectively illustrate various positions of an air modulating cover in an alternative embodiment viewed from the top.

FIGS. 6A, 6B, 6C, and 6D illustrate a tube used for hot air impingement in yet another alternative embodiment of the present invention.

FIGS. 8A, 8B, and 8C illustrate various views of another embodiment of the present invention.

FIGS. 12A, 12B, and 12C illustrate various views of a bottom plate used in accordance with another embodiment of the present invention.

FIGS. 13A and 13B illustrate plume arrays generated in at least one embodiment of the present invention.

FIGS. 14A and 14B illustrate plume arrays generated in at least one embodiment of the present invention.

DETAILED DESCRIPTION OF PREFERRED EMBODIMENTS

While the present invention will be described in terms of a stand-alone or counter-top high-speed cooking oven, it will be apparent to those skilled in the art that an oven according to the present invention may alternatively be implemented as a wall unit, a console model having feet adapted to rest on the floor, part of a vending machine, or other variations thereof.

Figure 1:
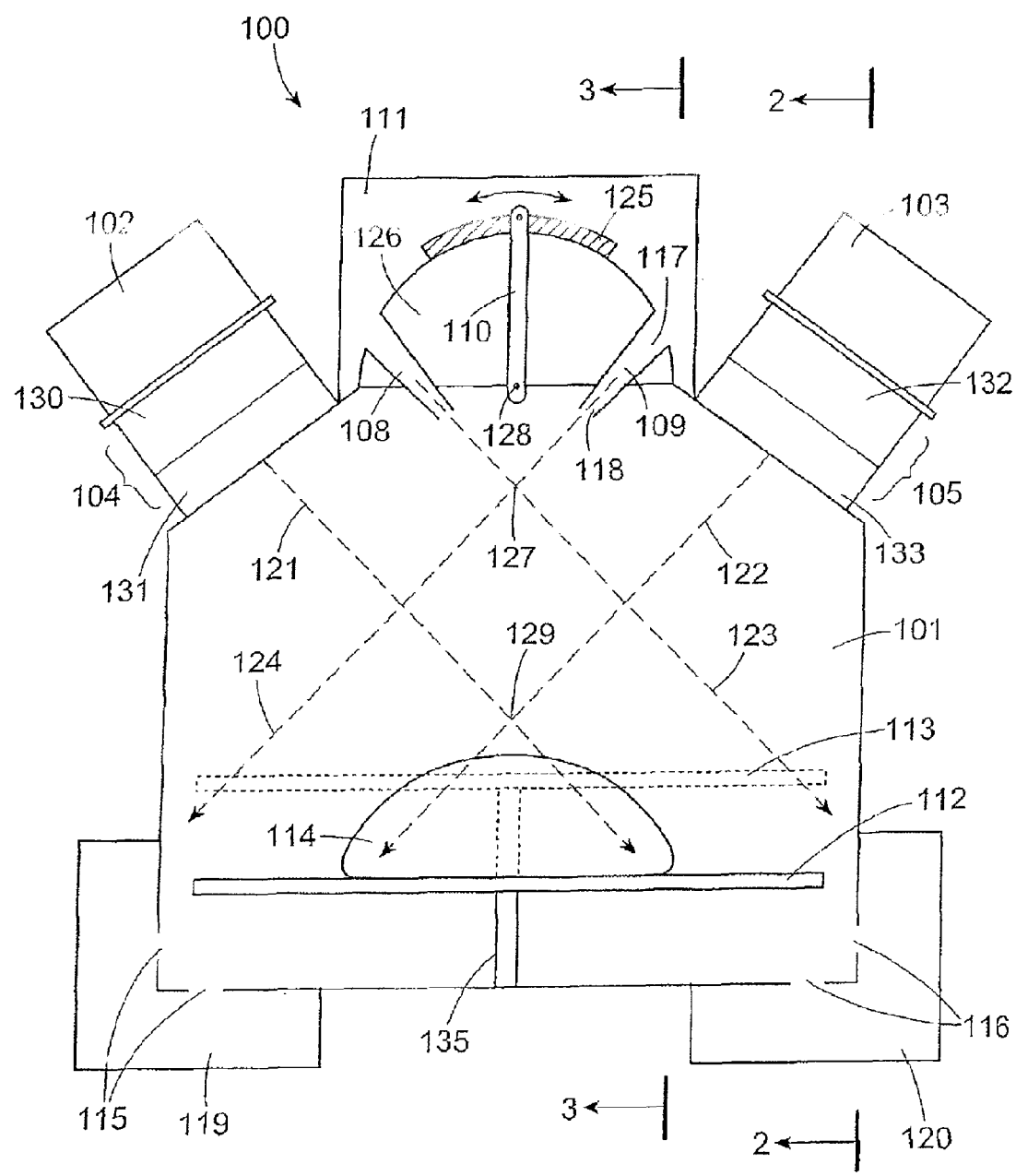
FIG. 1 illustrates a sectional view of an exemplary embodiment of the present invention.
Figure 2:
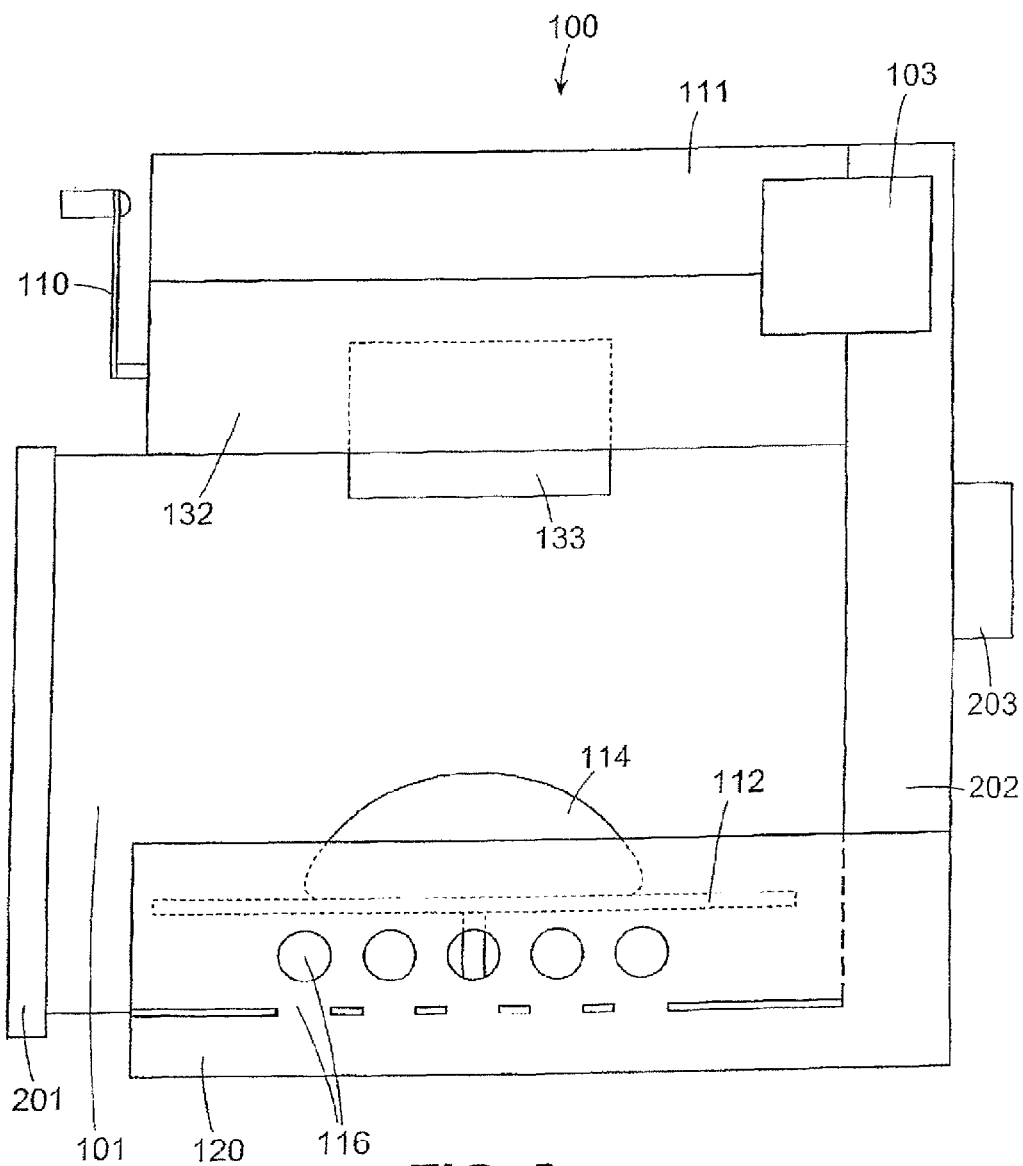
FIG. 2 illustrates another sectional view thereof taken along the line 2-2 of FIG. 1.
Figure 3:
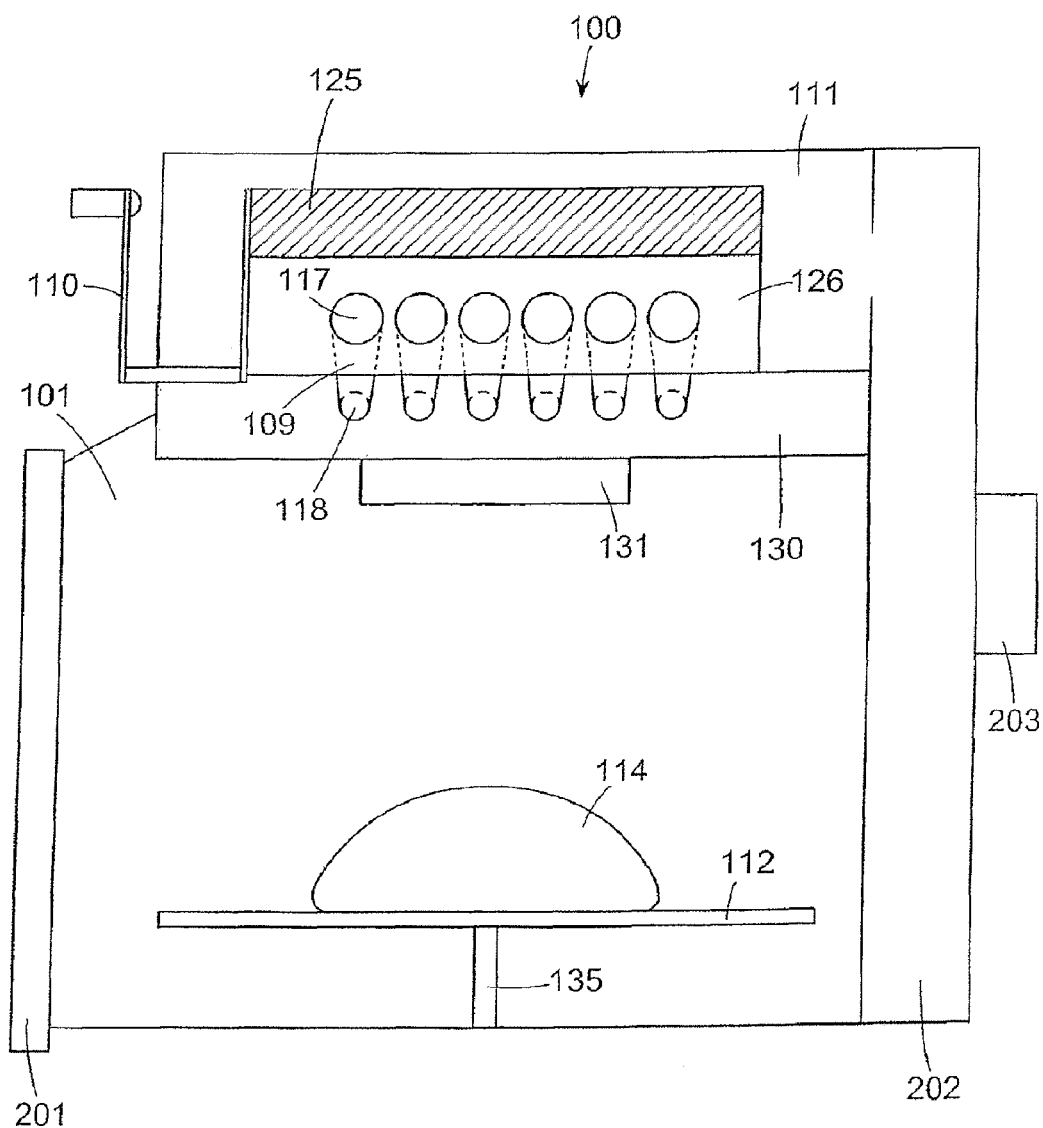
FIG. 3 illustrates yet another sectional view thereof taken along the line 3-3 of FIG. 1.

Referring now to the drawings, in particular to FIGS. 1-3 thereof, therein illustrated is a hybrid oven based on a combination of hot air impingement and microwave according to an exemplary embodiment of the present invention, generally designated by the reference numeral 100. It is first noted that these figures are merely schematic illustrations of an exemplary embodiment of the present invention based on various sectional views and are not intended to reflect the exact dimensions, scales or relative proportions of the oven 100 or components thereof, or the full engineering specification thereof, which should be apparent to those skilled in the art. FIG. 1 is a frontal sectional view of the oven, while FIG. 2 is a side sectional view of the oven taken along the line 2-2 of FIG. 1 and FIG. 3 is another side sectional view of the oven taken along the line 3-3 of FIG. 1. The oven 100 comprises a cooking chamber generally designated 101, which is adapted to receive a food product 114 to be placed on a support 112 for cooking. FIGS. 2 and 3 illustrate a door 201 through which the food product 114 can be received by the cooking chamber 101.

The support 112 may comprise a horizontally planar top surface to support the food product 114 and its corresponding bottom surface. The support may further comprise one or more holes or openings therein to facilitate gaseous communication between above the top surface and below the bottom surface of the support 112. The support 112 may be of any feasible shape, common shapes including rectangular and circular shapes. Referring to FIG. 1, when the "right side" and the "left side" of the support 112 are referred to in the following description, they are intended to refer to the two opposite sides of the support 112 as viewed in FIG. 1, wherein the "right" and the "left" are defined by the right and the left side walls of the cooking chamber 101. In alternative embodiments, the support 112 for receiving and holding a food product in the cooking chamber 101 may be in a non-planar form, such as horizontally or vertically positioned skewer. In these cases, the "right" and the "left" sides of the support correspond to the opposite ends of the skewer. It should be appreciated that the "left" and the "right" sides of the support as referred to in the description depend on the physical configuration of the support and the cooking chamber.

In at least one alternative embodiment of the present invention, the support 112 may be in the form of an elevator or may be coupled to an elevating mechanism so that the height of the support 112 with respect to the top and bottom of the cooking chamber may be dynamically adjusted during the cooking. As discussed further below, the dynamical adjustment of the height of the support 112 during the operation of the cooking oven may be used to optimize the cooking efficiency and power consumption of the cooking oven.

The cooking chamber 101, return air plenums 119, 120, an air conduit 202 and an air inlet housing 111 form an air circulation and delivery system of the oven 100. The terms "air" and "airflow" are used interchangeably with "gas" and "gas flow" in this description unless otherwise noted. As shown in FIG. 1, the return air plenums 119, 120 may be positioned adjacent to the bottom portion of the cooking chamber 101 and are adapted for gaseous communication with the cooking chamber 101 through return air exit holes 115, 116. FIG. 1 shows that these return air exit holes 115, 116 are positioned below and in the proximity of the left and the right sides of the support 112, respectively. They are adapted to receive the air flow from within the cooking chamber 101 to be guided to the air conduit 202. While not shown in the figure, the return air exit holes 115, 116 may comprise gates which can be opened or closed based on an external control.

The return air plenums 119, 120 are connected to an air conduit 202 (shown in FIG. 2), which may be vertically disposed on the back side of the oven 100 opposite from the oven door 201. The air conduit 202 allows gaseous communication between the return air plenums 119, 120 and the air inlet housing 111 positioned on the top of the cooking chamber 101. For the sake of simplicity, the interconnected air circulation and delivery system of the air conduit 202, the return air plenums 119, 120, and the air inlet housing 111 will be referred to as a conduit. While not shown in the figures, a thermal energy source, such as parallel heating coils, may be coupled to or disposed in the air conduit 202 to heat the air disposed therein. In an alternative embodiment, instead of a single joint air conduit 202, each of the return air plenums 119, 120 may have its own air conduit for gaseous communication with the air inlet housing 111. FIGS. 2 and 3 show a hot air blower 203 which circulates the air in the air circulation and delivery system defined by the cooking chamber 101, the return air plenums 119, 120, the return air conduit 202 and the air inlet housing 111, and provides the desired hot airflow onto the food product 114 placed on the support 112 in the cooking chamber 101.

The air inlet housing 111 positioned on the top of the cooking chamber 101 provides the hot air flow in the form of air impingement into the cooking chamber 101 through at least two nozzles (or impingement tubes) 108 and 109. The two sets of nozzles 108 and 109 are respectively positioned on the opposite sides of a semi-cylindrical base 126 (shown as a semi-circle in the sectional view in FIG. 1) on the top of the cooking chamber 101 in the air inlet housing 111. FIG. 3 shows a row of six nozzles 109 on one side of the base 126. While not shown in any figure, there is another row of six nozzles 108 on the other side of the base 126, with each of the nozzles 108 positioned on one side of the base 126 directly opposite to the corresponding one of the nozzles 109 on the other side of the base 126. Each nozzle 108, 109 has a tubular structure of a given height, and is subtended at one end by a circular inlet orifice 117 positioned within the air inlet housing 111 and at the opposite end by a circular exit orifice 118 protruding in the cooking chamber 101. The nozzle exit orifices direct columnated flows of hot air (air impingement) into the cooking chamber 101. The nozzles are preferably made of a suitably strong and sturdy material (e.g., steel) that can withstand the temperature and pressure of the hot air flowing or being blown through the nozzles.

In at least one alternative embodiment of the present invention, in addition to the nozzles 108 and 109 shown in FIG. 1, or other means of hot air impingement protruding substantially from the top of the cooking chamber 101, one or more air inlets or another set of nozzles may be placed below the support 112 substantially at the bottom of the cooking chamber 101 to direct a hot air flow or hot air impingement to the underside of the support 112. In this exemplary embodiment, the conduit may further comprise a bottom air plenum from which the heated air may be directed to the underside of the support 112 via the one or more air inlets or bottom nozzles. The bottom air plenum is connected to the air conduit 202 and-or the air inlet housing 111 to divert a portion of the heated air to the bottom of the cooking chamber.

The amount of the heated air diverted from the air conduit 202-air inlet housing 111 to the bottom air plenum may be controlled or modulated by using a damper valve or a bottom air diverter. Alternatively, or in addition, the air inlet housing 111 may further comprise a deflector, which can affect the amount of heated air diverted to the bottom air plenum relative to the amount of the hot air flow from the top of the cooking chamber. By controlling the diversion of the heated air into the bottom air plenum, one can also control the amount of the heated air introduced from the top of the cooking chamber 101 through, for example, the top nozzles 108 and 109, thereby modulating its flow rate and velocity. In this way, even if the hot air blower 203 is driven by a single speed motor, one can achieve the substantially similar kind of hot air flow modulations that can be achieved by a significantly more expensive variable speed blower.

In at least one alternative embodiment of the present invention, instead of just one hot air blower 203 for the entire conduit, there may be two independently controllable hot air blowers, one for directing the heated gas in the conduit to the air inlet housing 111 on the top of the cooking chamber 101, and the other for directing the heated gas to the bottom air plenum.

It is also noted that by dynamically adjusting the height of the support 112 and thereby changing the distance of the food product 114 to the top nozzles 108 and 109 relative to the bottom air inlets or nozzles, one may achieve the effect substantially similar to the one achieved by modulating the amount of hot air flowing through the top nozzles 108 and 109 relative to the one flowing through the bottom air inlets or nozzles, with the support 112 being kept at a constant height.

In yet another alternative embodiment of the present invention (e.g., wherein the support for the food product in the cooking chamber is a horizontally positioned skewer), in addition to or as an alternative to the nozzles 108 and 109 protruding from the top of the cooking chamber 101, two corresponding sets of nozzles may be positioned to protrude from the bottom of the cooking chamber 101 to project the air impingements upwards towards the food product supported by the horizontal skewer. In yet another alternative embodiment of the present invention (e.g., wherein the support for the food product in the cooking chamber is a vertically positioned skewer), instead of the nozzles 108 and 109 protruding from the top of the cooking chamber, two sets of nozzles may be positioned to protrude respectively from, for example, the upper portion and the lower portion of a side wall of the cooking chamber. It should be appreciated that, depending on the physical configuration of the cooking chamber and the support for a food product therein, two sets of nozzles for the air impingement may be positioned in various possible places in the cooking chamber to accomplish the substantially similar "sweeping" effects that are to be described below.

Referring back to FIG. 1, two sets of nozzles (i.e., the left nozzles 108 and the right nozzles 109) on the opposite sides of the base 126 are adapted to direct the air impingements in respective directions 123 and 124 as indicated by the dotted lines coming out of the corresponding exit orifices. These directions 123 and 124 are at an angle with respect to the vertical axis of the cooking chamber 101 (or the horizontal plane of the support 112) and cross at a point 127 above the support 112, preferably vertically above the midpoint between the left and the right sides of the support 112 and preferably above the upper surface of any food product 114 placed on the support 112. In this configuration, the respective air impingements coming out of the left and the right nozzles 108 and 109 at the same time at the given angle would collide at the crossing point 127 at a distance from the support 112. If the energies of the air impingements from both nozzles 108 and 109 are equal (i.e., if the flow rates of both nozzles 108 and 109 are same), the net result of such collision would be a net air impingement directed substantially vertically downward from the crossing point 127 toward the point on the support directly below the crossing point 127, preferably the midpoint between the left and the right sides of the support 112. In an alternative embodiment wherein two sets of nozzles are positioned to protrude from the bottom of the cooking chamber and configured to project the air impingements upwards, the crossing point of the respective air impingements may be located below the support for the food product in the cooking chamber. In yet another alternative embodiment wherein the support is vertically positioned (e.g., a vertical skewer) and two sets of nozzles are positioned to protrude from a side wall of the cooking chamber, the crossing point of the respective air impingements may be located at a horizontal distance from the vertical midpoint of the support.

As indicated by the direction 123, the nozzle 108 on the left side of the base 126 directs the air impingement toward the right half of the cooking chamber 101, preferably toward a general area in the proximity of the right side of the support 112. In mirror symmetry, the nozzle 109 on the right side of the base 126 directs the air impingement toward the left half of the cooking chamber 101, as indicated by the direction 124, preferably toward a general area in the proximity of the left side of the support 112. Accordingly, the left and the right nozzles 108 and 109 are configured to generally direct the respective air impingements to the opposite portions of the food product 114 placed on the support 112. It should be appreciated that the "left side" and the "right side" of the support 112 to which the respective air impingements from the nozzles 109 and 108 are generally directed may correspond to any opposite portions of a food product placed on or held by the support. There may be various possible choices for the "left side" and the "right side" of the support depending on the physical configuration of the support and the cooking chamber.

The angle formed by the directions 123 and 124 with respect to the vertical axis of the cooking chamber 101 is determined by where the respective air impingements from the nozzles 108 and 109 are targeting. As an example, FIG. 1 shows that the directions 123 and 124 form an angle of roughly 45 degrees with respect to the vertical axis of the cooking chamber 101 and meet at the crossing point 127 at an angle of roughly 90 degrees. However, these angles may vary depending on the dimensions of the cooking chamber 101 and the support 112, as well as the relative positions of the nozzles 108 and 109.

Figure 4A:
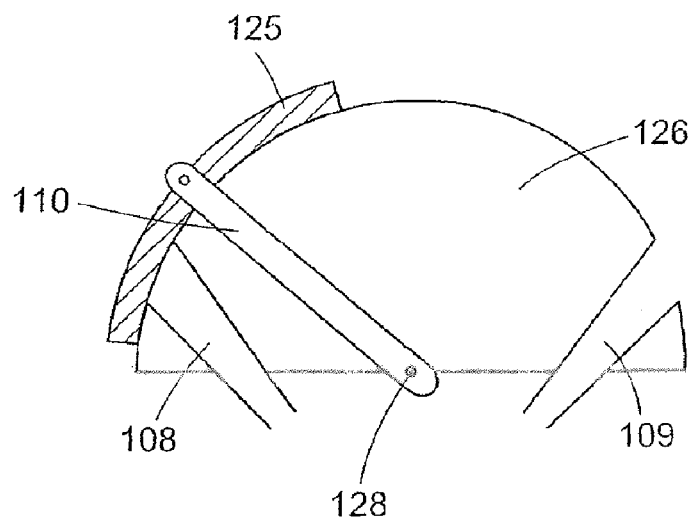
FIGS. 4A, 4B and 4C respectively illustrate various positions of an air modulating cover for controlling the flow rate of the nozzles for air impingement.
Figure 4B:
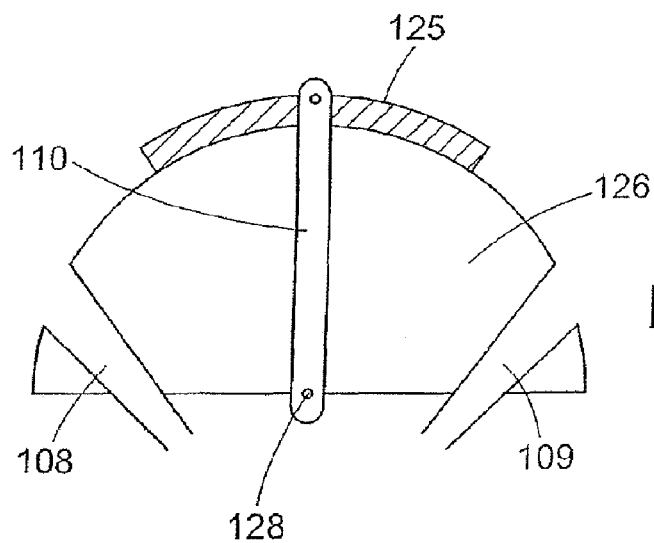
Figure 4C:
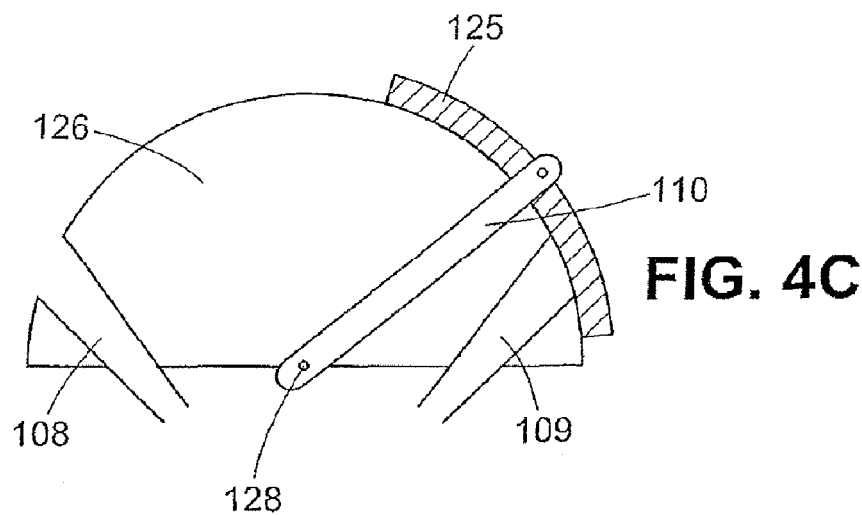

A flow rate of a nozzle may be determined by the dimension of the nozzle and the pressure of hot air into the nozzle. By controlling the input area of the nozzle for the hot air to flow through and thereby effectively changing the dimension of the nozzle, one may modulate the flow rate of the nozzle and consequently its corresponding air impingement applied to the food product 114 in the cooking chamber 101. This air modulation can be achieved by various means, including both manual and automatic control means. As an example, FIG. 1 shows that the oven 100 has an air modulator in the form of a cover 125 impermeable to the air that is configured for and capable of rotationally sliding over the outer surface of the semi-cylindrical base 126 containing two rows of the nozzle inlet orifices 117. This air modulating cover 125 is dimensioned to completely cover, at one time, a portion of the surface of the semi-cylindrical base 126 containing one row of the nozzle inlet orifices 117 so that no hot air may flow into the corresponding nozzles, while allowing the hot air in the air inlet housing 111 to flow into the nozzles positioned on the opposite side of the base 126. This situation is illustrated in FIGS. 4A and 4C. In FIG. 4A, the air modulating cover 125 is positioned to cover the row of the nozzle inlet orifices on the left side of the base 126 so that the air impingement is generated only through the nozzles 109 on the right side of the base 126. In FIG. 4C, the air modulating cover 125 is now positioned to cover the row of the nozzle inlet orifices on the right side of the base 126 so that the air impingement is generated only through the nozzles 108 on the left side of the base 126. When positioned properly, the air modulating cover 125 may be dimensioned to allow the equal amount of hot air in the air inlet housing 111 to flow into each nozzle in the both rows of nozzles 108 and 109 on the opposite sides of the base 126. This is illustrated in FIG. 4B.

As shown in FIG. 1, the position of the air modulating cover 125 on the outer surface of the base 126 may be controlled manually by a handle 110, which is coupled to the air modulating cover 125 through a hinge point 128. In this configuration, a manual torque may be exerted on the handle 110 to rotate the position of the air modulating cover 125 around the hinge point 128.

In an alternative embodiment, the position of the air modulating cover 125 may be controlled automatically by, for example, a suitable electro-mechanical control device known to those skilled in the art. Such automatic control means may facilitate a periodic change in the position of the cover 125 to create periodic modulations (e.g., sinusoidal modulations, periodic step function modulations, etc.) in time of the respective flow rates for the nozzles 108 on the left side of the base 126 and the nozzles 109 on the right side of the base 126. This periodic change in the position of the air modulating cover 125 to cover the nozzles 108 on the left side of the base 126 and the nozzles 109 on the right side of the base 126 alternatively in time may provide respective periodic modulations in the flow rate of the left and the right set of nozzles 108 and 109 that have the same amplitude and period, but differ in phase by 180 degrees. When the total amount of the hot air disposed in the air inlet housing 111 is maintained to be constant, the sum of the periodically modulated flow rates for the both sets of nozzles 108 and 109 also remains constant in time.

Figure 5A:
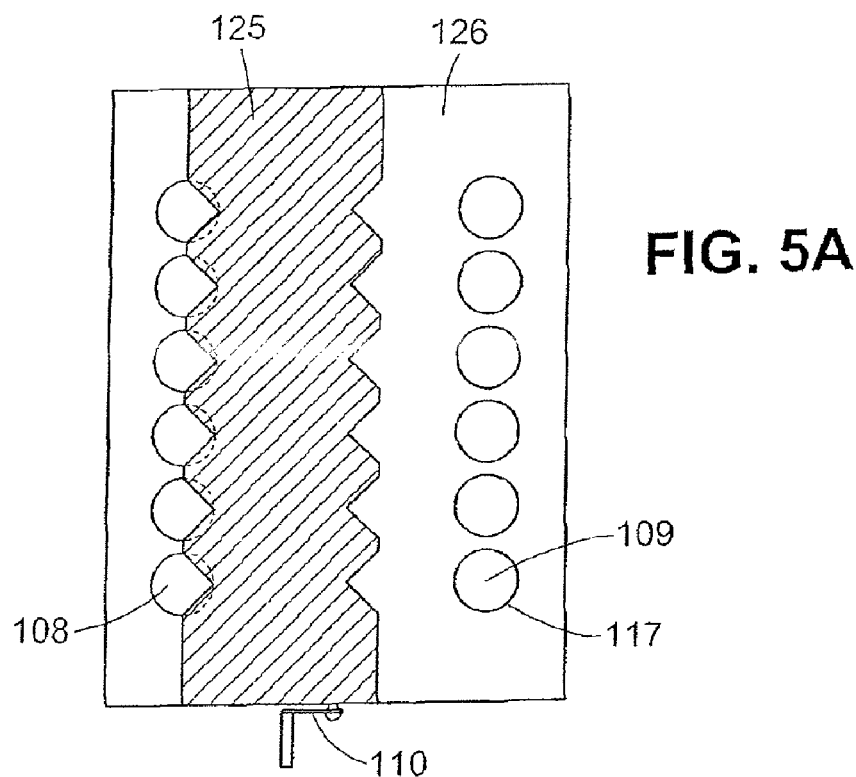
Figure 5B:
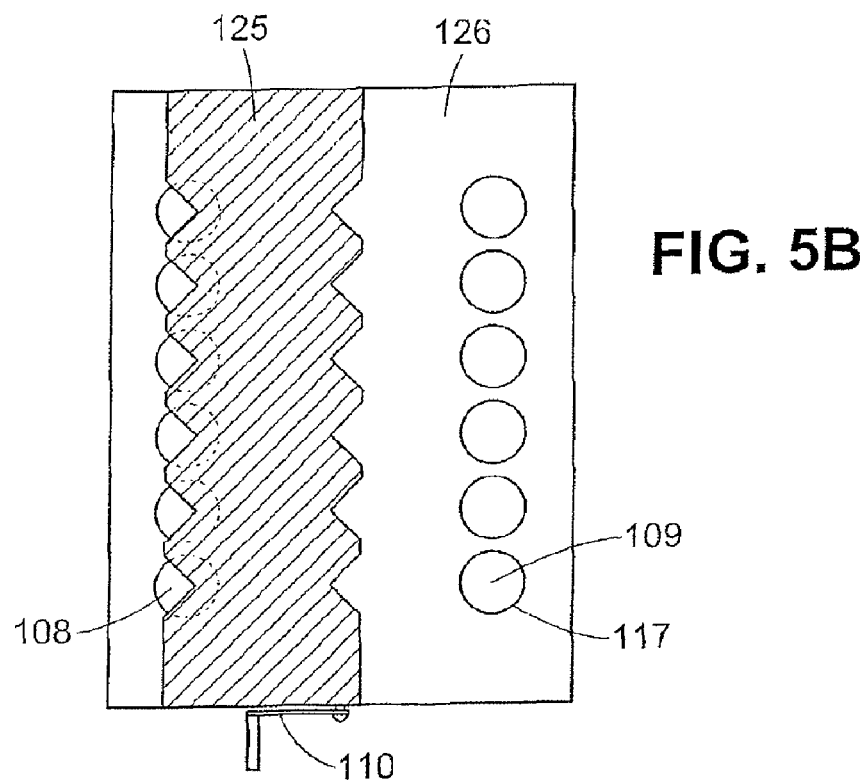

In another alternative embodiment, the side edges of the air modulating cover 125, which respectively slide over the inlet orifices of the left and the right nozzles 108 and 109 during the modulation of the respective flow rates, may be specially shaped or indented to facilitate a more gradual modulation in the flow rates in time and a gradual transition between the opening and the closing of the nozzles. FIGS. 5A-5C illustrate various positions of one exemplary air modulating cover 125, viewed from the top, comprising side edges having triangular indents at the positions corresponding to the nozzle inlet orifices on the surface of the base 126. FIG. 5A shows the left side edge of the air modulating cover 125 just starting to partially cover the inlet orifices of the left nozzles 108. If the side edges were straight as illustrated in FIG. 3, the air modulating cover 125 would have covered the half of the input area of the inlet orifices of the left nozzles 108, but because of the triangular indents on the side edge, the air modulating cover 125 only a small portion of the inlet orifices. FIG. 5B shows the left side edge of the air modulating cover 125 partially covering the inlet orifices of the left nozzles 108. Again, if the side edge were straight, the air modulating cover 125 would have completely covered the inlet orifices, but because of the triangular indents, there are small openings between the air modulating cover 125 and the inlet orifices to let the hot air to flow through. FIG. 5C illustrates the position of the air modulating cover 125 in which the inlet orifices of the left nozzles 108 are finally and completely covered by the cover. Instead of triangular indents, one may alternatively use elliptical indents, semicircular indents or any other shape of the side edges of the air modulating cover 125 that may facilitate a gradual transition between the opening and the closing of the inlet orifices of the nozzles 108 and 109 by the air modulating cover 125.

In yet another alternative embodiment of the present invention, instead of the air modulating cover 125, an air modulator may comprise other feasible means of controlling the flow rate of the hot air through each nozzle. For example, each nozzle may have a gate-like structure which may be shut or open based on an external switch or a command from an external control unit. Such gate-like structure may be placed either at the nozzle inlet orifice, or at the nozzle exit orifice, or at any other suitable place within the nozzle. In another example, the gate-like structure may be capable of varying or adjusting, possibly periodically, the size of the opening through an external control to permit a desired modulation of the flow rate through the nozzle.

The configuration of the nozzles 108, 109 and the air modulating cover 125 for controlling the flow rate of each nozzle as illustrated in FIG. 1 and described above may be operated to cause a time-dependent spatial variation in the net impact or net energy profile of the air impingement applied to the food product 114 placed on the support 112 in the cooking chamber 101 in the following exemplary way. Referring to both FIGS. 1 and 4A, for a predetermined time period, the air modulating cover 125 is positioned on the left side of the base 126 completely covering the inlet orifices of the left nozzles 108, thereby allowing only the right nozzles 109 to provide the air impingement into the cooking chamber 101. As indicated by the general direction 124 of the air impingement from the right nozzles 109, this configuration causes the net impact or energy of the air impingement from the nozzles to be concentrated in the area in the left half of the cooking chamber 101 where the right nozzles 109 are targeting, preferably in the general area in the proximity of the left side of the support 112.

After this time period, as the air modulating cover 125 rotationally slides to the right, away from the inlet orifices of the left nozzles 108, the amount of hot air introduced into the left nozzles 108 increases from zero and at the same time, the amount of the hot air available to the right nozzles 109 starts to decrease. The resulting increasing momentum of the air impingement from the left nozzles 108 in the general direction 123, which collides with the air impingement from the right nozzles 109 at the crossing point 127, would cause the area where the net impact or energy of the air impingement is concentrated to move to the right on the support 112.

Now referring to FIGS. 1 and 4B, for another predetermined time period, the air modulating cover 125 is positioned between the inlet orifices of the left and the right nozzles 108 and 109 so that it allows the equal amounts of the hot air to flow into both the left and the right nozzles 108 and 109. As described above, the respective air impingements having the same energies coming out of the left and the right nozzles 108 and 109 at the same time collide at the crossing point 127, and as a result, the net air impingement is directed vertically downward from the crossing point 127 to the support 112, preferably to the midpoint between the left and the right sides of the support 112. Accordingly, the area where the net impact or energy of the air impingement is concentrated has moved from the left and is now in the general area in the middle of the support 112 or the upper surface of the food product 114 above this general area.

After this time period, as the air modulating cover 125 rotationally slides further to the right, to cover the inlet orifices of the right nozzles 109, the amount of hot air introduced into the right nozzles 109 steadily decreases to zero. The resulting decrease in the momentum of the air impingement from the right nozzles 109 in the general direction 124 would cause the net impact area of the air impingement to further move toward the right on the support 112.

Referring now to both FIGS. 1 and 4C, for yet another predetermined time period, the air modulating cover 125 is now positioned on the right side of the base 126 completely covering the inlet orifices of the right nozzles 109, thereby allowing only the left nozzles 108 to provide the air impingement into the cooking chamber 101. As indicated by the general direction 123 of the air impingement from the left nozzles 108, this configuration causes the net impact or energy of the air impingements from the nozzles to be concentrated in the area in the right half of the cooking chamber 101 where the left nozzles 108 are targeting, preferably in the general area in the proximity of the right side of the support 112.

In this way, the concentration of the net impact-energy of the air impingement from the nozzles may "sweep" across the food product 114 in the cooking chamber 101 from the left to the right and vice versa over time in a controlled manner, thereby facilitating even horizontal distribution of heat energy transfer from the air impingement to the food product and further improving the cooking efficiency of the oven 100. Furthermore, compared to the conventional high-speed cooking ovens based on air impingement, this capability of providing a time-dependent spatial variation of the net impact-energy profile of the air impingement helps to reduce the heat energy loss to the walls of the cooking chamber 101, and minimize the needs for a variable speed motor for the hot air blower 203, the air velocity modulation through dampening, or the modulation of the air heat through adjusting the power of the thermal energy source in the conduit 202. All of these add up to optimize the overall cooking efficiency of the oven 100.

The capability of providing a time-dependent spatial variation of the net impact-energy profile of the air impingement may also be applied to overcome or alleviate the inefficiency arising from the water steam carrying away thermal energy from the food product starting at the temperature of 212° F. as described in the Background section. For example, referring to FIGS. 1 and 4A-C, the air modulating cover 125 is first positioned as illustrated in FIG. 4A so that the net energy of the air impingement is concentrated in the proximity of the surface of the left side of the food product 114. This configuration is maintained until the left side of the food product 114 reaches a temperature slightly under 212° F. Next, the air modulating cover 125 is positioned as illustrated in FIG. 4B, causing the net energy of the air impingement to be generally concentrated in the middle of the food product 114. When the surface of the middle portion of the food product 114 reaches a temperature slightly under 212° F., then the air modulating cover 125 rotationally slides further to the right as illustrated in FIG. 4C, causing the net energy of the air impingement to be concentrated in the proximity of the surface of the right side of the food product 114. This configuration is maintained until the temperature of the surface of the right side of the food product 114 reaches slightly under 212° F. Meanwhile, the heat energies previously transferred to the surfaces of the left side and the middle portion of the food product 114 are dispersed downward below the surface to heat up the inner mass of the food product 114. The above air modulating steps may be repeated, periodically in time, until the internal temperature of the food product 114 in the cooking chamber 101 reaches a desired level.

By maintaining the temperature of the different portions of the surface of the food product 113 slightly under 212° F. and allowing them to disperse the transferred heat energies to the inner mass of the food product alternately at different times, the loss of thermal energy to the water steam from the surface of the food product may be minimized and therefore the efficiency of heat transfer from the air impingement to the food product may be optimized. As to be described below, this can also be done in conjunction with microwave modulations.

In addition, the configuration of the nozzles 108, 109 and the air modulating cover 125 for controlling the flow rate of each nozzle as illustrated in FIG. 1 and described above may be operated in conjunction with the return air exit holes 115, 116 to modulate the air flow below the bottom of the support 112 as follows. For example, the air modulating cover 125 may operate in synchronization with the opening and closing the gates for the left and the right return air exit holes 115 and 116, respectively. When the air modulating cover 125 is positioned as illustrated in FIG. 4A so that the air impingement comes from only the right nozzles 109 toward the left half of the cooking chamber 101, there is consequently a concentration of air flows around the left side of the support 112 compared to the minimal air flows around the right side of the support. By keeping the gates of the left return air exit holes 115 closed and the gates of the right return air exit holes 116 open, the concentration of air flows from around the left side of the support 112 is forced to flow below the full horizontal width of the support 112 from the left end to the right end and exit through the right return air exit holes 116. On the other hand, when the air modulating cover 125 is positioned as illustrated in FIG. 4C so that the air impingement comes from only the left nozzles 108 toward the right half of the cooking chamber 101, there is consequently a concentration of air flows around the right side of the support 112 compared to the minimal air flows around the left side of the support. By keeping the gates of the right return air exit holes 116 closed and the gates of the left return air exit holes 115 open, the concentration of air flows from around the right side of the support 112 is forced to flow below the full horizontal width of the support 112 from the right end to the left end and exit through the left return air exit holes 115. In this way, the air modulating cover 125 and the controller for opening and closing the gates of the return air exit holes 115, 116 can modulate the direction of return air flow beneath the support 112, thereby maximizing the use of the air returning to the return air plenums 119, 120, facilitating the heat transfer to bottom of the support 112 (and consequently the bottom of the food product 114 placed on the support 112) and thereby further optimizing the cooking efficiency of the oven 100. In an alternative embodiment of the present invention, the oven 100 may further comprise another set of nozzles for providing additional hot air flow or air impingements to the bottom of the support 112 to further improve the cooking efficiency of the oven 100.

The nozzles 108, 109 are designed in view of optimizing the air impingements into the cooking chamber 101 and, more importantly, the overall cooking efficiency of the oven 100. Various factors may be taken into account in the design of the nozzles 108, 109 in this regard. As noted in the Background section, the more distant the cross section of an air plume or a hot air column is from the nozzle exit orifice 118, the greater its diameter-cross-sectional area becomes, resulting in reduction in the efficiency of the air impingement. Such expansion of the air plume may be reduced by increasing the speed of the hot air flowing from the nozzles (or the flow rate of the nozzles), which may be achieved by a suitable configuration of the shape and dimension of the nozzles 108, 109. For example, increasing the height of the nozzles may facilitate an increase in the velocity of the air flowing through the nozzles.

However, the flow rate of the nozzles may be limited by the capacity, size, and-or power requirement of the hot air blower 203. In addition, while the increase in the flow rate of the nozzles may improve the efficiency of the air impingement, it needs to be counterbalanced by the concern for the spotting problem as discussed in the Background section, as well as the concern for the potential damages to the food product 114, in particular its visual appearance, due to the rapidly moving hot air. Furthermore, the desire to increase the height of the nozzles 108, 109 to increase their flow rate needs to be counterbalanced by the need to keep the height, and therefore the size, of the oven 100 to a minimum in order to optimize its overall cooking and operating efficiency. When these factors are taken into consideration, it is found that the optimal efficiency in air impingement and optimal cooking efficiency may be achieved with the nozzles 108, 109 having a height of approximately 3 inches and an air speed at the nozzle exit orifice of roughly 25 miles per hour when the food product 114 is between 4 and 12 inches from the nozzle exit orifices.

It is also found that the effective length of the air plume or air impingement generally increases with the increase in the ratio of the area of the nozzle inlet orifice 117 to the area of the nozzle exit orifice 118. Accordingly, the ratio needs to be taken into account when optimizing the efficiency of the air impingement and the overall cooking efficiency of the oven 100. For a nozzle having the height of 3 inches, it is found that the optimal ratio of the nozzle inlet orifice 117 area to the nozzle exit orifice 118 area is roughly 4:1. While a ratio greater than this optimal ratio still leads to a greater effective length in the air plume, a diminished return appears to result from any additional increase in the ratio.

Figure 6B:
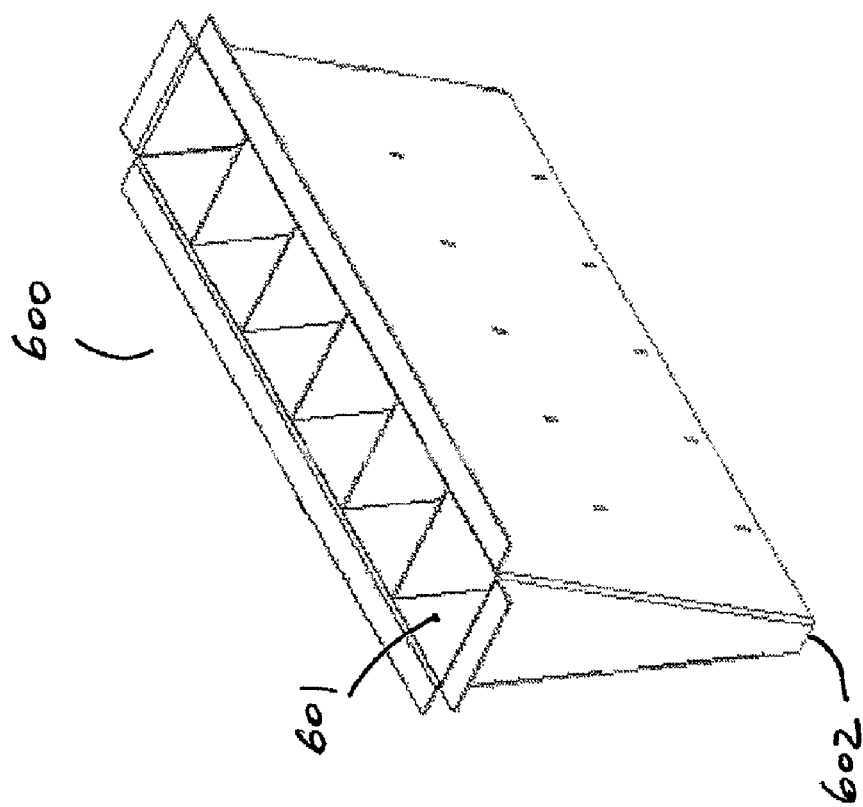
Figure 6A:
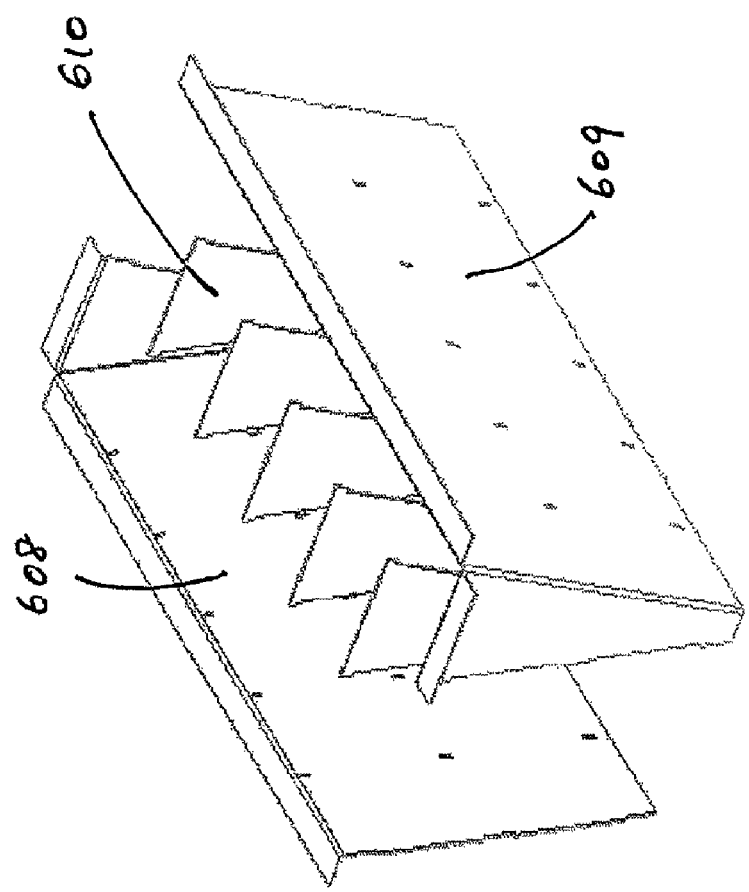

In at least one alternative embodiment of the present invention, instead of a row of nozzles 109 as shown, for example, in FIG. 3, a tube as shown in FIG. 6B may be used to provide a hot air flow or impingement into a cooking chamber of the oven. FIGS. 6A and 6B illustrate respectively one possible example of a tube before and after assembly. FIG. 6A shows components 608 and 609 for a tube body and one or more slats or spacers 610. These components may be made of sheet metal. FIG. 6B shows the tube 600 after these components are assembled together. Each tube has a tube inlet 601 coupled to an air conduit and-or air inlet housing of the oven to receive a heated gas, and a tube outlet 602 coupled to a cooking chamber of the oven to provide the heated air into the cooking chamber in the form of a hot air plume array. The tube 600 of FIG. 6B could be a cheaper alternative to a row of nozzles while providing a substantially similar performance.

In this exemplary embodiment, the tube 600 may be in the shape of an inverted truncated triangular prism, with the tube inlet 601 corresponding to the base of the prism and the tube outlet 602 corresponding to the truncated top of the prism. As shown in FIG. 6B, the tube inlet 601 is larger than the tube outlet 602 at a ratio optimized to form a tight plume of heated gas. Preferably, the dimension of the tube 600 is designed to optimize the formation of a plume array of heated gas and thereby the performance of the cooking oven. The length of the tube is preferably long enough to establish a directional flow of heated gas in the form of a plume, but not too long so as to require the height of the cooking oven to be objectionable in terms of cost and size considerations. Each tube is preferably wide enough to introduce a sufficient volume of heated gas into the cooking chamber to rapidly cook a food product in the cooking oven. At the same time, the tube outlet 602 is preferably narrow to facilitate the formation of a tight plume. The tube 600 illustrated in FIG. 6B is an exemplary embodiment taking into account these foregoing considerations. Unlike the columns of heated air having a row of circular cross sections, such as the one generated by a row of nozzles 109 shown in FIG. 3, a plume array generated by the tube 600 in FIG. 6B is a planar band of moving heated gas having a rectangular cross section, substantially narrow in one direction but substantially wide in the perpendicular direction.

As shown in FIGS. 6A and 6B, the slats or spacers 610 may be placed within the inside of the tube 600, uniformly spaced in parallel. The spacers 610 serve to prevent microwave energies in a cooking chamber from entering the tube 600. For this purpose, the spacers 610 are preferably less than 1.2 inches spaced apart from each other. FIGS. 6A and 6B shows that each of the spacers 610 may extend from the tube outlet 602 to the tube inlet 601. In an alternative embodiment, each spacer 610 may extend, for example, only about half an inch inward from the tube outlet 602. While both examples serve to substantially prevent microwave entry into the tube 600, it appears that the longer version of the spacer 610, extending from the tube outlet 602 to the tube inlet 601 as shown in FIGS. 6A and 6B, better enables the evenness of the hot air flow along the width of the tube compared to the shorter version.

Figure 6D:
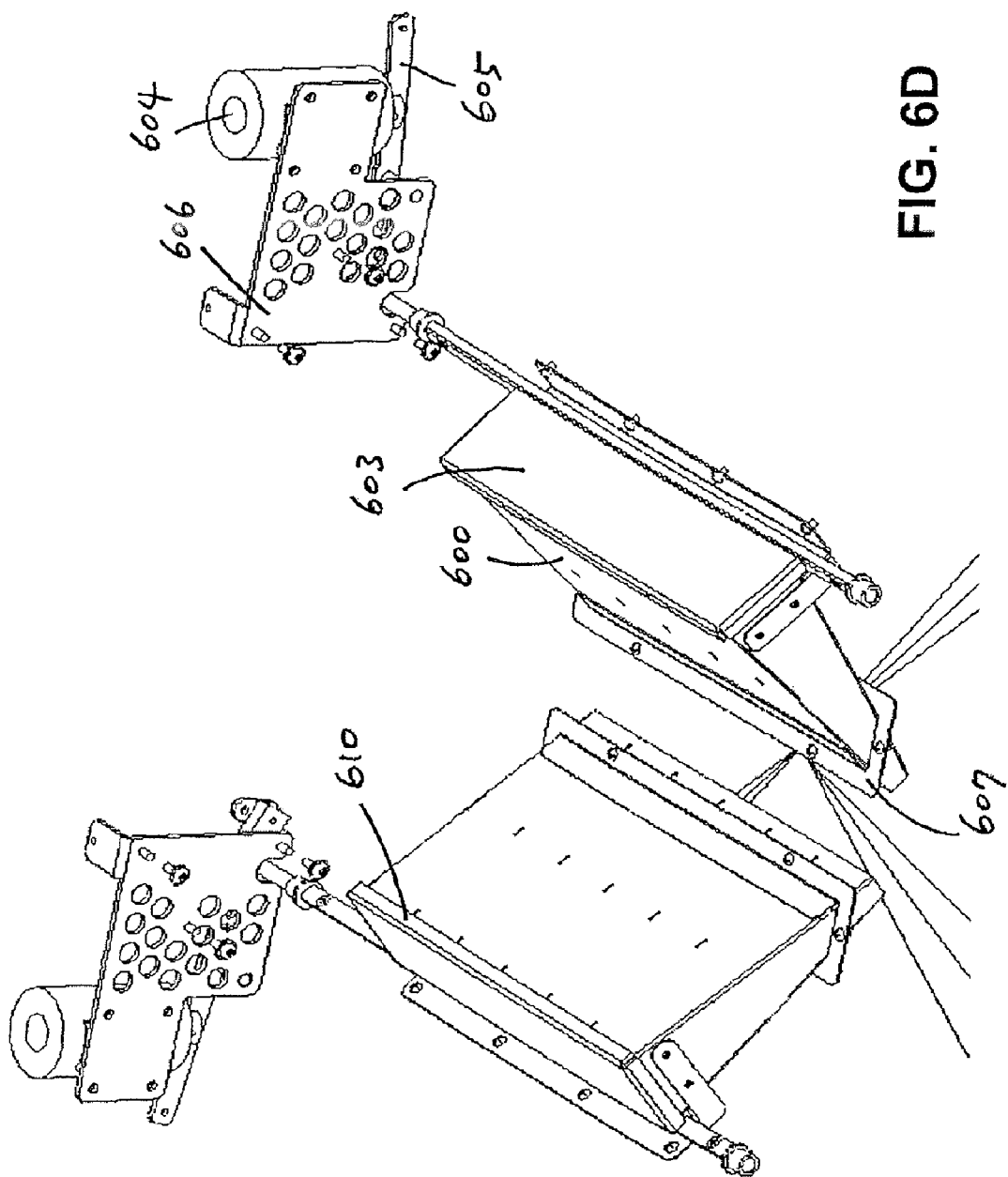

Analogous to the air modulating cover 125 of FIG. 1, a flap 603 as shown in FIG. 6C may be used to control the air flow through the tube 600 by covering and opening the tube inlets 601. The flap 603 may be moved to open and close the tube 600 by a lever arm 605, which may be in turn driven by a solenoid 604. FIG. 6C shows the flap 603 in open position and FIG. 6D shows the flap 603 in closed position. A bracket 606 may be provided to hold the solenoid 604 and the lever arm 605. Preferably, the bracket 606 is designed to minimize heat transfer from the oven plenum to the solenoid 604. As shown in FIG. 6D, the flap 603 preferably has substantially louvered edges 610 or other means to minimize any air leakage through the flap when closed.

In an alternative embodiment not shown in any drawing, the opening and closing of the flap may be driven by one or more motors. In another alternative embodiment, the oven with two tubes may have one motor driving the two flaps for the two tubes. The motor may be configured to open the flap for one tube, while keeping the other tube closed, permitting the alternate opening and closing between the two tubes.

For a cooking oven having a bottom air plenum through which a portion of heated air can be diverted to the bottom of the cooking chamber, the flap 603 may also serve as a damper valve or bottom air diverter. By controlling the degree of opening of the flap 603 for letting the heated air in through the tube 600, one may at the same time control the amount of heated air diverted to the bottom air plenum.

Referring back to FIG. 6C, the surrounding area 607 where the tube 600 penetrates the top of a cooking chamber is preferably firmly sealed to prevent any air leakage into the cooking chamber.

The exemplary embodiment of the present invention incorporating the tube 600 as means of hot air impingement may further comprise a return air opening for allowing the gas from the plume arrays generated by the tube 600 to return from the cooking chamber to the air conduit. One example of such return air opening is the return air exit holes 115, 116 shown in FIG. 1. Another example is one or more rectangular openings. Preferably, the return air opening is positioned substantially at or along the intersection of the direction of the plume array and the wall of the cooking chamber. In this configuration, the heated air from the plume array generated by the tube 600 would strike a food product at an angle and is drawn across the surface of the food product toward its edges and the edge of the support and then finally toward the return air opening. It is found that this configuration further improves the heat transfer between the heated gas and the food product.

Referring back to FIGS. 1 and 2 and turning now to the microwave-cooking feature of the present invention, in addition to the air circulation and impingement means, the hybrid oven 100 further comprises a pair of microwave resonators 104 and 105, which are respectively positioned at the opposite upper corners of the cooking chamber 101 to launch microwave energies respectively generated by magnetrons 102 and 103 into the cooking chamber 101. The microwave resonator 104, 105 may be in the form of a waveguide, such as a slotted waveguide. While the oven 100 according to the exemplary embodiment in FIG. 1 uses two magnetrons 102 and 103, the present invention is not necessarily limited by the number of magnetrons to generate microwave energies to be guided and launched by the microwave resonators 104 and 105 into the cooking chamber 101. Furthermore, depending on the physical configuration of the support and the cooking chamber of the oven, the positions of the microwave resonators may be selected from various possible choices. For example, in an alternative embodiment, a pair of microwave resonators may be positioned respectively at the opposite bottom corners of the cooking chamber. In yet another alternative embodiment, a pair of microwave resonators may be positioned respectively at the upper and the lower portions of a side wall of the cooking chamber to apply the microwave energy sideways to a food product held by a vertically positioned support such as a skewer.

Each microwave resonator 104, 105 may comprise a upper resonator 130, 132 coupled to the corresponding magnetron 102, 103 to receive microwaves therefrom and a lower resonator 131, 133 coupled to the cooking chamber 101. The upper resonator 130, 132 functions to match with the corresponding magnetron 102, 103 and to guide the microwave energy therefrom to the lower resonator 131, 133. The lower resonator 131, 133 functions to match the upper resonator 130, 132 to the cooking chamber 101 and to launch the microwave energy from the upper resonator 130, 132 into the cooking chamber 101. The opening of the lower resonator 131, 133 into the cooking chamber 101 may be covered by a lid made of quartz so that the microwave radiation being transmitted through the lid from the lower resonator may become polarized. It is found that the optimal microwave efficiency may be achieved when the vertical height of the lower resonator 131, 133 equals one quarter of the microwave wavelength in free space (approximately 1.2 inches) and at least one horizontal width of the lower resonator 131, 133 equals the wavelength of a standing microwave within the upper resonator 130, 132 (e.g., about 6.2 inches based on a suitable dimension of the upper resonator).

Figure 7A:
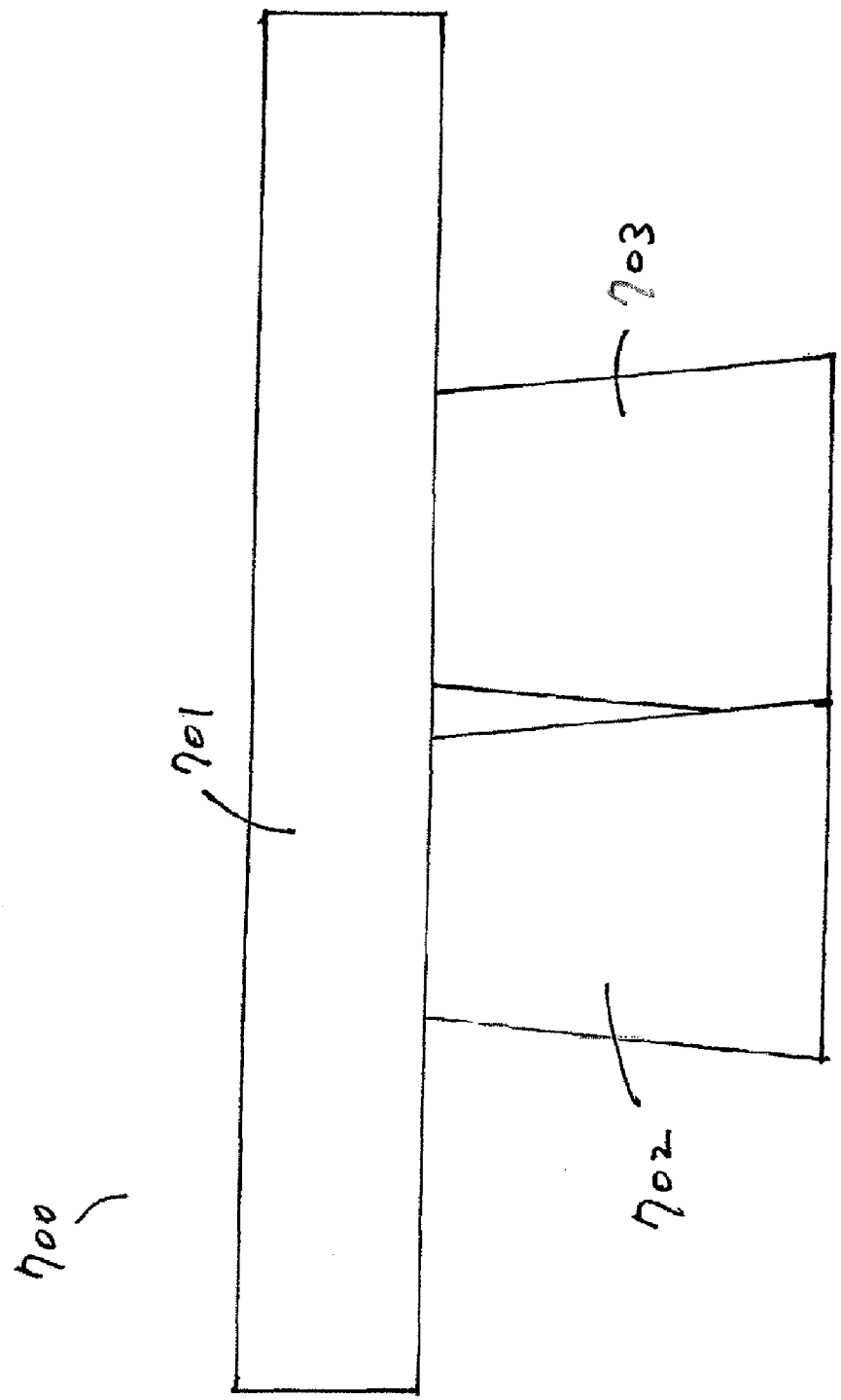
FIGS. 7A, 7B and 7C illustrate various views of a microwave resonator in another alternative embodiment of the present invention.
Figure 7B:
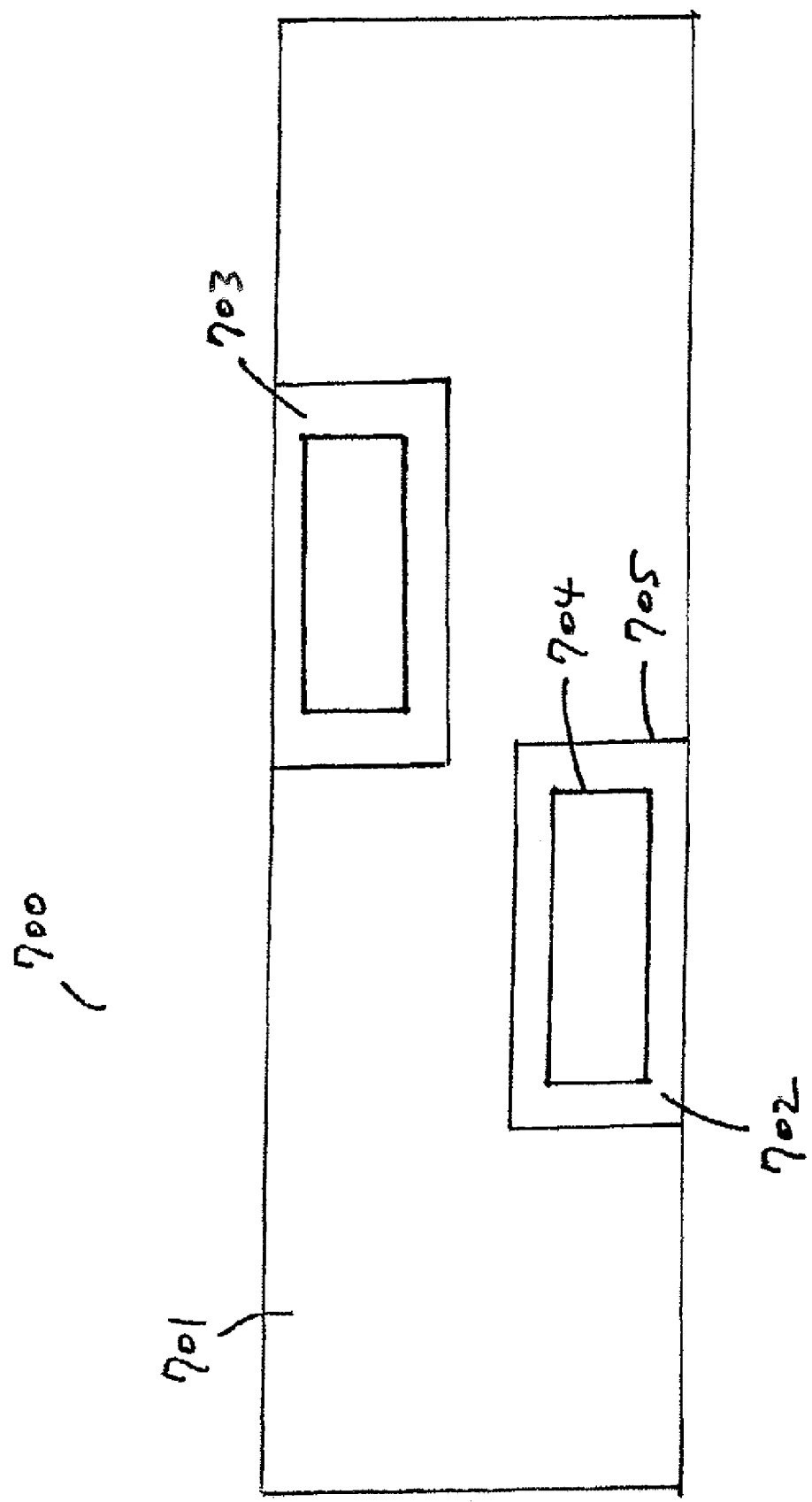
Figure 7C:
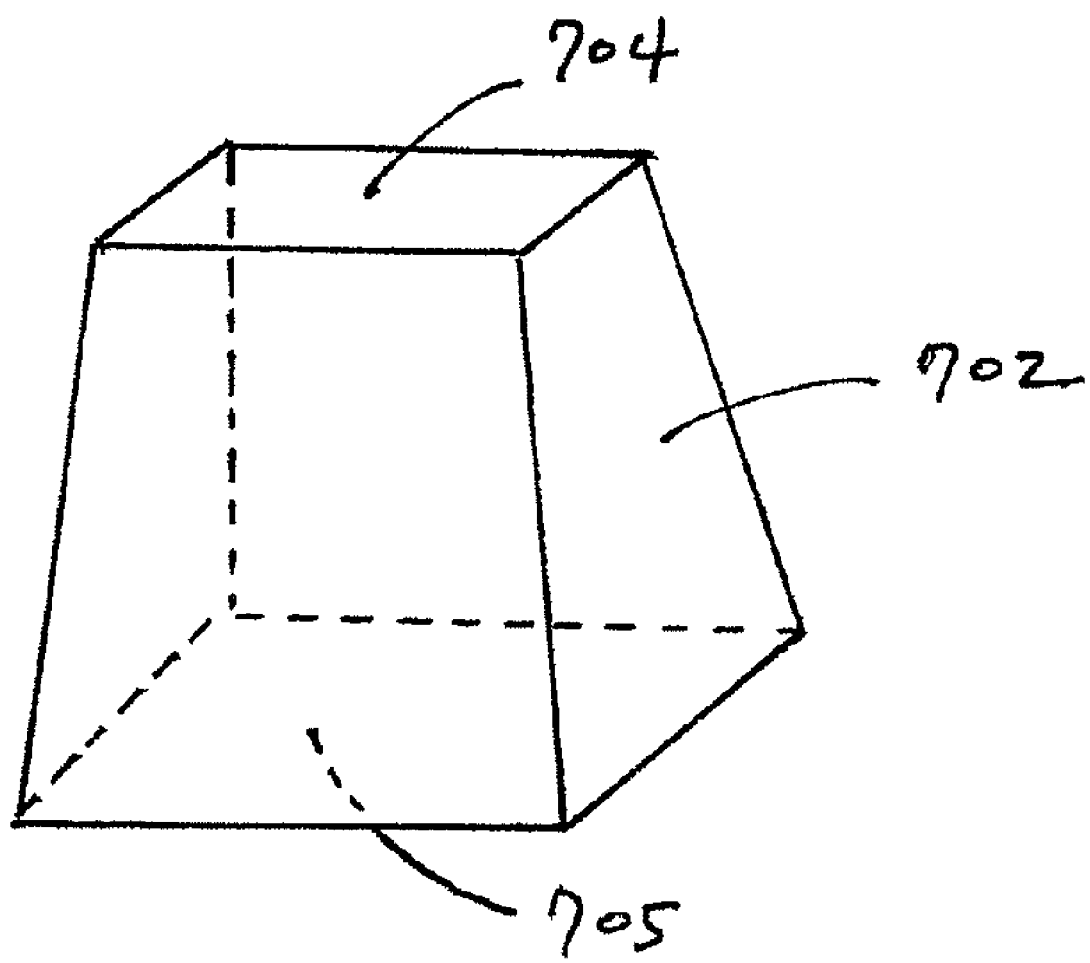

Another exemplary configuration of a microwave resonator is shown in FIGS. 7A, 7B and 7C. FIG. 7A is an elevational side view of a microwave resonator 700; FIG. 7B is a bottom plan view of the microwave resonator 700; and FIG. 7C is a side perspective view of a component of the microwave resonator 700. The configuration of the microwave resonator 700 is designed to optimize the efficiency of microwave-to-heat energy conversion. The microwave resonator 700 comprises an upper resonator 701 coupled to a magnetron and a lower resonator in the form of two feedhorns 702 and 703 with openings to a cooking chamber of the oven.

As shown in FIG. 7C, each feedhorn 702 is in the shape of a truncated rectangular pyramid, with the truncated top forming a top rectangular aperture 704 and the base of the pyramid forming a bottom rectangular aperture 705 of the feedhorn 702. The top aperture 704 is open to the cavity of the upper resonator 701 and the bottom aperture 705 is open to the cooking chamber. The size of the top aperture is smaller than the size of the bottom aperture, and their dimensions and ratio as well as the height of the feedhorn 702, 703 may be adjusted to optimize the microwave efficiency. FIG. 7B shows that the two feedhorns 702 and 703 coupled to the upper resonator 701 are arranged substantially in parallel, but diagonally offset with respect to each other. There may be other alternative arrangements of the two feedhorns 702 and 703 that can further optimize the microwave efficiency.

Referring back to FIGS. 1 and 2, the pair of microwave resonators 104 and 105, in particular their respective lower resonators 131 and 133, are adapted to direct the microwave radiation and energies in respective general directions 121 and 122 as indicated by the dotted lines coming out of the lower resonators 131 and 133. These directions 121 and 122 are at an angle with respect to the vertical axis of the cooking chamber 101 (or the horizontal plane of the support 112) and cross at a point 129 at a distance from the support 112, preferably vertically above the midpoint between the left and the right sides of the support 112. The oven 100 may be configured in such a way that this microwave crossing point 129 may take place above the upper surface of any food product 114 placed on the support 112. In the alternative embodiment wherein the microwave resonators are respectively positioned at the opposite bottom corners of the cooking chamber, the microwave crossing point may be located at a distance below the support. In the yet another alternative embodiment wherein the microwave resonators are positioned on a side wall of the cooking chamber, the microwave crossing point may be located at a horizontal distance from the vertical midpoint of the vertically positioned support.

As indicated by the direction 121, the microwave resonator 104 at the left upper corner of the cooking chamber 101 may be adapted to direct the microwave radiation toward the right half of the cooking chamber 101, preferably toward a general area in the proximity of the right side of the support 112. In mirror symmetry as viewed in FIG. 1, the microwave resonator 105 at the right upper corner of the cooking chamber 101 is adapted to direct the microwave radiation toward the left half of the cooking chamber 101 as indicated by the general direction 122, preferably toward a general area in the proximity of the left side of the support 112. Accordingly, the left and the right microwave resonators 104 and 105 are configured to generally direct the respective microwave energies to the opposite portions of the food product 114 placed on the support 112. It should be appreciated that the "left side" and the "right side" of the support 112 to which the respective microwave energies from the microwave resonators 104 and 105 are generally directed may correspond to any opposite portions of a food product placed on or held by the support. There may be various possible choices for the "left side" and the "right side" of the support depending on the physical configuration of the support and the cooking chamber.

The angle formed by the directions 121 and 122 with respect to the vertical axis of the cooking chamber 101 is determined by where the respective microwave radiation from the microwave resonators 104 and 105 are targeting. As an example, FIG. 1 shows that the microwave directions 121 and 122 form an angle of roughly 45 degrees with respect to the vertical axis of the cooking chamber 101 and meet at the crossing point 129 at an angle of roughly 90 degrees. However, these angles may vary depending on the dimensions of the cooking chamber 101 and the support 112, as well as the relative positions of the microwave resonators 104 and 105.

The oven 100 may further comprise a microwave modulator (not shown in the figures) for controlling the amount of the microwave radiation and their energies coming out of each of the microwave resonators 104 and 105 into the cooking chamber 101. The microwave modulation may be achieved by various means. One example of microwave modulation can be achieved by simply switching on and off the power to each of the magnetrons 102 and 103, either manually or by some suitable automatic control means. In another example, the microwave modulation may be achieved by a voltage regulator capable of varying the voltage applied to each of the magnetron 102 and 103 in a controlled manner. The microwave modulator having an automatic control means may facilitate a periodic change in the power or voltage applied to each of the magnetrons 102 and 103, thereby creating a periodic modulation (e.g., sinusoidal modulation, periodic step function modulation, etc.) in time of the microwave energy radiating out of each of the microwave resonators 104 and 105. By periodically alternating between the left and the right magnetrons 102 and 103, the microwave modulator may provide periodic modulations in the microwave energies respectively from the left and the right microwave resonators 104 and 105 that have the same amplitude and period, but differ in phase by 180 degrees. In addition, by maintaining the total microwave energies generated by both the left and the right magnetrons 102 and 103 to be constant (e.g., by turning off one magnetron while the other magnetron is on, or by providing periodic modulations in the voltages provided to the magnetrons 102 and 103 that have the same amplitude and period, but differ in phase by 180 degrees), the sum of the periodically modulated microwave energies from both the left and the right microwave resonators 104 and 105 likewise remains constant.

The configuration of the microwave resonators 104 and 105, illustrated in FIGS. 1 and 2, in conjunction with the above-described microwave modulator may be operated to cause a time-dependent spatial variation in the net microwave energy applied to the food product 114 placed on the support 112 in the cooking chamber 101 in the following exemplary way. Referring back to FIG. 1, for a predetermined time period, the microwave modulator turns on only the left magnetron 102 while keeping the right magnetron 103 turned off, thereby allowing microwave energy to radiate only from the left microwave resonator 104. As indicated by the general direction 121 of the microwave radiation from the left microwave resonator 104, this configuration causes the net microwave energy to be concentrated in the area in the right half of the cooking chamber 101, preferably in the general area in the proximity of the right side of the support 112.

After this time period, the microwave modulator keeps both the left and the right magnetrons 102 and 103 on for another predetermined time period, thereby allowing both the left and the right microwave resonators 104 and 105 to radiate microwave energies into the cooking chamber. It is found that in general, the microwaves radiating from both the left and the right microwave resonators 102 and 103 do not interfere with each other so as to cancel the net microwave energy. Accordingly, it is observed that in this configuration, the net microwave energy is largely concentrated in the middle portion of the support 112, preferably in the general area around the midpoint between the left and the right sides of the support 112 and preferably in the center of the food product 114 placed on the support 112 in the cooking chamber 101.

Next, for yet another predetermined time period, the microwave modulator keeps the right magnetron 103 on while maintaining the left magnetron 102 turned off of the power, thereby allowing only the right microwave resonator 105 to radiate the microwave energy into the cooking chamber 101. As indicated by the general direction 122 of the microwave radiation from the right microwave resonator 105, this configuration causes the net microwave energy to be concentrated in the area in the left half of the cooking chamber 101, preferably in the general area in the proximity of the left side of the support 112.

In this way, the concentration of the net microwave energy radiated from the left and the right microwave resonators 104 and 105 may "sweep" across the food product 114 in the cooking chamber 101 from the right to the left and vice versa over time in a controlled manner, thereby facilitating even horizontal distribution of heat energy transfer from the microwave radiation to the food product and further improving the microwave efficiency and the overall cooking efficiency of the oven 100. Furthermore, compared to the conventional high-speed cooking ovens based on microwave, this selective directionality of the net microwave energy helps to reduce the microwave radiation loss to the walls or other spaces of the cooking chamber 101, thereby optimizing the microwave efficiency and the overall cooking efficiency of the oven 100.

The capability of providing a time-dependent spatial variation in the net microwave energy may also be applied to overcome or alleviate the inefficiency arising from the water steam carrying away thermal energy from the food product starting at the temperature of 212° F. as described in the Background section. For example, referring to FIG. 1, the microwave modulator first keeps the left magnetron 102 on while maintaining the right magnetron 103 turned off so that the net microwave energy is concentrated in the proximity of the right side of the food product 114. This configuration is maintained until the right side of the food product 114 reaches a temperature slightly under 212° F. Next, the microwave modulator keeps both the left and the right magnetrons 102 and 103 on, causing the net microwave energy to be generally concentrated in the middle of the food product 114. When the middle portion of the food product 114 reaches a temperature slightly under 212° F., then the microwave modulator turns off the left magnetron 102, while keeping the right magnetron 103 on, causing the net microwave energy to be concentrated in the proximity of the left side of the food product 114. This configuration is maintained until the temperature of the left side of the food product 114 reaches slightly under 212° F. Meanwhile, the heat energies previously transferred to the right side and the middle portion of the food product 114 are dispersed throughout the inner mass of the food product 114.

The above microwave modulating steps may be repeated, periodically in time, until the internal temperature of the food product 114 in the cooking chamber 101 reaches a desired level.

By maintaining the temperature of the different portions of the surface of the food product 113 slightly under 212° F. and allowing them to disperse the transferred heat energies to the inner mass of the food product alternately at different times, the loss of thermal energy to the water steam from the surface of the food product may be minimized and therefore the efficiency of heat transfer from the microwave energy to the food product may be optimized.

Under the present invention, the operation settings of the oven 100 may comprise various possible combinations and sequences of open and close configurations of the left and the right nozzles 108 and 109 and on and off configurations of the left and the right magnetrons 102 and 103. In addition, the operations of the air modulator (e.g., in the form of the movable air modulating cover 125 in FIG. 1) for controlling the air impingement and the microwave modulator for controlling the microwave radiation may be coordinated and synchronized with each other to achieve the desired heat transfer effect. In one possible configuration, the air modulator and the microwave modulator may operate in phase in the following exemplary way. Referring to FIG. 1, for a predetermined time period, the air modulating cover 125 is positioned to keep the right nozzle 109 open and the left nozzle 108 closed (as illustrated in FIG. 4A), while the microwave modulator keeps the right magnetron 103 on and the left magnetron 102 off. For the next predetermined time period, the air modulating cover 125 is positioned to keep both the right and the left nozzles 109 and 108 open (as illustrated in FIG. 4B), while the microwave modulator keeps both the right and the left magnetrons 103 and 102 on. For the third predetermined time period, the air modulating cover 125 is positioned to keep the left nozzle 108 open and the right nozzle 109 closed (as illustrated in FIG. 4C), while the microwave modulator keeps the left magnetron 102 on and the right magnetron 103 off. As a result, the effects of the net air impingement and microwave energies "sweeping" across the food product 114 from one side to the other in time are in phase and therefore amplified.

On the other hand, since the heating by the air impingement and the microwave heating cause different kinds of impacts on the food product 114, one might instead desire to have the air modulator and the microwave modulator to operate out of phase so as to avoid the simultaneous heating of the same portion or side of the food product 114 in the cooking chamber 101 by both the air impingement and the microwave energy. To illustrate one exemplary out-of-phase operation by the air modulator and the microwave modulator, an alternative embodiment capable of opening and closing both the left and the right nozzles 108 and 109 at the same time is used. For the first predetermined time period, the air modulator keeps the right nozzle 109 open and the left nozzle 108 closed, while the microwave modulator keeps the left magnetron 102 on and the right magnetron 103 off. For the next predetermined time period, the air modulator keeps both the right and the left nozzles 109 and 108 closed, while the microwave modulator keeps both the right and the left magnetrons 103 and 102 on. For the third predetermined time period, the air modulator keeps the left nozzle 108 open and the right nozzle 109 closed, while the microwave modulator keeps the right magnetron 103 on and the left magnetron 102 off. For the fourth predetermined time period, the air modulator keeps the right nozzle 109 open and the left nozzle 108 closed, while the microwave modulator keeps the left magnetron 102 on and the right magnetron 103 off, as in the first predetermined time period.

For the fifth predetermined time period, the air modulator keeps both the right and the left nozzles 109 and 108 open, while the microwave modulator keeps both the right and the left magnetrons 103 and 102 off. For the sixth and the final predetermined time period of one cycle, the air modulator keeps the left nozzle 108 open and the right nozzle 109 closed, while the microwave modulator keeps the right magnetron 103 on and the left magnetron 102 off, as in the third predetermined time period. As the result of this out-of-phase operations by the air modulator and the microwave modulator, there is no simultaneous heating of the same portion or side of the food product 114 by both the air impingement and the microwave energy.

Other features of the hybrid oven 100 are also designed in view of optimizing the microwave efficiency, i.e., to maximize the amount of the microwave energy directed to the food product 114 and minimize the amount of the microwave energy lost to the cavities, plenums, magnetrons, etc. or radiated away from the food product 114. For example, the diameter of the nozzle exit orifice 118 is sized to prevent microwave energies from entering the nozzle and thereby becoming dissipated away rather than being applied to the food product 114. It is found that the diameter of approximately 0.75 inches for the nozzle exit orifice 118 may be able to keep microwave energies from entering the nozzles, thereby optimizing the microwave efficiency in the oven 100.

The support 112 may be adapted to rotate around the vertical axis 135 at its center. Such rotation of the support 112 help to alleviate the problem of horizontal unevenness in the microwave heat energy distribution. In addition, the oven 100 may further comprise an elevator or an elevating mechanism to control and modulate the height of the support 112 with respect to the top and bottom of the cooking chamber 101. As an example, FIG. 1 shows the support 112 elevated to a higher position 113 vertically along the axis 135. This may be achieved either manually or by a suitable electro-mechanical elevation control means. Such modulation of the height of the support 112 may be used to alleviate the problem of vertical unevenness in the microwave heat energy distribution.

The optimal microwave efficiency may also be achieved by matching the size of the cooking chamber 101 with the microwave load. It is found that the optimal matching can be achieved by sizing preferably all, but at least one, of the vertical height, and horizontal width and depth of the cooking chamber 101 (as viewed in FIG. 1) in integer multiples of the microwave wavelength (approximately 4.82 inches in free space). Such dimensions of the cooking chamber 101 facilitate the accommodation of standing microwaves in the cooking chamber 101, thereby minimizing the reflection of microwaves at the walls of the cooking chamber and the resulting loss of the microwave energy to the cavities, plenums, magnetrons, etc. Hence, to optimize the microwave efficiency, preferably all, but at least one, of the vertical height, and the horizontal width and depth of the cooking chamber 101 of the oven 100 is sized in integer multiples of the microwave wavelength, or selected from one of 4.82 inches, 9.64 inches, 14.46 inches, 19.28 inches, 24.10 inches, etc.

Figure 8B:
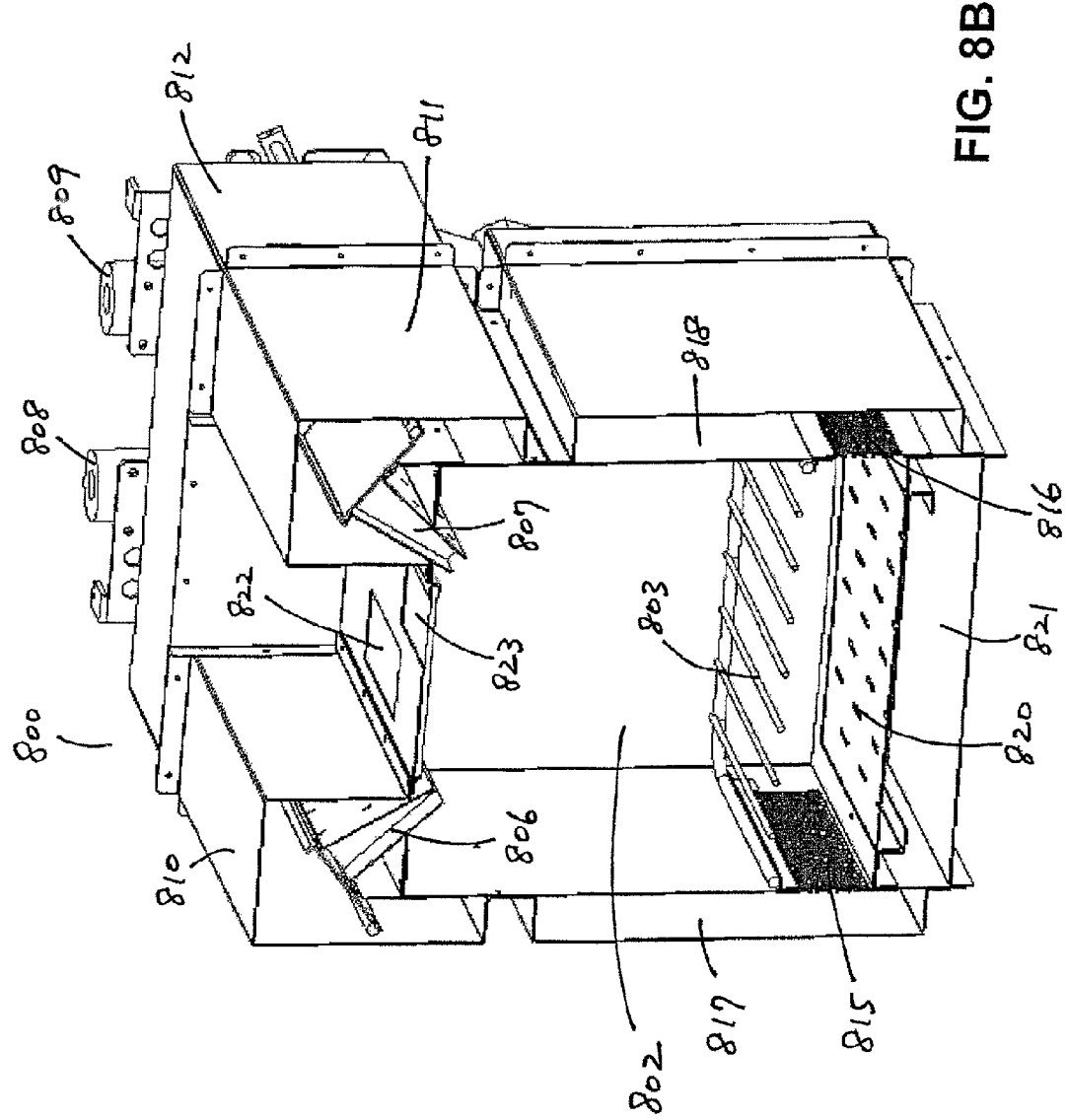
Figure 8C:
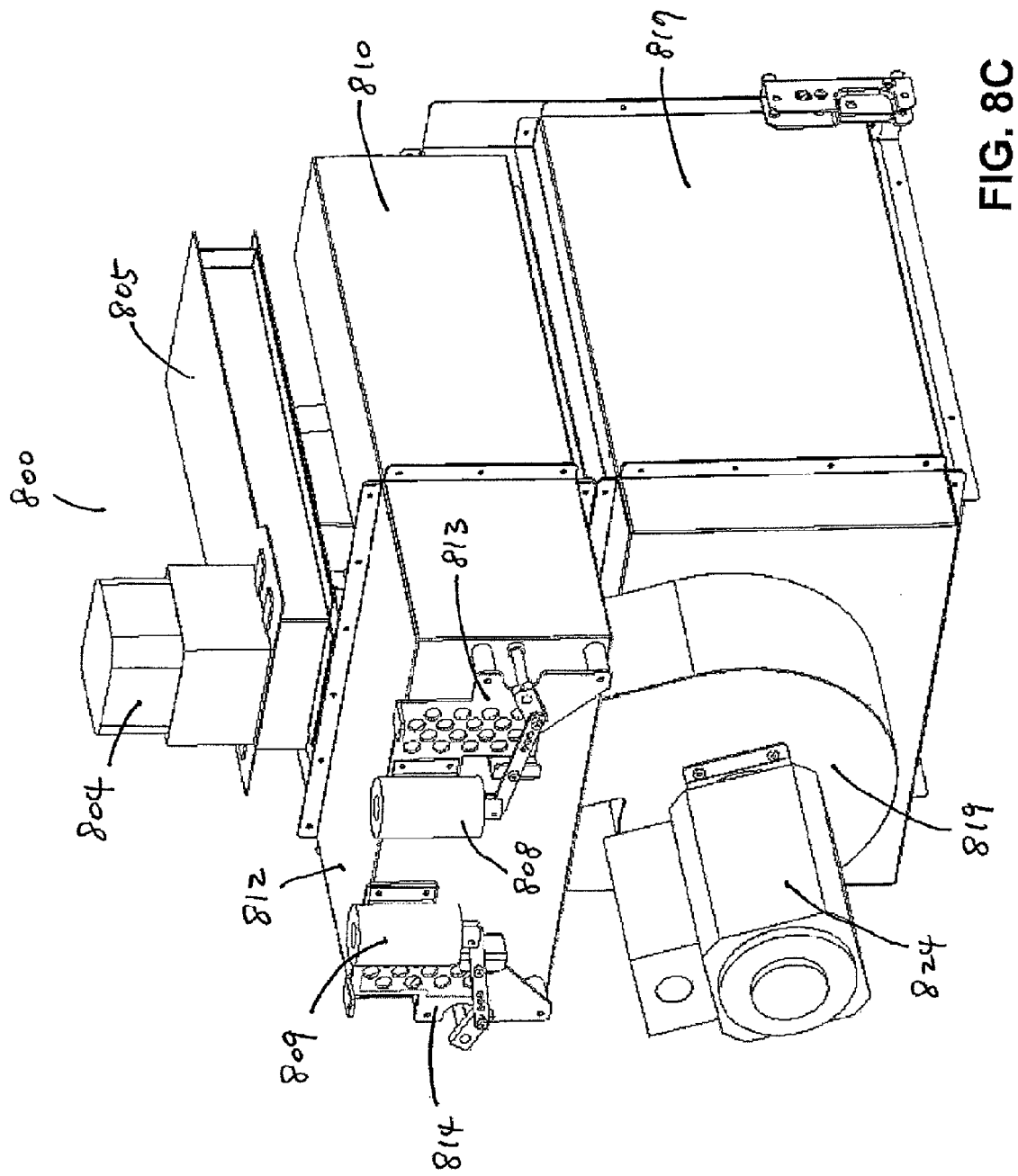
Figure 9A:
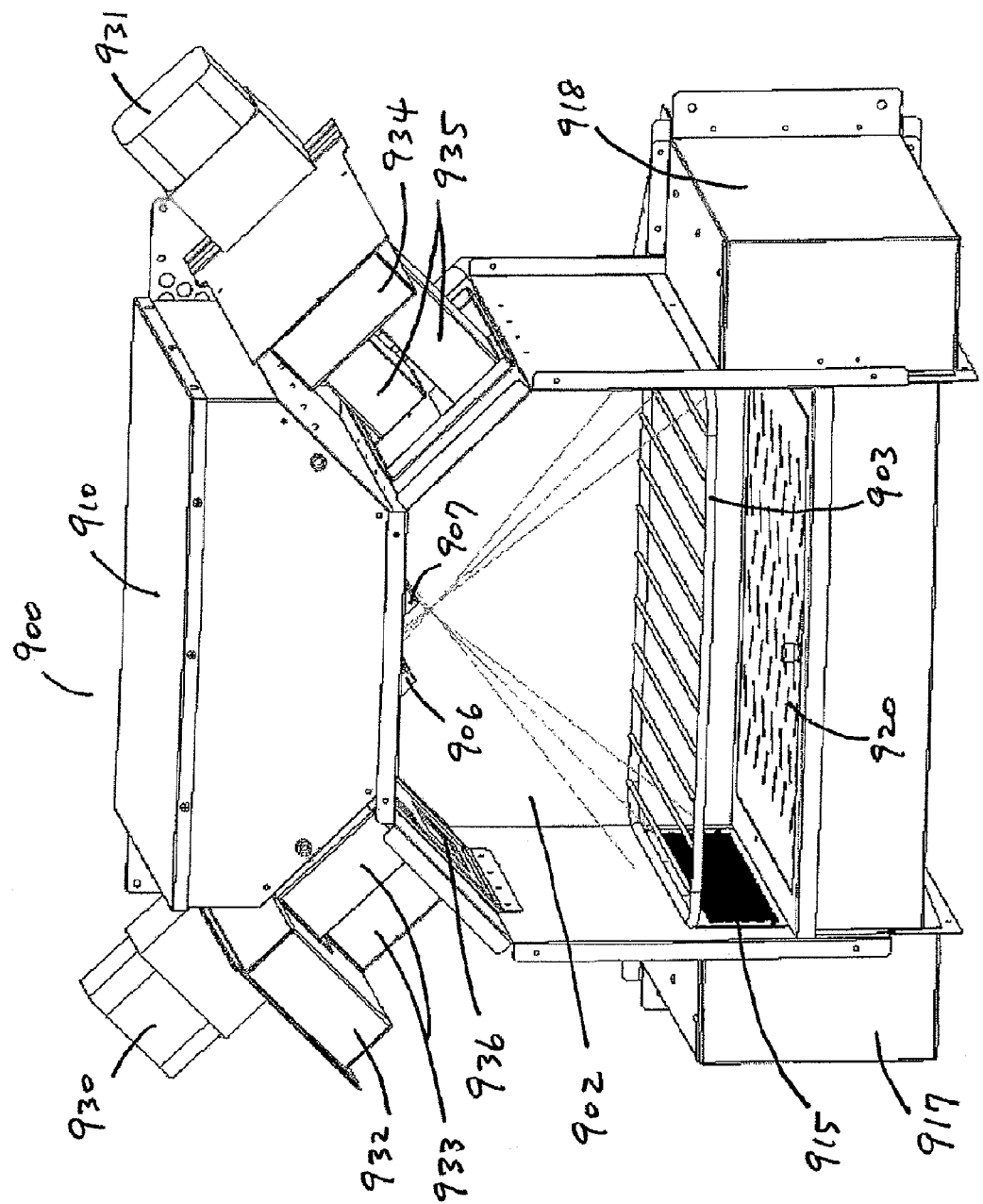
FIGS. 9A, 9B, and 9C illustrate various views of another embodiment of the present invention.
Figure 9B:
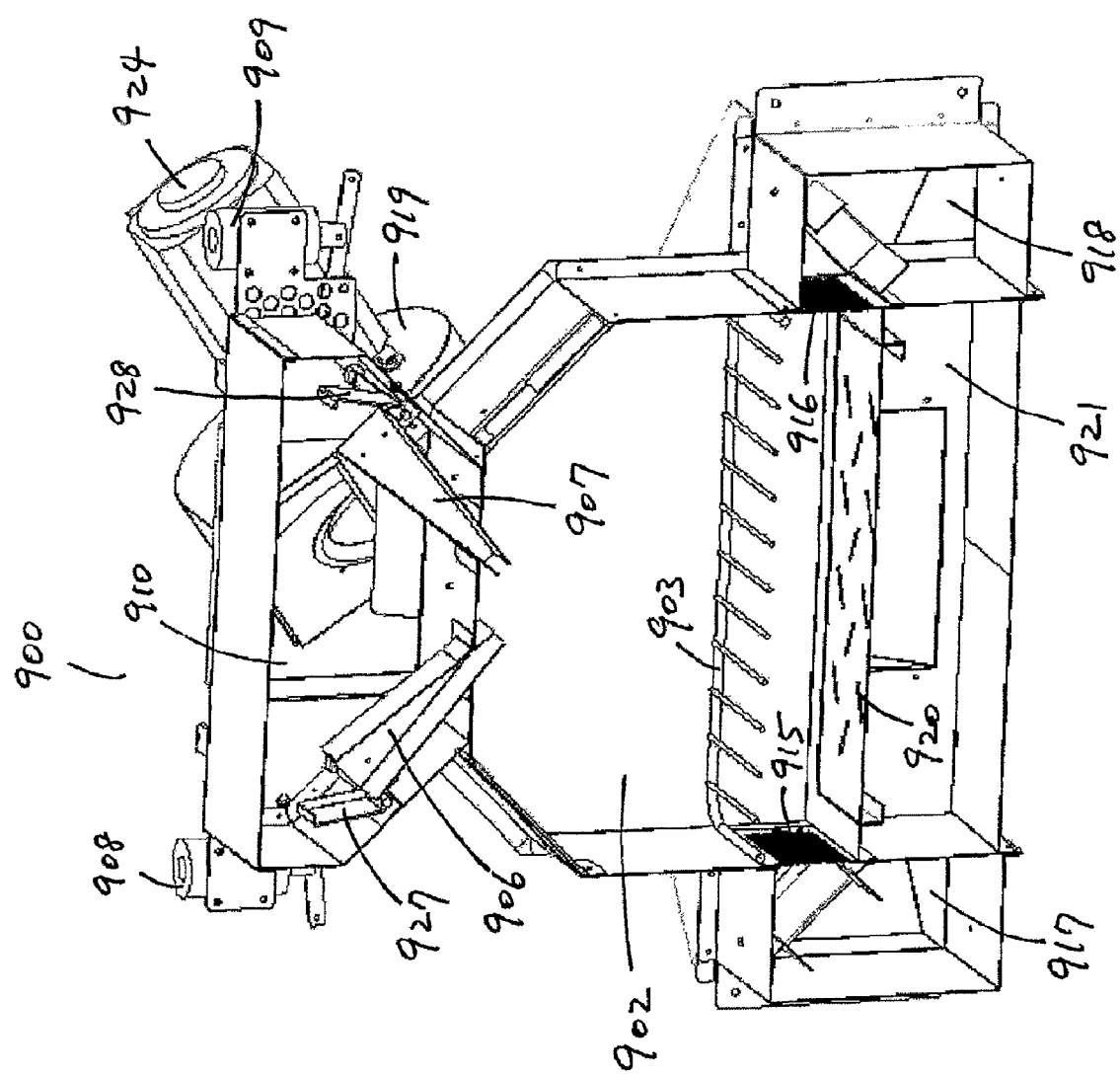
Figure 9C:
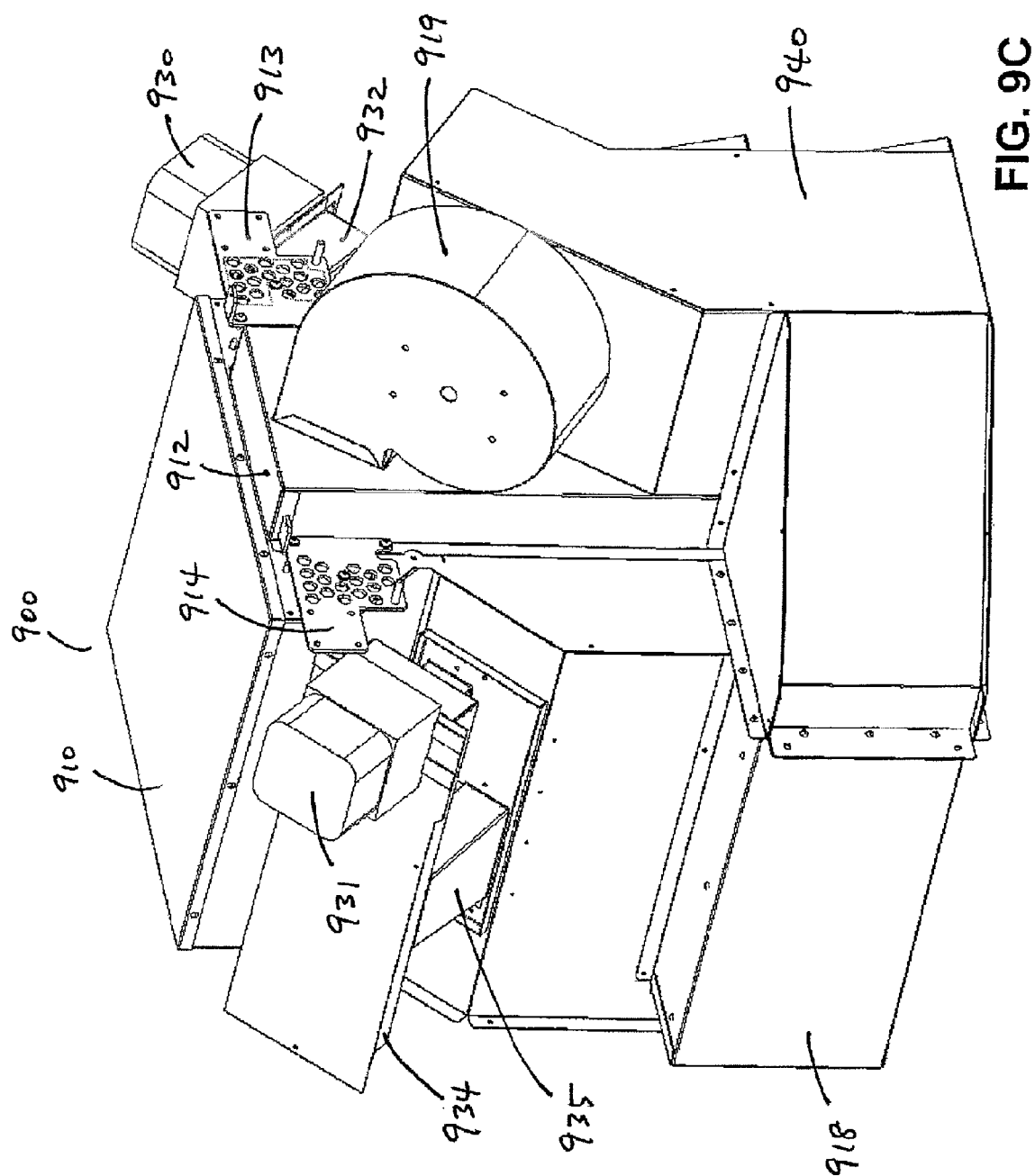
Figure 10A:
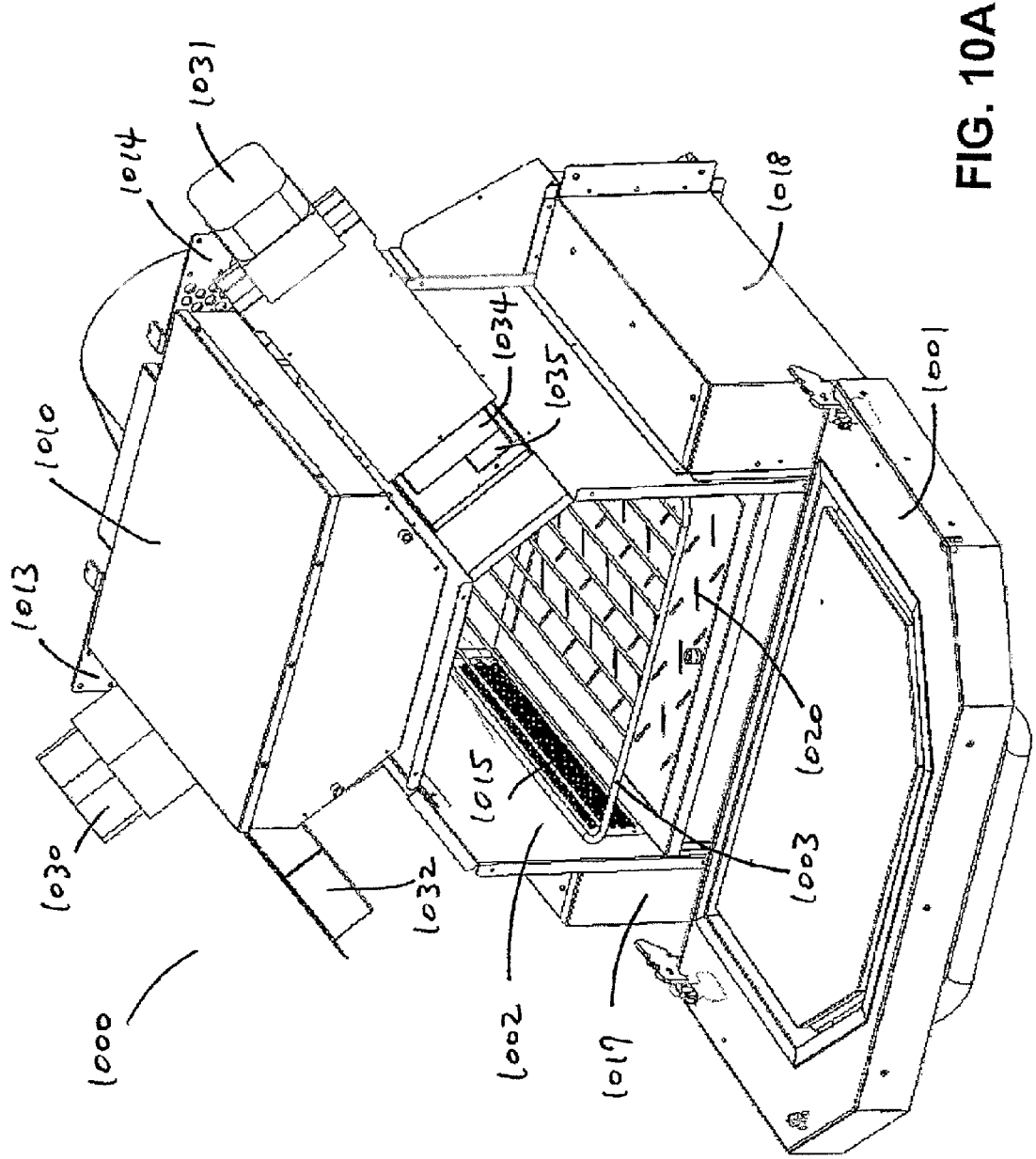
FIGS. 10A, 10B, and 10C illustrate various views of another embodiment of the present invention.
Figure 10B:
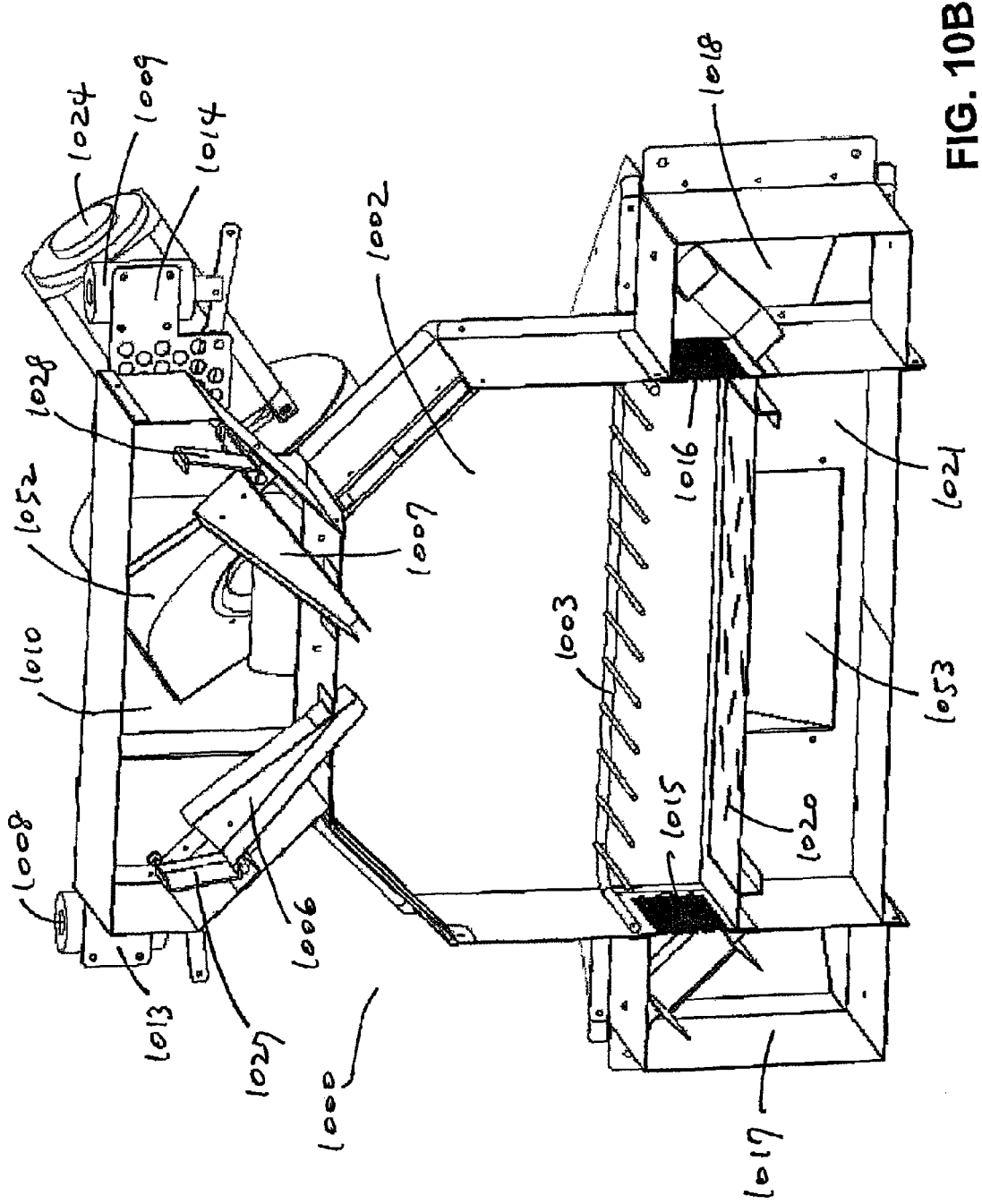
Figure 10C:
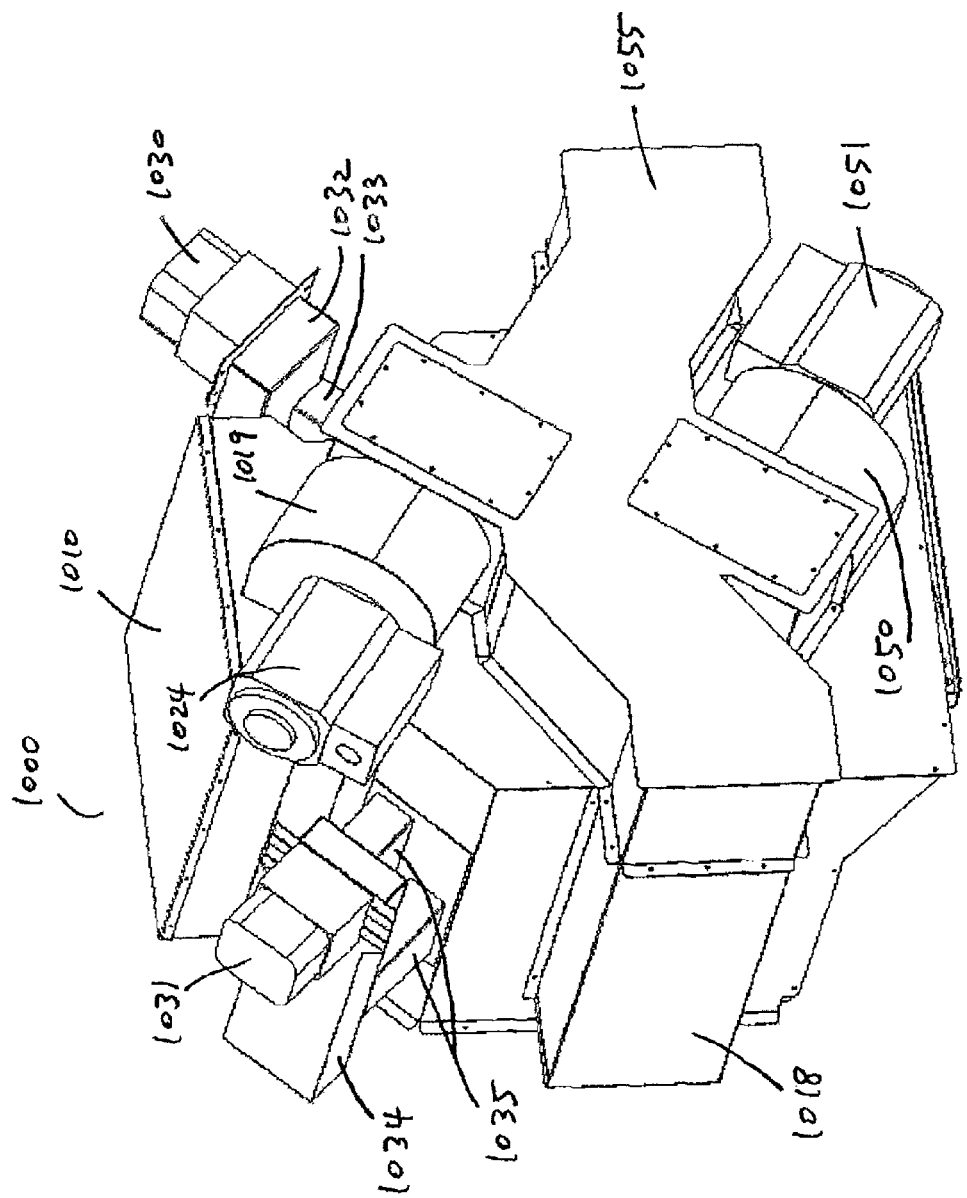

The present invention accommodates cooking ovens of various sizes and capacities. FIGS. 8A, 8B, and 8C illustrate various partial views of an exemplary small version of a hybrid cooking oven based on a combination of hot air impingement and microwave; FIGS. 9A, 9B, and 9C illustrate various partial views of an exemplary medium version, which is in many aspects similar to the one shown in FIGS. 1-3; and FIGS. 10A, 10B, and 10C illustrate various partial views of an exemplary large version. These figures are merely schematic illustrations based on various partial views and are not intended to be complete or reflect the exact dimensions, scales or relative proportions of the oven or components thereof, or the full engineering specification thereof, which should be apparent to those skilled in the art. Furthermore, while these figures show various internal oven components exposed to the outside for illustrative purposes, the commercial versions of these ovens would most likely have a housing to encase these components for safety, aesthetic and other reasons. In addition, although these exemplary embodiments of the present invention are shown to use two tubes of the type shown in FIGS. 6B, 6C, and 6D as means of hot air impingement and one or more microwave resonator of the type shown in FIGS. 7A, 7B, and 7C as means of microwave energy propagator, it should be appreciated that other various alternative types and configurations may be used in their places.

Referring now to FIGS. 8A, 8B, and 8C, therein illustrated is an exemplary small version of a hybrid cooking oven 800. FIG. 8A is a frontal perspective view of the hybrid oven 800 with its door 801 open; FIG. 8B is a partial frontal cross-sectional view of the oven 800 of FIG. 8A, with the view of a magnetron 804 and microwave resonator 805 taken out for illustrative purpose; and FIG. 8C is a perspective view of the oven 800 from the left rear. The oven 800 comprises a cooking chamber 802, which is adapted to receive a food product on a support 803 for cooking. The exemplary external dimension of the hybrid cooking oven 800 is 14 inches wide, 28 inches deep, and 22 inches tall, and the exemplary dimension of the cooking chamber 802 is 9.6 inches wide, 12 inches deep, and 9.6 inches tall.

As means for providing hot air impingement from the top of the cooking chamber, the oven 800 has two tubes 806 and 807 for generating plume arrays of heated gas and introducing them into the cooking chamber 802. These tubes 806 and 807 may be positioned on the top of the cooking chamber as shown in FIG. 8B. Each of the tubes 806 and 807 comprises a tube inlet coupled to an air inlet housing and a tube outlet coupled to the cooking chamber 802. The tubes 806 and 807 may be of the type and configuration shown in FIGS. 6B, 6C, and 6D, and may further comprise a flap for each tube as shown in FIGS. 6B, 6C, and 6D for covering and opening the tube inlet to control the heated air flow through the tube 806, 807. Solenoids 808 and 809 may be used to drive the flaps to open and close. As noted above, brackets 813 and 814 may be used to hold the solenoids 808 and 809 respectively so that the heat transfer from the oven plenum to the solenoids can be minimized.

In this exemplary embodiment, the tube inlets for the two tubes 806 and 807 are respectively encased in separate air inlet housings 810 and 811, which are connected through an air conduit 812. The tubes 806 and 807 are configured to respectively direct their plume arrays toward substantially opposite portions of the support 803 at a non-zero angle less than 90 degrees with respect to the surface of the support. In this configuration, the directions of the plume arrays from the tubes 806 and 807 cross each other above the food product placed on the support 803.

The oven 800 further comprises return air openings 815 and 816 on both side walls of the cooking chamber 802. The return air opening 815 is preferably positioned substantially at or along the intersection of the direction of the plume array generated by the tube 807 and the side wall of the cooking chamber 802. Likewise, the return air opening 816 is preferably positioned substantially at or along the intersection of the direction of the plume array generated by the tube 806 and the side wall of the cooking chamber 802. The return air openings 815 and 816 allow the gas from the plume arrays generated by the tubes 807 and 806 to return from the cooking chamber 802 to the air conduit 812 via return air plenums 817 and 818 and one or more intermediate conduits, respectively.

The air conduit 812 allows gaseous communication from other parts of the oven to the two air inlet housings 810 and 811. While not shown in the figures, a thermal energy source, such as parallel heating coils, may be coupled to or disposed in the air conduit 812 to heat the air disposed therein. The oven 800 has a hot air blower 819 which serves to circulate the air between the cooking chamber 802, the return air plenums 817 and 818, the air conduit 812, and the air inlet housings 810 and 811. The hot air blower 819 is driven by a blower motor 824, which may be a single speed or variable speed.

The oven 800 also has bottom air inlets 820 which are positioned below the support 803 substantially at the bottom of the cooking chamber 802 to direct a hot air flow to the underside of the support 803. This hot air to the bottom air inlets 820 is supplied by a bottom air inlet plenum 821, which is connected to, and diverts the heated gas from, the air conduit 812. In this oven 800, the hot air blower 819 serves to circulate the heated gas not only to the air inlet housings 810 and 811 on the top of the cooking chamber 802, but also to the bottom air inlet plenum 821 below the bottom of the cooking chamber.

The hybrid oven 800 also has one magnetron 804 for generating microwave energy. The magnetron 804 is coupled to a microwave resonator 805, which is configured to propagate the microwave energy from the top of the cooking chamber straight down into the cooking chamber 802. The microwave resonator 805 may be of the type shown in FIGS. 7A, 7B, and 7C, and may comprise an upper resonator (shown in FIGS. 8A and 8C) and two feedhorns (not shown in the figures) as a lower resonator, whose bottom ends respectively protrude into the cooking chamber 802 through the two rectangular apertures 822 and 823 on the top of the cooking chamber, as shown in FIG. 8B. Alternatively, the microwave resonator 805 may be any other waveguide known in the art.

Referring now to FIGS. 9A, 9B, and 8C, therein illustrated is an exemplary medium version of a hybrid cooking oven 900. This exemplary embodiment is similar to the hybrid oven 100 illustrated in FIGS. 1-3 in many aspects. FIG. 9A is a frontal perspective view of the hybrid oven 900; FIG. 9B is a partial frontal cross-sectional view of the oven 900 of FIG. 9A, with the view of magnetrons 930, 931 and their associated microwave resonators 932, 933, 934, 935 taken out for illustrative purpose; and FIG. 9C is a perspective view of the oven 900 from the right rear. The oven 900 comprises a cooking chamber 902, which is adapted to receive a food product on a support 903 for cooking. The exemplary external dimension of the hybrid cooking oven 900 is 28 inches wide, 27 inches deep, and 24 inches tall, and the exemplary dimension of the cooking chamber 902 is 14.4 inches wide, 14.4 inches deep, and 10.2 inches tall.

As means for providing hot air impingement from the top of the cooking chamber, the oven 900 has two tubes 906 and 907 for generating plume arrays of heated gas and introducing them into the cooking chamber 902. These tubes 906 and 907 may be positioned on the top of the cooking chamber as shown in FIG. 9B. Each of the tubes 906 and 907 comprises a tube inlet coupled to an air inlet housing 910 and a tube outlet coupled to the cooking chamber 902. The tubes 906 and 907 may be of the type and configuration shown in FIGS. 6B, 6C, and 6D, and may further respectively comprise flaps 927 and 928 for covering and opening the tube inlet to control the heated air flow through the tubes 906 and 907. Solenoids 908 and 909 may be used to respectively drive the flaps 927 and 928 to open and close. As noted above, brackets 913 and 914 may be used to hold the solenoids 908 and 909 respectively so that the heat transfer from the oven plenum to the solenoids can be minimized.

In this exemplary embodiment, the tube inlets for the two tubes 906 and 907 are both encased in a single air inlet housing 910. The tubes 906 and 907 are configured to respectively direct their plume arrays toward substantially opposite portions of the support 903 at a non-zero angle less than 90 degrees with respect to the surface of the support. In this configuration, the directions of the plume arrays from the tubes 906 and 907 cross each other above the food product placed on the support 903.

The oven 900 further comprises return air openings 915 and 916 on both side walls of the cooking chamber 902. The return air opening 915 is preferably positioned substantially at or along the intersection of the direction of the plume array generated by the tube 907 and the side wall of the cooking chamber 902. Likewise, the return air opening 916 is preferably positioned substantially at or along the intersection of the direction of the plume array generated by the tube 906 and the side wall of the cooking chamber 902. The return air openings 915 and 916 allow the gas from the plume arrays generated by the tubes 907 and 906 to return from the cooking chamber 902 to an air conduit 940 via return air plenums 917 and 918, respectively.

While not shown in the figures, a thermal energy source, such as parallel heating coils, may be coupled to or disposed in the air conduit 940 to heat the air disposed therein. The oven 900 has a hot air blower 919 which serves to circulate the air between the cooking chamber 902, the return air plenums 917 and 918, the air conduit 940, and the air inlet housing 910. The hot air blower 919 is driven by a blower motor 924 (not shown in FIG. 9C), which may be a single speed or variable speed.

The oven 900 also has bottom air inlets 920 which are positioned below the support 903 substantially at the bottom of the cooking chamber 902 to direct a hot air flow to the underside of the support 903. The hot air to the bottom air inlets 920 is supplied by a bottom air inlet plenum 921. In this oven 900, the hot air blower 919 serves to circulate the heated gas not only to the air inlet housing 910 on the top of the cooking chamber 902, but also to the bottom air inlet plenum 921 below the bottom of the cooking chamber. A portion of the heated air from the hot air blower 919 is diverted to the bottom air inlet plenum 921 via a bottom air conduit 912.

The hybrid oven 900 also has two magnetrons 930 and 931 for generating microwave energies for microwave cooking. Each of the magnetrons 930 and 931 is coupled to a microwave resonator for propagating the microwave energy into the cooking chamber 902. The microwave resonator may be of the type shown in FIGS. 7A, 7B, and 7C, and may comprise an upper resonator 932, 934 coupled to the magnetron 930, 931, and a lower resonator in the form of two feedhorns 933, 935, with an opening to the cooking chamber 902. Alternatively, the microwave resonators may be any other waveguides known in the art.

FIG. 9A shows bottom apertures 936 of the feedhorns 933 for directing the microwave energy propagation generated by the magnetron 930 and guided by the upper resonator 932 from the upper left corner of the top of the cooking chamber 902 substantially toward the right portion of the support 903. In this exemplary embodiment as shown in FIG. 9A, the microwave resonators 932, 933 on the upper left corner of the top of the cooking chamber 902 and the microwave resonators 934, 935 on the upper right corner of the top of the cooking chamber 902 are configured to respectively direct the microwave energies to propagate generally towards substantially opposite portions of the support 903 at a non-zero angle less than 90 degrees with respect to the surface of the support. In this configuration, the propagation directions of the microwave energies from the microwave resonators from the both sides cross each other at a distance from the support in the cooking chamber 902.

Referring now to FIGS. 10A, 10B, and 10C, therein illustrated is an exemplary large version of a hybrid cooking oven 1000. FIG. 10A is a frontal perspective view of the hybrid oven 1000 with its door 1001 open; FIG. 10B is a partial frontal cross-sectional view of the oven 1000 of FIG. 10A, with the view of magnetrons 1030, 1031 and their associated microwave resonators 1032, 1033, 1034, 1035 taken out for illustrative purpose; and FIG. 10C is a perspective view of the oven 1000 from the right rear. The oven 1000 comprises a cooking chamber 1002, which is adapted to receive a food product on a support 1003 for cooking. This exemplary large version may accommodate the support 1003 in the form of an elevator or an additional elevating mechanism for the support 1003 so that the height of the support 1003 may be dynamically adjusted during the operation of the oven 1000. The exemplary external dimension of the hybrid cooking oven 1000 is 30 inches wide, 26 inches deep, and 23 inches tall, and the exemplary dimension of the cooking chamber 1002 is 16.8 inches wide, 16.8 inches deep, and 12.6 inches tall.

As means for providing hot air impingement from the top of the cooking chamber, the oven 1000 has two tubes 1006 and 1007 for generating plume arrays of heated gas and introducing them into the cooking chamber 1002. These tubes 1006 and 1007 may be positioned on the top of the cooking chamber as shown in FIG. 10B. Each of the tubes 1006 and 1007 comprises a tube inlet coupled to an air inlet housing 1010 and a tube outlet coupled to the cooking chamber 1002. The tubes 1006 and 1007 may be of the type and configuration shown in FIGS. 6B, 6C, and 6D, and may further respectively comprise flaps 1027 and 1028 for respectively covering and opening the tube inlets of the tubes 1006 and 1007 to control the heated air flow through the tubes. Solenoids 1008 and 1009 may be used to respectively drive the flaps 1027 and 1028 to open and close the air inlets to the tubes 1006 and 1007. As noted above, brackets 1013 and 1014 may be used to respectively hold the solenoids 1008 and 1009 so that the heat transfer from the oven plenum to the solenoids can be minimized.

In this exemplary embodiment, the tube inlets for the two tubes 1006 and 1007 are both encased in a single air inlet housing 1010. The tubes 1006 and 1007 are configured to respectively direct their plume arrays toward substantially opposite portions of the support 1003 at a non-zero angle less than 90 degrees with respect to the surface of the support. In this configuration, the directions of the plume arrays from the tubes 1006 and 1007 cross each other above the food product placed on the support 1003.

The oven 1000 further comprises return air openings 1015 and 1016 on both side walls of the cooking chamber 1002. The return air opening 1015 is preferably positioned substantially at or along the intersection of the direction of the plume array generated by the tube 1007 and the side wall of the cooking chamber 1002. Likewise, the return air opening 1016 is preferably positioned substantially at or along the intersection of the direction of the plume array generated by the tube 1006 and the side wall of the cooking chamber 1002. The return air openings 1015 and 1016 allow the gas from the plume arrays generated by the tubes 1007 and 1006 to return from the cooking chamber 1002 to an air conduit 1055 via return air plenums 1017 and 1018, respectively.

While not shown in the figures, a thermal energy source, such as parallel heating coils, may be coupled to or disposed in the air conduit 1055 to heat the air disposed therein.

The oven 1000 also has bottom air inlets 1020 which are positioned below the support 1003 substantially at the bottom of the cooking chamber 1002 to direct a hot air flow to the underside of the support 1003. The hot air flowing through the bottom air inlets 1020 is supplied by a bottom air inlet plenum 1021. As shown in FIG. 10C, the oven 1000 has two independently controllable hot air blowers 1019 and 1050. The top blower 1019, driven by a top blower motor 1024, serves to direct the heated gas in the air conduit 1055 to the air inlet housing 1010 through a top blower outlet 1052. Meanwhile, the bottom blower 1050, driven by a bottom blower motor 1051, serves to divert a portion of the heated gas disposed in the air conduit 1055 to the bottom air inlet plenum 1021 through a bottom blower outlet 1053. Each of the blower motors 1024, 1051 may be a single speed or variable speed.

The hybrid oven 1000 also has two magnetrons 1030 and 1031 for generating microwave energies for microwave cooking. Each of the magnetrons 1030 and 1031 is coupled to a microwave resonator for propagating the microwave energy into the cooking chamber 1002. The microwave resonator may be of the type shown in FIGS. 7A, 7B, and 7C, and may comprise an upper resonator 1032, 1034 coupled to the magnetron 1030, 1031, and a lower resonator in the form of two feedhorns 1033, 1035, with an opening to the cooking chamber 1002. Alternatively, the microwave resonator may be any other waveguide known in the art.

In this exemplary embodiment, the microwave resonator comprising the upper resonator 1032 and the lower resonator 1033 on the upper left corner of the top of the cooking chamber 1002 and the microwave resonator comprising the upper resonator 934 and the lower resonator 935 on the upper right corner of the top of the cooking chamber 1002 are configured to respectively direct the microwave energies to propagate generally towards substantially opposite portions of the support 1003 at a non-zero angle less than 90 degrees with respect to the surface of the support. In this configuration, the propagation directions of the microwave energies from the microwave resonators from the both sides cross each other at a distance from the support in the cooking chamber 1002.

One common feature shared by the various exemplary embodiments of the present invention illustrated in FIGS. 8-10 and described above is the two-tube arrangement for hot air impingement positioned at the top of a cooking chamber. The two tubes are configured to respectively direct plume arrays or planar plumes of heated air towards substantially opposite portions of the support for a food product, with the directions of the plume arrays from the two tubes crossing above the food product. This feature is further illustrated in FIGS. 11A-11C.

Figure 11A:
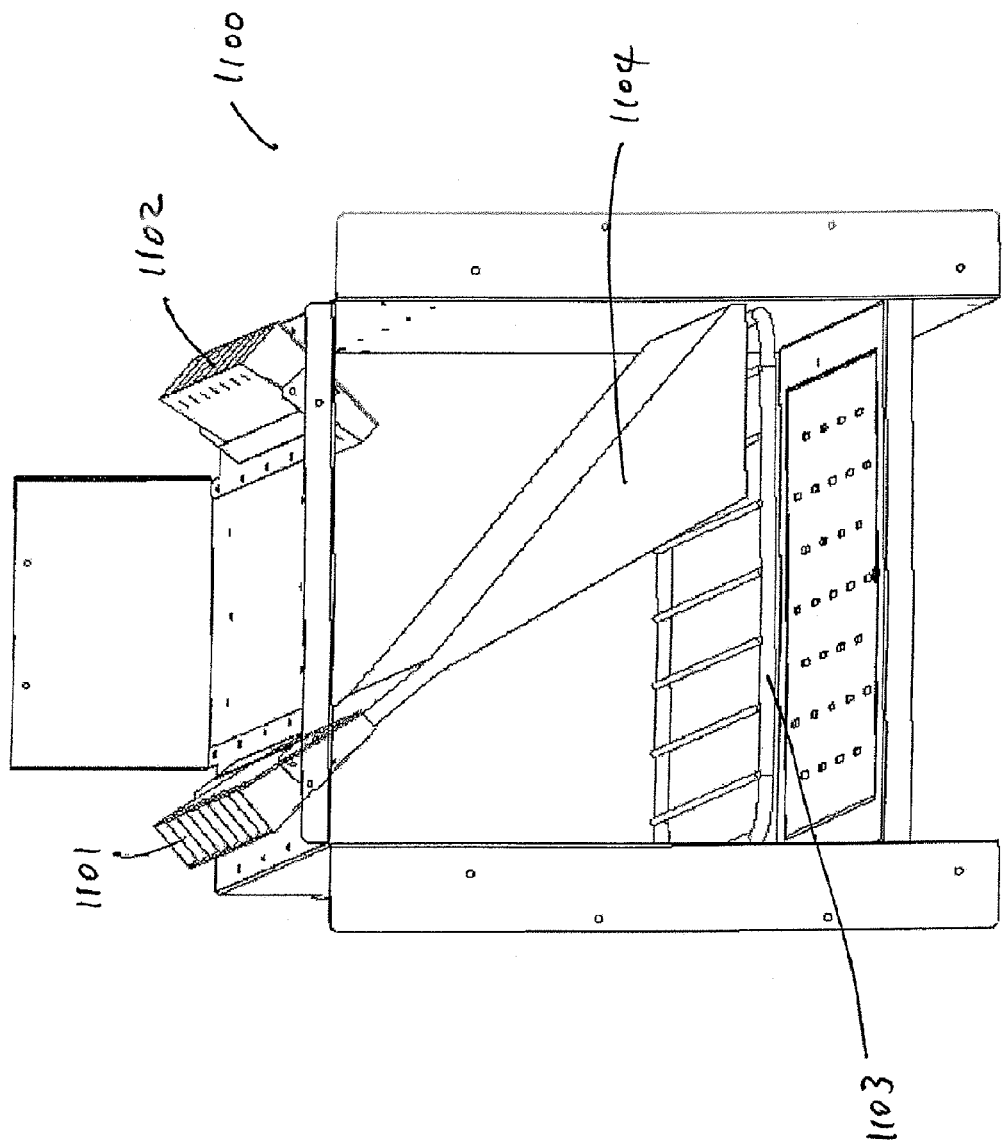
FIGS. 11A, 11B, and 11C respectively illustrate plume arrays generated by two tubes in at least one embodiment of the present invention.

In FIG. 11A, the left tube 1101 on the top of the cooking chamber generates a plume array 1104 of heated air and directs it toward the right portion of a support 1103 of a cooking oven 1100. Although the plume array 1104 spreads out as it travels through the cooking chamber, the tube 1101 is configured and designed in such a way that the impact of the plume array 1104 is focused substantially on the right portion of the support 1103. Likewise, in FIG. 11B, the right tube 1102 on the top of the cooking chamber generates a plume array 1105 of heated air and directs it toward the left portion of the support 1103. The tube 1102 is also configured and designed in such a way that the impact of the plume array 1105 is focused substantially on the left portion of the support 1103. When both of the tubes 1101 and 1102 are open and direct their respective plume arrays into the cooking chamber, their respective plume arrays collide above the support 1103, and the net result is that the impact of the sum of these plume arrays 1106 is focused substantially on the center of the support 1103, as shown in FIG. 11C.

The above-described capability of the tubes 1101 and 1102 to focus the impact of one or more plume arrays substantially on a selected portion of the support 1103 not only provides the new degree of flexibility, but also optimizes the utilization of the given amount of heated air in cooking a food product. For example, if the surface area of a food product placed on the center of the support 1103 is substantially smaller than the surface area of the support (e.g., a 6-inch sub placed on a 14.4 inch by 14.4 inch support), then one can maximize the contact between the heated air and the food product on the support by focusing the heated air in the form of plume arrays substantially on the center of the support, as shown in FIG. 11C. In this way, one can optimize the utilization of the heated air in cooking the food product, while minimizing the application of the heated air to the area of the support where the heated air is not needed (i.e., where the food product is not present).

In comparison, a typical conventional high-speed cooking oven uses columns of heated air, which are designed to strike a food product at an angle substantially perpendicular to the surface of the food product. By its design, the conventional high-speed oven applies the columns of heated air over the entire surface of the support, without the capability of focusing the heated air on a selected portion of the support. Hence, compared to the present invention, the conventional high-speed oven is not only much less flexible, but also much less efficient in utilizing the given amount of heated air in cooking a food product, as much of the impinging air does not contact the food product.

Figure 11B:
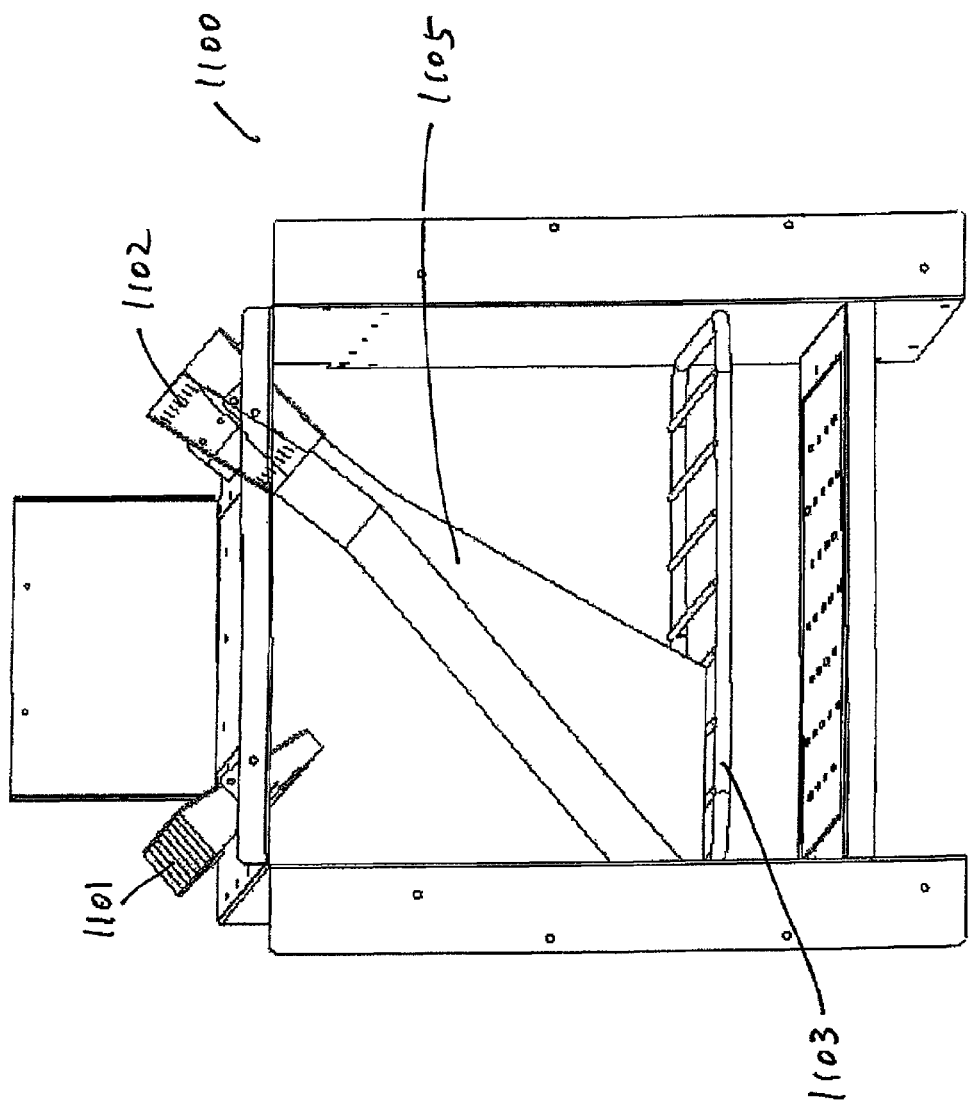
Figure 11C:
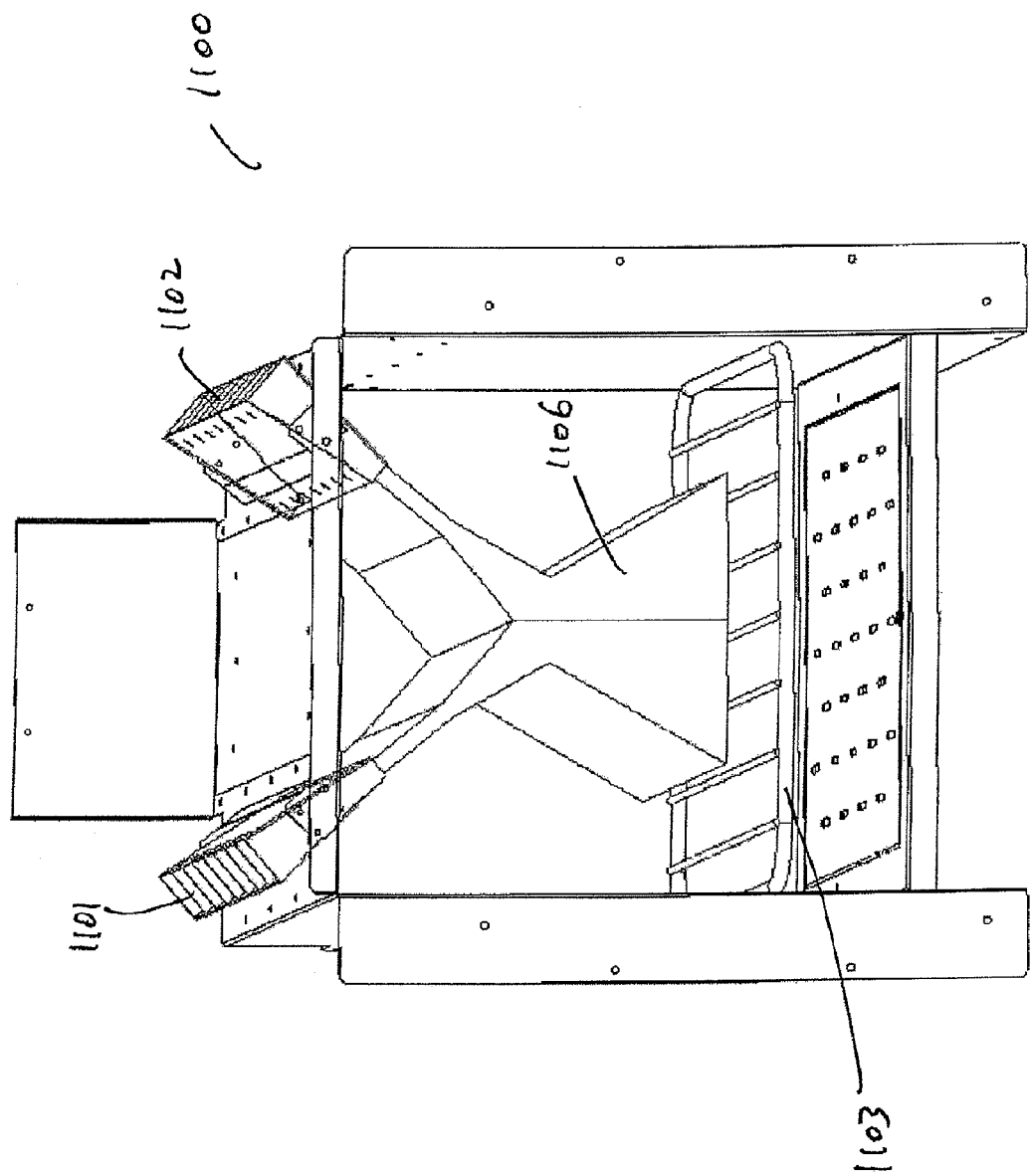

Even for a food product with a relatively large surface area, the two-tube arrangement shown in FIGS. 11A, 11B and 11C is much more efficient in utilizing the heated air than the conventional high-speed oven. Because the direction of the plume array of heated air from the tube 1101, 1102 is at a non-zero angle less than 90 degrees with respect to the surface of the support 1103, the heated air is drawn laterally across the surface of the food product after the impact and moves toward the side edges of the support 1103. This lateral drawing of the heated air across the food surface facilitates the heat transfer from the heated air to the food product. As discussed above, by positioning a return air opening at or along the intersection of the direction of the plume array from the tube 1101, 1102 and the side wall of the cooking chamber, one may further enhance the effect of drawing the heated air laterally across the food surface, thereby optimizing the cooking efficiency.

In accordance with an additional aspect of the present invention, the various exemplary embodiments of the present invention illustrated in FIGS. 8-10 and described above can utilize an arrangement for hot air impingement having at least two tubes positioned at the bottom of a cooking chamber, in place of bottom air inlets 820, 920, and 1020. The at least two tubes are configured to respectively direct plume arrays or planar plumes of heated air towards substantially opposite portions of the support for a food product from the bottom of the cooking chamber. In accordance with a further additional aspect of the present invention, a third tube can be located between the first and second tubes to direct a plume array or a planar plume of heated air toward the support perpendicular to the surface of the support. These features are further illustrated in FIGS. 12A-12C, 13A-13B, and 14A-14D.

FIGS. 12A, 12B, and 12C respectively illustrate a perspective view, a front plan view, and a top plan view of a bottom plate 1200 that can be used in place of the bottom air inlets 820, 920, and 1020 that are respectively shown in the exemplary embodiments of the present invention that are illustrated in FIGS. 8-10. Bottom plate 1200 includes at least two tubes, a right tube 1201 and a left tube 1202. Bottom plate 1200 is preferably made of stainless steel, but can be made of any material that is suitable for use in an oven.

Tubes 1201,1202 may be of the type and configuration shown in FIGS. 6B, 6C, and 6D. The factors that one of ordinary skill in the art would need to consider to determine the dimensions of right tube 1201 and left tube 1202 include the amount of space between (1) the top of the tube and the bottom of the support for the food product (e.g., support 803, support 903, or support 1003, respectively shown in FIGS. 8-10) above it, and (2) the bottom of the tube and the bottom of the air inlet plenum (e.g., bottom air inlet plenum 821, bottom air inlet plenum 921, or bottom air inlet plenum 1021, respectively shown in FIGS. 8-10) below it. In a preferred embodiment, right tube 1201 and left tube 1202 have a length of approximately 9 inches, a width of approximately 0.125 inches, and a height of approximately 1.1 inches.

In a preferred embodiment of the present invention, bottom plate 1200 also includes a middle tube 1203, which is located between right tube 1201 and left tube 1202. Like right and left tubes 1201,1202, middle tube 1203 may be of the type and configuration shown in FIGS. 6B, 6C, and 6D. One of ordinary skill in the art would consider the same factors mentioned above with respect to tubes 1201,1202 to determine the dimensions of right tube 1201 and left tube 1202. Middle tube 1203 has a length of approximately 9 inches and a width of approximately 0.08 inches. However, in accordance with an aspect of the present invention, the height of middle tube 1203 may be smaller than the heights of right tube 1201 and left tube 1202. In a preferred embodiment of the present invention, the height of middle tube 1203 is approximately 0.975 inches.

In the preferred embodiment shown in FIGS. 12A-12C, right tube 1201 and left tube 1202 are contiguous with middle tube 1203. In alternative embodiments that are not shown in any drawing, right tube 1201 and left tube 1202 may be separated from middle tube 1203 while still achieving the desired effect of the present invention. In one such embodiment, right tube 1201 and left tube 1202 are each separated from middle tube 1203 by approximately two inches.

In a preferred embodiment, bottom plate 1200 further includes at least one screw 1204, which is used to secure bottom plate 1200 to the bottom of the cooking chamber. The use of screw 1204 is particularly advantageous because it allows for the rapid and easy removal of bottom plate 1200 from the cooking chamber so that bottom plate 1200 can be cleaned, for example in a dishwasher. Those of ordinary skill in the art will readily recognize that various conventional means other than screw 1204 are available to removably secure bottom plate 1200 to the bottom of the cooking chamber. Such other means will not be described further herein.

Right tube 1201 and left tube 1202 are configured to direct plume arrays or planar plumes of heated air towards substantially opposite portions of the support for a food product. In a preferred embodiment, middle tube 1203 is configured to direct plume arrays or planar plumes of heated air toward a center portion of the support for a food product. These features are further illustrated in FIGS. 13A and 13B.

Referring now to FIGS. 13A and 13B, bottom plate 1200 can be used in the exemplary embodiments of the present invention illustrated in FIGS. 8-10 and described above. Right tube 1201 generates a plume array 1301 of heated air and directs it toward the right portion of support 1304 of cooking oven 1300. Although the plume array 1301 spreads out as it travels toward support 1304, right tube 1201 is configured and designed in such a way that the impact of plume array 1301 is focused substantially on the right portion of support 1304. Likewise, left tube 1202 generates a plume array 1302 of heated air and directs it toward the left portion of support 1304. Left tube 1202 is also configured and designed in such a way that the impact of plume array 1302 is focused substantially on the left portion of support 1304. Furthermore, middle tube 1203 generates a plume array 1303 of heated air and directs it toward the center portion of the support 1304. Middle tube 1203 is also configured and designed in such a way that the impact of the plume array 1303 is focused substantially on the center portion of support 1304. Bottom plate 1200 is secured to the oven using screws 1204.

When tubes 1201,1202,1203 direct their respective plume arrays 1301,1302,1303 into cooking chamber 1305 as described above, the respective plume arrays 1301,1302,1303 are drawn laterally across the bottom surface of food product 1306 sitting on support 1304, rather than simply bouncing off food product 1306. The result is a layer 1307 of hot air that completely surrounds the bottom surface of food product 1306. This effect is due to the directions of the plume arrays 1301,1302,1303 and the positions of return air openings 1308,1309 in cooking chamber 1305.

Because the directions of plume arrays 1301,1302 of heated air respectively provided from right and left tubes 1201,1202 are at a non-zero angle less than 90 degrees with respect to the surface of the support 1304, the heated air from these tubes will tend to move laterally, toward the side edges of support 1304, after it impacts the bottom surface of food product 1306. Furthermore, and very importantly, the negative pressure provided at return air openings 1308,1309 further enhances the effect of drawing the plume arrays 1301, 1302,1303 laterally across the bottom surface of food product 1306, thereby optimizing the cooking efficiency. In a preferred embodiment, each of the return air openings 1308, 1309 are positioned substantially at or along the intersection of the bottom of cooking chamber 1305 and a side wall of the cooking chamber. The lateral drawing of the heated air across the bottom surface of food product 1306 to surround it with heated air facilitates heat transfer from the heated air to food product 1306.

In comparison, a typical conventional high-speed cooking oven uses columns of heated air, which are designed to strike a food product at an angle that is substantially perpendicular to the surface of the food product. By its design, the conventional high-speed oven applies columns of heated air to the entire bottom surface of the support. The return path for these columns of heated air in a typical conventional high-speed cooking oven is provided at the back of the oven. Each column of heated air (to the extent it contacts the bottom surface of the food product) is focused on a particular area of the bottom surface of the food product. As a result, the spotting problem referred to in the Background section occurs at the bottom surface of the food product. Hence, compared to the ovens made in accordance with the present invention, the conventional high-speed oven is much less efficient in utilizing the given amount of heated air in cooking a food product, as the impinging air does not contact the entire bottom surface of the food product.

Figure 14A:
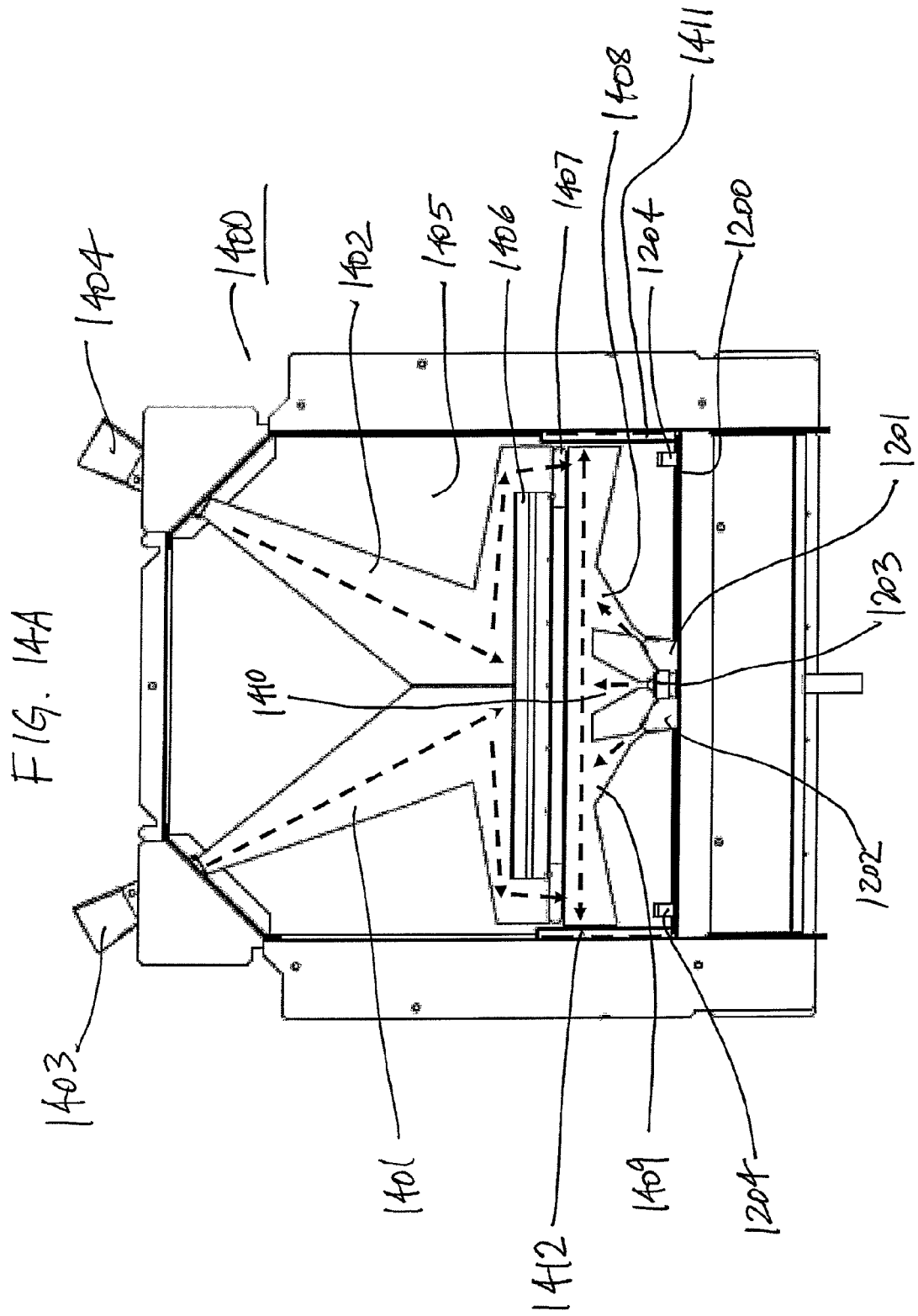

Referring now to FIGS. 14A and 14B, the tubes of bottom plate 1200 can be used in combination with the top tubes used in the exemplary embodiments of the present invention illustrated in FIGS. 8-10 and described above. As shown in FIGS. 14A and 14B, plume arrays 1401,1402 from respective tubes 1403,1404 at the top of cooking chamber 1405 of oven 1400 can be used to cook the top and side surfaces of a food product 1406 sitting on a support 1407, as described earlier herein. At the same time, plume arrays 1408,1409,1410 from respective tubes 1201,1202,1203 of bottom plate 1200 (which is secured to oven 1400 by screws 1204) can be used to cook the bottom surface of food product 1406. As described in connection with FIGS. 13A and 13B, plume arrays 1401,1402 and 1408, 1409,1410 are drawn laterally across the top and bottom surfaces, respectively, of food product 1406 by virtue of the positioning of tubes 1201,1202,1203,1403,1404 and the negative pressure at return air openings 1411,1412. In this way, the impinging hot air supplied into cooking chamber 1405 by tubes 1201,1202,1203,1403,1404 surrounds food product 1406, thereby improving the cooking efficiency of oven 1400.

The above-described features and improvements in accordance with the present invention enable a high-speed cooking oven for cooking a food product at least partially by hot air impingement and-or at least partially by microwave to deliver optimal cooking efficiency. Tangible benefits of this improvement in the cooking efficiency in the high-speed cooking technology are the reduction in the cooking time at a given electrical power supply, and alternatively, the reduction in the electrical power required to operate a high-speed cooking oven for a given cooking capacity (i.e., given cooking time). As noted in the Background section, because of their suboptimal cooking efficiency, the conventional high-speed cooking ovens must operate on an electrical power supply based on 220 volts or greater. By further improving and optimizing the cooking efficiency in accordance with the present invention, high-speed cooking technology for cooking a food product at least partially by hot air impingement and-or at least partially by microwave may now be extended with more productive results to ovens operating on an electrical power supply based on a voltage less than 220 volts, preferably a power supply based on a voltage between 110 and 125 volts and a current of 30 amperes or less, which is more widely available than the 220 volt-based power supply. Hence, the present invention enables the high-speed cooking technology to find a wider range of applicability and a broader customer base compared to the conventional high-speed cooking technology with sub-optimal cooking efficiency.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. An oven for cooking a food product, comprising:
   a cooking chamber comprising a top, a bottom, and a food product support;
   a conduit in fluid communication with the cooking chamber;
   one or more air blowers communicating a gas flowing through the conduit to the cooking chamber;
   a thermal energy source heating the gas;
   a first tube or a first nozzle generating a first airflow of the gas into the cooking chamber; and
   a second tube or a second nozzle generating a second airflow of the gas into the cooking chamber,
   wherein the first and the second tubes or nozzles are located beneath the food product support and direct the first and the second airflows towards substantially opposite portions of the food product support at a non-zero angle less than 90 degrees with respect to a surface of the food product support.

2. The oven of claim 1, wherein the first and second tubes are removably located at the bottom of the cooking chamber.

3. The oven of claim 1, further comprising a third tube for generating a third plume array of the gas from the conduit and introducing it into the cooking chamber, the third tube located between the first and second tubes.

4. The oven of claim 3, wherein the third tube directs the third plume array towards the food product support at an angle of approximately 90 degrees with respect to the surface of the food product support.

5. The oven of claim 3, wherein the third tube is removably located at the bottom of the cooking chamber.

6. The oven of claim 3, wherein the height of the third tube is smaller than the height of the first tube and the height of the second tube.

7. The oven of claim 3, wherein the first and second tubes are each contiguous with the third tube.

8. The oven of claim 1, further comprising a return air opening for allowing the gas from the first and the second airflows to return from the cooking chamber to the conduit.

9. The oven of claim 8, wherein the return air opening comprises: a first return air opening positioned substantially at or along the intersection of the bottom of the cooking chamber and a first side wall of the cooking chamber; and a second return air opening positioned substantially at or along the intersection of the bottom of the cooking chamber and a second side wall of the cooking chamber located opposite the first side wall.

10. The oven of claim 9, wherein the gas from at least one of the first airflow and the second airflow is drawn laterally across a bottom surface of the food product toward at least one of the first return air opening and the second return air opening.

11. The oven of claim 10, further comprising a third tube for generating a third plume array of the gas from the conduit and introducing it into the cooking chamber, wherein the gas from the third plume array is drawn laterally across a bottom surface of the food product toward at least one of the first return air opening and the second return air opening.

12. The oven of claim 1, further comprising an air modulator for controlling a flow rate of the gas through the first and second tubes.

13. The oven of claim 3, further comprising an air modulator for controlling a flow rate of the gas through the third tube.

14. The oven of claim 1, wherein each of the first and the second tubes comprises a tube inlet coupled to the conduit and a tube outlet to the cooking chamber.

15. The oven of claim 14, wherein each of the first and the second tubes is in the shape of an inverted truncated triangular prism with the tube inlet corresponding to the base of the prism.

16. The oven of claim 14, wherein the area of the tube inlet is larger than the area of the tube outlet at a ratio substantially sufficient for forming a tight plume of the gas.

17. The oven of claim 14, wherein the dimensions of the first and the second tubes are designed to optimize the formation of a plume of the gas having a long and narrow rectangular cross section.

18. The oven of claim 3, wherein the third tube comprises a tube inlet coupled to the conduit and a tube outlet to the cooking chamber.

19. The oven of claim 18, wherein the third tube is in the shape of an inverted truncated triangular prism with the tube inlet corresponding to the base of the prism.

20. The oven of claim 18, wherein the area of the tube inlet is larger than the area of the tube outlet at a ratio substantially sufficient for forming a tight plume of the gas.

21. The oven of claim 18, wherein the dimensions of the third tube are designed to optimize the formation of a plume of the gas having a long and narrow rectangular cross section.

22. The oven of claim 1, wherein the one or more air blowers comprise an air blower that directs the gas in the conduit to the first and second tubes.

23. The oven of claim 1, wherein the one or more air blowers comprise a single speed air blower.

24. The oven of claim 1, wherein the directions of the first and the second airflows are at a substantially 45-degree angle with respect to the surface of the food product support.

25. The oven of claim 3, wherein the direction of the third plume array is at a substantially 90-degree angle with respect to the surface of the food product support.

26. The oven of claim 1, wherein the first tube is positioned substantially through a first half of the bottom of the cooking chamber, and the second tube is positioned substantially through a second half of the bottom.

27. The oven of claim 1, further comprising: one or more magnetrons; and one or more microwave resonators for directing a microwave energy generated by the one or more magnetrons into the cooking chamber.

28. The oven of claim 1, wherein the oven is adapted to be powered by a voltage less than 220 volts.

29. The oven of claim 3, wherein the oven is adapted to be powered by a voltage less than 220 volts.

30. The oven of claim 1, wherein the first airflow is a first plume array and the second airflow is a second plume array.

31. The oven of claim 1, wherein the first tube and the second tube each have a length and a width, and wherein the length is longer than the width is wide.

32. The oven of claim 1, wherein the first tube and the second tube each have a single opening.

33. The oven of claim 32, wherein the single opening is divided along at least a portion of its length.

34. The oven of claim 32, wherein the single opening is divided along at least a portion of its length by at least one divider.

35. An oven for cooking a food product comprising:
a cooking chamber comprising a top, a bottom, and a food product support;
a conduit in fluid communication with the cooking chamber communicating a gas flowing therethrough into the cooking chamber;
one or more air blowers in fluid communication with the conduit;
a thermal energy source heating the gas;
a first tube or a first nozzle generating a first airflow of the gas;
a second tube or a second nozzle generating a second airflow of the gas;
wherein the first and the second tubes or the first and second nozzles direct the first and the second airflows towards substantially opposite portions of the food product support at a non-zero angle less than 90 degrees with respect to the surface of the food product support, with the directions of the first and the second airflows meeting each other above the food product on the food product support in the cooking chamber, and wherein the food product support is heated from below by a third airflow.

* * * * *